US010540047B2

United States Patent
Krasnov et al.

(10) Patent No.: US 10,540,047 B2
(45) Date of Patent: *Jan. 21, 2020

(54) TRANSPARENT CONDUCTIVE COATING FOR CAPACITIVE TOUCH PANEL AND METHOD OF MAKING SAME

(71) Applicant: Guardian Glass, LLC, Auburn Hills, MI (US)

(72) Inventors: Alexey Krasnov, Canton, MI (US); Willem Den Boer, Brighton, MI (US)

(73) Assignee: GUARDIAN GLASS, LLC, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/371,190

(22) Filed: Apr. 1, 2019

(65) Prior Publication Data

US 2019/0227653 A1 Jul. 25, 2019

Related U.S. Application Data

(63) Continuation of application No. 15/867,917, filed on Jan. 11, 2018, now Pat. No. 10,248,274, which is a (Continued)

(51) Int. Cl.
  *G06F 3/044* (2006.01)
  *G02F 1/1333* (2006.01)
  *G06F 3/041* (2006.01)

(52) U.S. Cl.
  CPC .......... *G06F 3/044* (2013.01); *G02F 1/13338* (2013.01); *G06F 3/0416* (2013.01);
  (Continued)

(58) Field of Classification Search
  CPC ................................ G06F 3/041; G06F 3/044
  See application file for complete search history.

(56) References Cited

U.S. PATENT DOCUMENTS 5,254,413 A   10/1993 Maricocchi
8,124,237 B2   2/2012 Nunez-Regueiro et al.
(Continued)

FOREIGN PATENT DOCUMENTS

JP   2010-157239   7/2010
JP   2012-133779   7/2012
(Continued)

OTHER PUBLICATIONS

U.S. Appl. No. 15/867,917, filed Jan. 11, 2018; Krasnov et al.
(Continued)

*Primary Examiner* — Vijay Shankar
*Assistant Examiner* — Cory A Almeida

(57) ABSTRACT

A multi-layer conductive coating is substantially transparent to visible light, contains at least one conductive layer comprising silver that is sandwiched between at least a pair of dielectric layers, and may be used as an electrode and/or conductive trace in a capacitive touch panel. The multi-layer conductive coating may contain a dielectric layer(s), and may be used in applications such as capacitive touch panels for controlling showers, appliances, vending machines, electronics, electronic devices, and/or the like. In certain example embodiments, different electrodes of the touch panel may be formed by different silver based layers of the same or different multi-layer coatings. In patterning the electrodes, different laser scribing wavelengths may be used to pattern different respective silver based layers, of the same or different multi-layer coating(s), in certain example embodiments.

11 Claims, 29 Drawing Sheets

Related U.S. Application Data continuation-in-part of application No. 15/678,266, filed on Aug. 16, 2017, now Pat. No. 9,921,703, which is a continuation-in-part of application No. 15/647,541, filed on Jul. 12, 2017, now Pat. No. 9,904,431, and a continuation-in-part of application No. 15/409,658, filed on Jan. 19, 2017, now Pat. No. 10,082,920, said application No. 15/647,541 is a continuation of application No. 15/215,908, filed on Jul. 21, 2016, now Pat. No. 9,733,779, which is a continuation-in-part of application No. 15/146,270, filed on May 4, 2016, now Pat. No. 9,740,357, said application No. 15/409,658 is a continuation of application No. 14/681,266, filed on Apr. 8, 2015, now Pat. No. 9,557,871, said application No. 15/146,270 is a continuation of application No. 13/685,871, filed on Nov. 27, 2012, now Pat. No. 9,354,755.

(52) U.S. Cl.
CPC .. *G06F 3/0412* (2013.01); *G06F 2203/04103* (2013.01); *G06F 2203/04111* (2013.01)

(56) References Cited

U.S. PATENT DOCUMENTS

| | | | |
|---|---|---|---|
| 8,138,425 B2 | 3/2012 | Lee et al. | |
| 8,173,263 B2 | 5/2012 | Lingle et al. | |
| 8,187,713 B2 | 5/2012 | Lemmer et al. | |
| 8,202,619 B2 | 6/2012 | Thomsen et al. | |
| 8,203,073 B2 | 6/2012 | Lu et al. | |
| 8,263,227 B2 | 9/2012 | Disteldorf et al. | |
| 8,293,344 B2 | 10/2012 | Lemmer et al. | |
| 8,313,620 B2 | 11/2012 | Krasnov | |
| 9,354,755 B2 | 5/2016 | Den Boer et al. | |
| 9,557,871 B2 | 1/2017 | Den Boer et al. | |
| 9,733,779 B2 | 8/2017 | Veerasamy et al. | |
| 9,740,357 B2 | 8/2017 | Den Boer et al. | |
| 9,904,431 B2 | 2/2018 | Veerasamy | |
| 9,921,703 B2 | 3/2018 | Den Boer et al. | |
| 10,248,274 B2 | 4/2019 | Krasnov et al. | |
| 2003/0234770 A1 | 12/2003 | MacKey | |
| 2004/0086723 A1* | 5/2004 | Thomsen | C03C 17/36 428/426 |
| 2005/0005703 A1* | 1/2005 | Saito | G01L 9/12 73/780 |
| 2007/0268243 A1* | 11/2007 | Choo | G02F 1/13338 345/104 |
| 2009/0085885 A1* | 4/2009 | Wu | G06F 3/041 345/173 |
| 2009/0314621 A1* | 12/2009 | Hotelling | G06F 3/0416 200/600 |
| 2010/0013784 A1 | 1/2010 | Nashiki et al. | |
| 2010/0046191 A1 | 2/2010 | Den Boer et al. | |
| 2010/0163994 A1 | 7/2010 | Tang et al. | |
| 2010/0209729 A1 | 8/2010 | Thomsen et al. | |
| 2011/0193799 A1 | 8/2011 | Jun et al. | |
| 2012/0114919 A1 | 5/2012 | Nakajima et al. | |
| 2012/0118614 A1 | 5/2012 | Kuriki | |
| 2012/0219821 A1 | 8/2012 | Frank et al. | |
| 2012/0227259 A1* | 9/2012 | Badaye | G06F 3/044 29/846 |
| 2012/0258334 A1* | 10/2012 | Kaneko | G06F 3/044 428/701 |
| 2012/0315383 A1 | 12/2012 | Bright et al. | |
| 2014/0145999 A1 | 5/2014 | Den Boer et al. | |
| 2015/0036066 A1 | 2/2015 | Chan et al. | |
| 2016/0190055 A1 | 6/2016 | Jinbo et al. | |
| 2017/0344157 A1 | 11/2017 | Krasnov et al. | |

FOREIGN PATENT DOCUMENTS

| | | |
|---|---|---|
| WO | WO 2012/099253 | 7/2012 |
| WO | WO 2012/099394 | 7/2012 |
| WO | WO 2012/128893 | 9/2012 |

OTHER PUBLICATIONS

U.S. Appl. No. 15/678,266, filed Aug. 16, 2017; Den Boer et al.
U.S. Appl. No. 15/849,879, filed Dec. 21, 2017; Krasnov et al.
U.S. Appl. No. 15/850,002, filed Dec. 21, 2017; Krasnov et al.
U.S. Appl. No. 15/409,658, filed Jan. 19, 2017; Den Boer et al.
U.S. Appl. No. 15/647,541, filed Jul. 12, 2017; Veerasamy et al.
U.S. Appl. No. 13/685,871, filed Nov. 27, 2012; Den Boer et al.
U.S. Appl. No. 15/146,270, filed May 4, 2016; Den Boer et al.
U.S. Appl. No. 15,215,908, filed Jul. 21, 2016; Veerasamy et al.
Written Opinion of the International Searching Authority dated Jul. 18, 2019 in International Application No. PCT/IB2019/050227, 11 pages.
International Search Report dated Jul. 18, 2019 in International Application No. PCT/IB2019/050227, 5 pages.

* cited by examiner

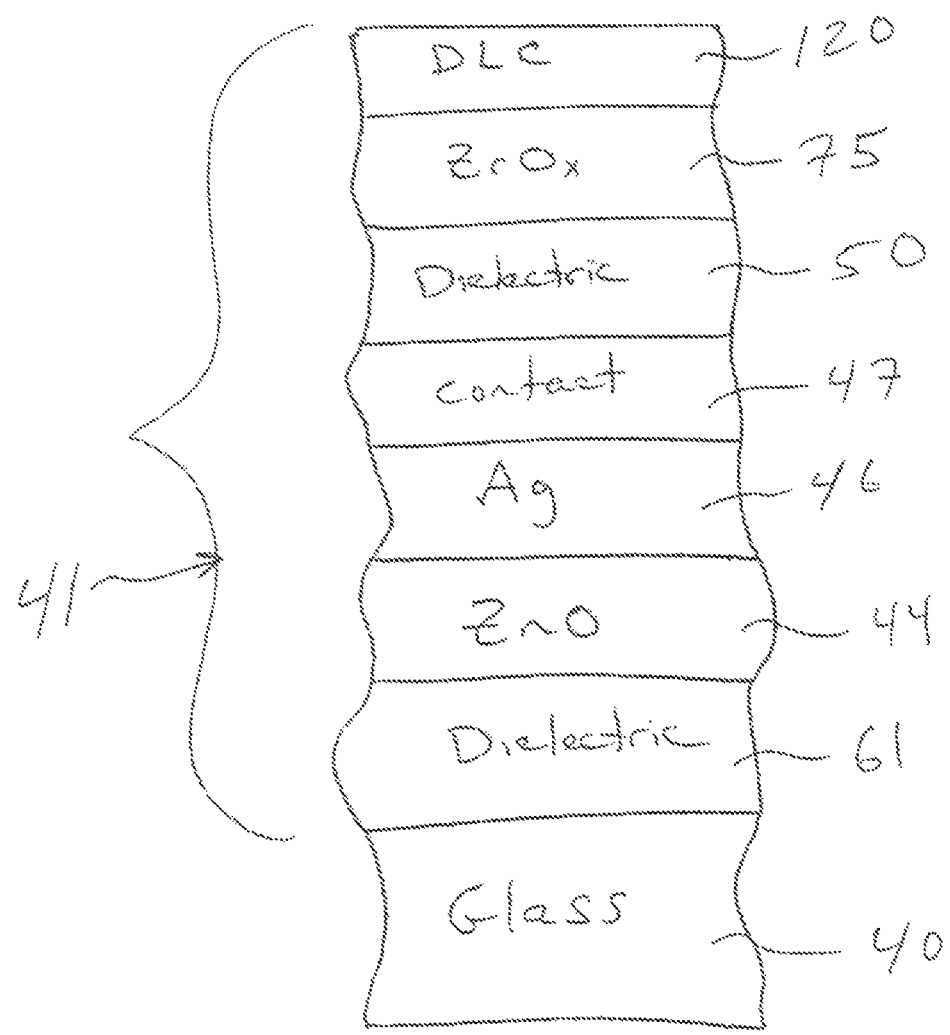

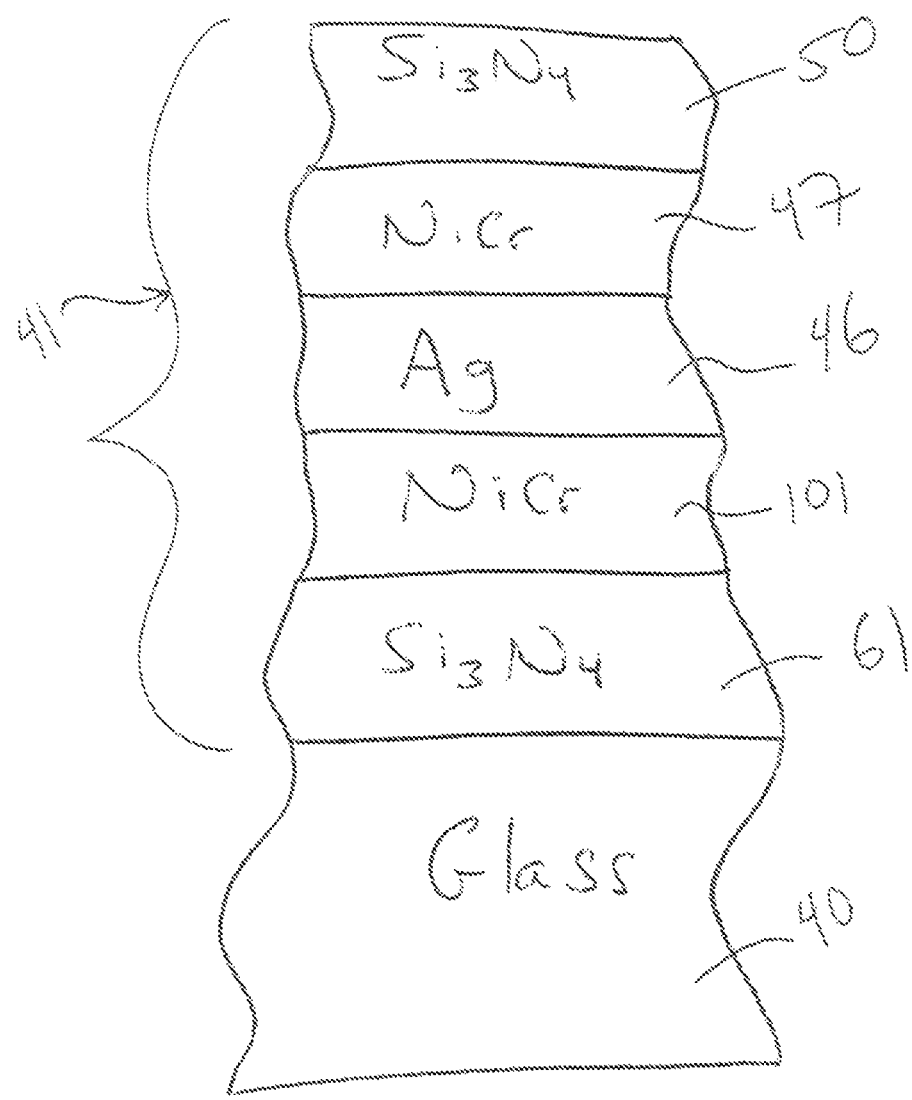

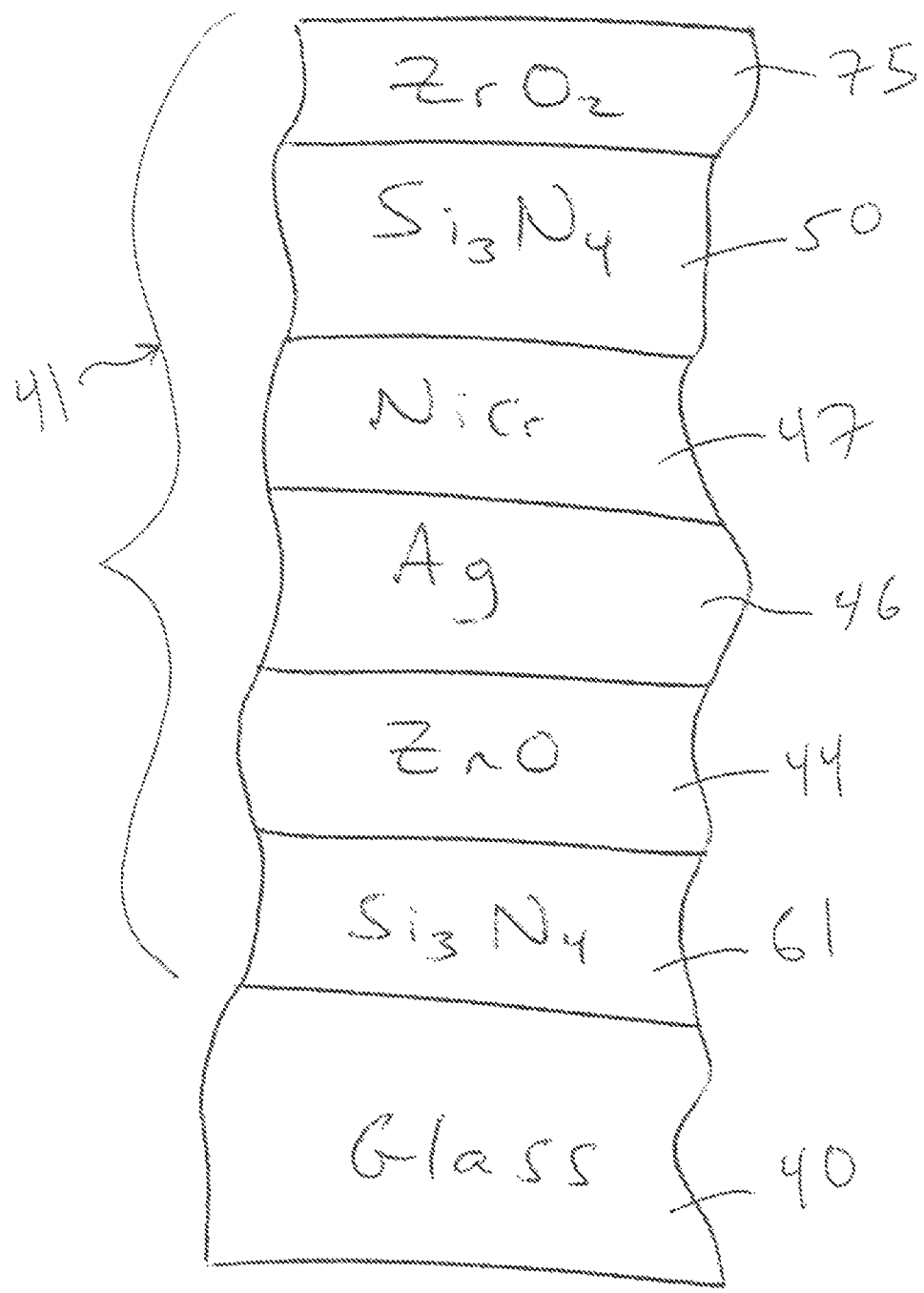

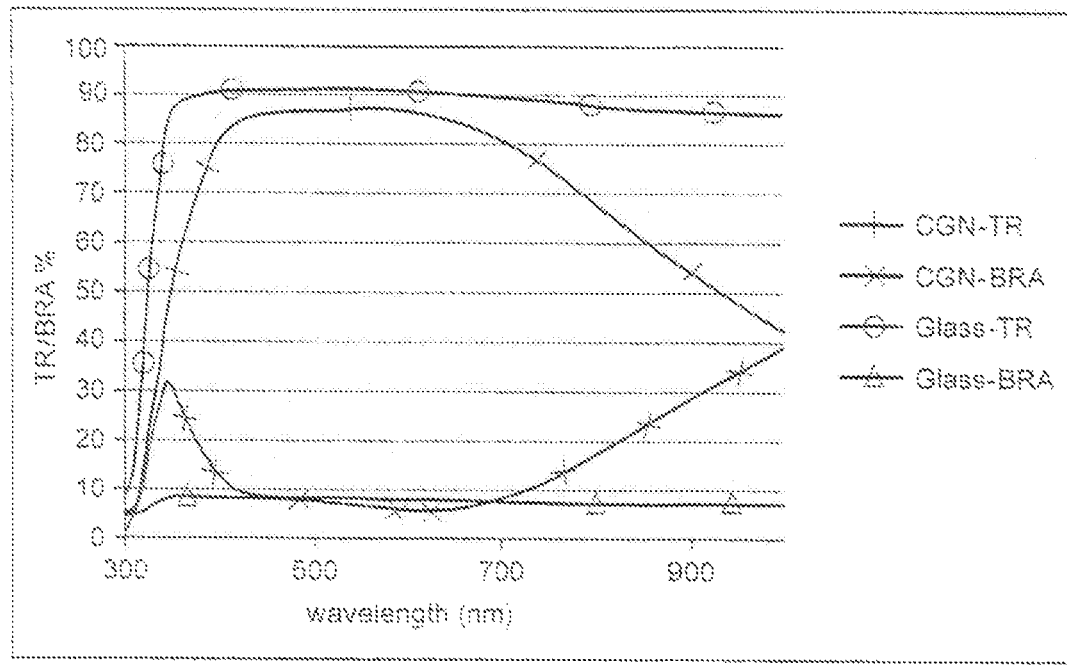
FIG. 5 (Comparative Example)
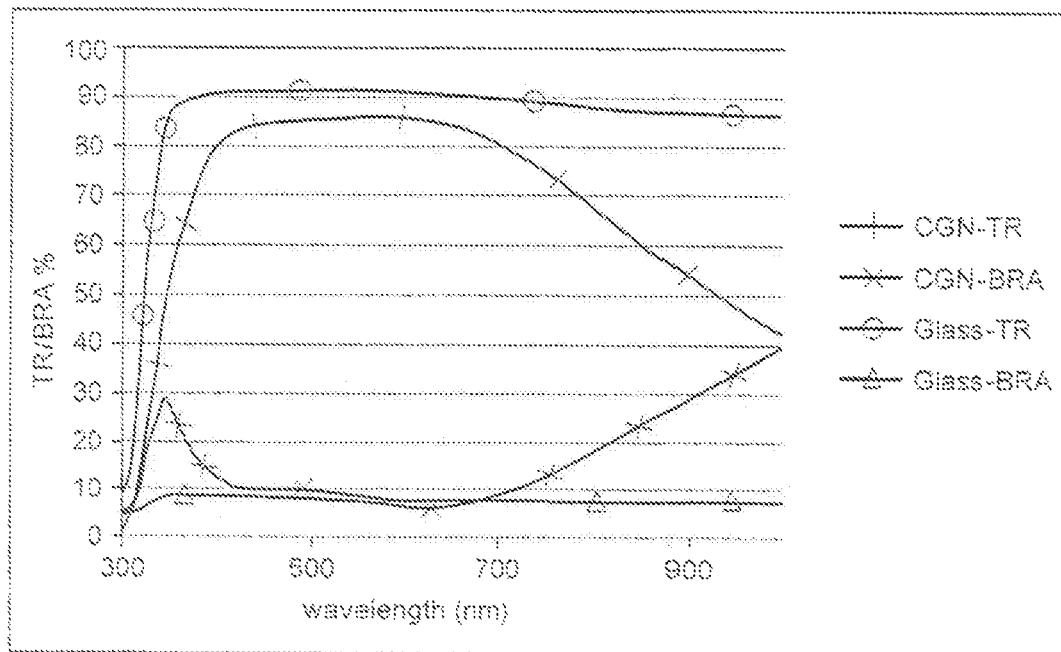
FIG. 6 (Example 1)

US 10,540,047 B2

TRANSPARENT CONDUCTIVE COATING FOR CAPACITIVE TOUCH PANEL AND METHOD OF MAKING SAME

This application is a continuation of application Ser. No. 15/867,917, filed Jan. 11, 2018, (now U.S. Pat. No. 10,248, 274), which is a continuation-in-part (CIP) of U.S. Ser. No. 15/678,266, filed Aug. 16, 2017 (now U.S. Pat. No. 9,921, 703), which is a continuation-in-part (CIP) of U.S. Ser. No. 15/647,541 filed Jul. 12, 2017 (now U.S. Pat. No. 9,904, 431), which is a continuation of U.S. Ser. No. 15/215,908 filed Jul. 21, 2016 (U.S. Pat. No. 9,733,779), which is a continuation-in-part (CIP) of U.S. Ser. No. 15/146,270 filed May 4, 2016 (now U.S. Pat. No. 9,740,357), which is a continuation of U.S. Ser. No. 13/685,871 filed Nov. 27, 2012 (now U.S. Pat. No. 9,354,755), the disclosures of which are all hereby incorporated herein by reference in their entireties. This application is also a continuation-in-part (CIP) of U.S. Ser. No. 15/678,266, filed Aug. 16, 2017, which is a continuation-in-part (CIP) of U.S. Ser. No. 15/409,658 filed Jan. 19, 2017, which is a continuation of U.S. Ser. No. 14/681,266 filed Apr. 8, 2015 (now U.S. Pat. No. 9,557,871), the disclosures of which are all hereby incorporated herein by reference in their entireties.

Example embodiments of this invention relate to a multi-layer conductive coating that is substantially transparent to visible light, contains at least one conductive layer comprising silver that is sandwiched between at least a pair of dielectric layers, and may be used as an electrode and/or conductive trace in a capacitive touch panel. The multi-layer conductive coating may contain a layer of or including zirconium oxide (e.g., $ZrO_2$) and/or silicon nitride in certain embodiments, and may be used in applications such as capacitive touch panels for controlling showers, appliances, vending machines, electronics, electronic devices, and/or the like. The coating has improved conductivity (e.g., smaller sheet resistance $R_s$ or smaller emissivity, given a similar thickness and/or cost of deposition) compared to typical ITO coatings used in touch panels. In certain example embodiments, different electrodes of the touch panel may be formed by different silver based layers of the same or different multi-layer coatings. In patterning the electrodes, different laser scribing wavelengths may be used to pattern different respective silver based layers, of the same or different multi-layer coating(s), in certain example embodiments. Different electrodes may be patterned from the same or different sides of a supporting glass substrate in different example embodiments.

BACKGROUND

A capacitive touch panel often includes an insulator such as glass, coated with a conductive coating. As the human body is also an electrical conductor, touching the surface of the panel results in a distortion of the panel's electrostatic field, measurable as a change in capacitance for example. A transparent touch panel may be combined with a display such as a liquid crystal display (LCD) or LED panel to form a touchscreen. A projected capacitive (PROCAP) touch panel, which may optionally include an LCD or other display, allows finger or other touches to be sensed through a protective layer(s) in front of the conductive coating.

FIGS. 1(a) to 1(g) illustrate an example of a related art projected capacitive touch panel, e.g., see U.S. Pat. No. 8,138,425 the disclosure of which is hereby incorporated herein by reference. Referring to FIG. 1(a), substrate 11, x-axis conductor 12 for rows, insulator 13, y-axis conductor 14 for columns, and conductive traces 15 are provided. Substrate 11 may be a transparent material such as glass. X-axis conductors 12 and y-axis conductors 14 are typically indium tin oxide (ITO) which is a transparent conductor. Insulator 13 may be an insulating material (for example, silicon nitride) which inhibits conductivity between x-axis conductors 12 and y-axis conductors 14. Traces 15 provide electrical conductivity between the plurality of conductors and a signal processor (not shown). ITO used for electrodes/traces in small PROCAP touch panels typically has a sheet resistance of at least about 100 ohms/square, which has been found to be too high for certain applications. Moreover, conventional ITO coatings for touch panels are typically highly crystalline and relatively thick and brittle, and thus in applications involving bending such ITO coatings are subject to failure.

Referring to FIG. 1(b), x-axis conductor 12 (e.g., ITO) is formed on substrate 11. The ITO is coated in a continuous layer on substrate 11 and then is subjected to a first photolithography process in order to pattern the ITO into x-axis conductors 12. FIG. 1(c) illustrates cross section A-A' of FIG. 1(b), including x-axis conductor 12 formed on substrate 11. Referring to FIG. 1(d), insulator 13 is then formed on the substrate 11 over x-axis channel(s) of x-axis conductor 12. FIG. 1(e) illustrates cross section B-B' of FIG. 1(d), including insulator 13 which is formed on substrate 11 and x-axis conductor 12. The insulator islands 13 shown in FIGS. 1(d)-(e) are formed by depositing a continuous layer of insulating material (e.g., silicon nitride) on the substrate 11 over the conductors 12, and then subjecting the insulating material to a second photolithography, etching, or other patterning process in order to pattern the insulating material into islands 13. Referring to FIG. 1(f), y-axis conductors 14 are then formed on the substrate over the insulator islands 13 and x-axis conductors 12. The ITO for y-axis conductors 14 is coated on substrate 11 over 12, 13, and then is subjected to a third photolithography or other patterning process in order to pattern the ITO into y-axis conductors 14. While much of y-axis conductor material 14 is formed directly on substrate 11, the y-axis channel is formed on insulator 13 to inhibit conductivity between x-axis conductors 12 and y-axis conductors 14. FIG. 1(g) illustrates cross section C-C' of FIG. 1(f), including part of an ITO y-axis conductor 14, which is formed on the substrate 11 over insulative island 13 and over an example ITO x-axis conductor 12. It will be appreciated that the process of manufacturing the structure shown in FIGS. 1(a)-(g) requires three separate and distinct deposition steps and three photolithography type processes, which renders the process of manufacture burdensome, inefficient, and costly.

FIG. 1(h) illustrates another example of an intersection of ITO x-axis conductor 12 and ITO y-axis conductor 14 according to a related art projected capacitive touch panel. Referring to FIG. 1(h), an ITO layer is formed on the substrate 11 and can then be patterned into x-axis conductors 12 and y-axis conductors 14 in a first photolithography process. Then, an insulating layer is formed on the substrate and is patterned into insulator islands 13 in a second photolithography or etching process. Then, a conductive layer is formed on the substrate 11 over 12-14 and is patterned into conductive bridges 16 in a third photolithography process. Bridge 16 provides electrical conductivity for a y-axis conductor 14 over an x-axis conductor 12. Again, this process of manufacture requires at least three deposition steps and at least three different photolithography processes.

The projected capacitive touch panels illustrated in FIGS. 1(a) through 1(h) may be mutual capacitive devices or self-capacitive devices. In a mutual capacitive device, there is a capacitor at every intersection between an x-axis conductor 12 and a y-axis conductor 14 (or metal bridge 16). A voltage is applied to x-axis conductors 12 while the voltage of y-axis conductors 14 is measured (and/or vice versa). When a user brings a finger or conductive stylus close to the surface of the device, changes in the local electrostatic field reduce the mutual capacitance. The capacitance change at every individual point on the grid can be measured to accurately determine the touch location. In a self-capacitive device, the x-axis conductors 12 and y-axis conductors 14 operate essentially independently. With self-capacitance, the capacitive load of a finger or the like is measured on each x-axis conductor 12 and y-axis conductor 14 by a current meter.

As described above, prior art transparent conductors 12 and 14 in touch panels are typically indium tin oxide (ITO), which is problematic for a number of reasons. First, ITO is costly. Second, thin layers of ITO have a high sheet resistance $R_s$ (typically at least about 100 ohms/square at a given thickness); in other words the conductivity of ITO is not particularly good and its resistivity is high. In order for an ITO layer to have a much lower sheet resistance, the ITO layer must be extremely thick (for example, greater than 300 or 400 nm). However, such a thick layer of ITO is both prohibitively expensive and less transparent. Thus, the high sheet resistance of thin layers of ITO limits their use in layouts requiring long narrow traces on touch panels, with an emphasis on large panels. Accordingly, it will be appreciated that there exists a need in the art for touch panel electrodes that are of material which does not suffer from the ITO disadvantage combination of high cost and low conductivity at small thicknesses.

SUMMARY OF EXAMPLE EMBODIMENTS

Example embodiments of this invention relate to a multi-layer conductive coating that is substantially transparent to visible light, contains at least one conductive layer comprising silver that is sandwiched between at least a pair of dielectric layers, and may be used as an electrode and/or conductive trace in a capacitive touch panel. The multi-layer conductive coating may contain a dielectric layer(s) of or including zirconium oxide (e.g., $ZrO_2$) and/or silicon nitride in certain example embodiments, and may be used in applications such as capacitive touch panels for controlling showers, appliances, vending machines, electronics, electronic devices, and/or the like. The coating has improved conductivity (e.g., smaller sheet resistance $R_s$ or smaller emissivity, given a similar thickness and/or cost of deposition) compared to typical ITO coatings used in touch panels. The coating may be used as electrode layers and/or traces in capacitive touch panels such as PROCAP touch panel or any other type of touch panel.

In certain example embodiments, different electrodes of the touch panel may be formed by different silver based layers of the same or different multi-layer coatings. In patterning the electrodes, different laser scribing wavelengths may be used to pattern different respective silver based layers, of the same or different multi-layer coating(s), in certain example embodiments. For example, when first and second electrodes of the touch panel overlap each other, a first laser scribing wavelength may be used when patterning the first silver based layer into the first electrode(s), and a second laser scribing wavelength may be used when patterning the second silver based layer into the second electrode(s). For example, transmit electrodes may be laser patterned using a first wavelength(s), and receive electrodes may be laser patterned using a different second wavelength(s). Advantageously, the use of the different wavelengths reduces damage to electrode(s) not intended to be patterned in a given procedure.

In certain example embodiments, when different electrodes of the touch panel may be formed by different silver based layers of the same or different multi-layer coatings, a first set of electrodes may be patterned by laser scribing from a first side of the supporting glass substrate, whereas a second set of electrodes may be patterned by laser scribing from an opposite second side of the supporting glass substrate. Thus, since the electrodes are on the same side of the glass substrate, one of the two laser patterning procedures is performed through the supporting glass substrate. For example, transmit electrodes may be laser patterned from a first side of the supporting glass substrate, whereas receive electrodes may be laser patterned form the opposite second side of the supporting glass substrate. Advantageously, this technique reduces damage to electrodes not intended to be patterned in a given laser patterning procedure. The embodiment involving laser patterning of different electrodes from opposite sides of the supporting glass substrate may, or may not, be used in combination with the embodiment using different wavelengths to pattern different electrodes.

In certain example embodiments, the coating for at least one electrode of the touch panel may have increased resistance, and thus reduced conductivity, compared to pure silver layers of certain coatings, in order to allow the silver-based coating to be more suitable for touch panel electrode applications. The increased resistance, and thus reduced conductivity, of the silver layer(s) in the coating may be achieved by any of several techniques. For example, the increased resistance, and thus the reduced conductivity, of the silver layer(s) in the coating may be achieved by doping the silver with an impurity such as one or more of Zn, Pt, Pd, Ti, Al or the like, and/or by replacing crystalline zinc oxide directly under and contacting the silver with another material such as a suitable non-crystalline dielectric, amorphous semiconductor, or metal alloy (e.g., NiCr) in order to increase the silver's resistance. Silver with increased resistance may be used for all electrodes and/or traces in the touch panel, or alternatively may be done for only a portion of the electrodes and/or traces in the touch panel.

In certain example embodiments, different electrodes of the touch panel may have different resistance, with respective silver-based structures of various electrodes being different from one another to provide different resistance for different electrodes. For example, transmit electrodes may have higher sheet resistance (ohms/square) than receive electrodes in certain example embodiments. Thus, for example, one, some, or all of the transmit electrodes may be made up of a multi-layer coating including a silver layer that has higher sheet resistance (and thus lower conductivity) compared to pure silver in certain types of coatings, with the higher sheet resistance of the silver-based layer being achieved by doping the silver with an impurity such as one or more of Zn, Pt, Pd, Ti, Al or the like, and/or by replacing crystalline zinc oxide directly under and contacting the silver with another material such as a suitable non-crystalline dielectric, amorphous semiconductor, or metal alloy (e.g., NiCr) in order to increase the silver's resistance. The differences in resistance between transmit and receive electrodes may also be realized by: making conductors of these electrodes different thicknesses, doping silver of the transmit electrodes, and/or providing silver of the transmit electrodes over and directly contacting a layer other than a crystalline zinc oxide based layer.

In an example embodiment of this invention, there is provided a method of making a capacitive touch panel comprising a glass substrate; a patterned multi-layer transparent conductive coating supported by the substrate, the multi-layer transparent conductive coating including a first conductive layer comprising silver, a dielectric layer located between at least the substrate and the first conductive layer comprising silver, and a dielectric layer comprising one or more of: zirconium oxide, silicon nitride, and tin oxide, located over at least the first conductive layer comprising silver; a first set of electrodes; a second set of electrodes; wherein the first and second sets of electrodes are configured for allowing touch position to be determined, wherein at least some of the electrodes comprise the multi-layer transparent conductive coating; the method comprising: laser patterning the first conductive layer comprising silver with a first wavelength in forming the first set of electrodes; and forming the second set of electrodes by laser patterning (i) with a second wavelength different from the first wavelength, and/or (ii) with a laser beam from an opposite side of the substrate than a laser beam used in laser patterning the first conductive layer. The patterned multi-layer transparent conductive coating may further comprise a second conductive layer comprising silver, and another dielectric layer (e.g., silicon nitride or tin oxide) located between at least the first and second conductive layers comprising silver, wherein the first set of electrodes and the second set of electrodes may each comprise the multi-layer transparent conductive coating, and wherein said forming the second set of electrodes by laser patterning with the second wavelength different from the first wavelength may comprise laser patterning the second conductive layer comprising silver with the second wavelength. The first conductive layer comprising silver of the patterned multi-layer transparent conductive coating may be a conductor of the first set of electrodes, and the second conductive layer comprising silver of the patterned multi-layer transparent conductive coating may be a conductor of the second set of electrodes.

BRIEF DESCRIPTION OF THE DRAWINGS

FIGS. 4(a)-4(h) are cross-sectional views of various silver-inclusive transparent conductive coatings for use in a touch panel of FIGS. 2, 3, 7, 8, 9, 10, 11, 12, 13 and/or 14 according to exemplary embodiments of this invention.

FIG. 5 is a percent visible transmission/reflectance vs. wavelength (nm) graph illustrating the visible transmission (TR) percentage and glass side visible reflection (BRA) percentage of a Comparative Example (CE) coating on a glass substrate, compared to those values for the glass substrate alone (Glass-TR, Glass-BRA).

FIG. 6 is a percent visible transmission/reflectance vs. wavelength (nm) graph illustrating the visible transmission (TR) and glass side visible reflection (BRA) of an example coating of FIG. 4(a) according to an example embodiment of this invention on a glass substrate, demonstrating that it is transparent to visible light and has glass side visible reflectance more closely matched to that of the glass substrate compared to the CE in FIG. 5. FIG. 6, like FIG. 5, also illustrates the visible transmission (Glass-TR) and visible reflectance (Glass-BRA) for the glass substrate alone without the coating on it.

FIG. 8(a) also illustrates the visible transmission (Glass-TR) and visible reflectance (Glass-BRA) for just the glass substrate absent the coating.

DETAILED DESCRIPTION OF EXEMPLARY EMBODIMENTS

Figure 1A:
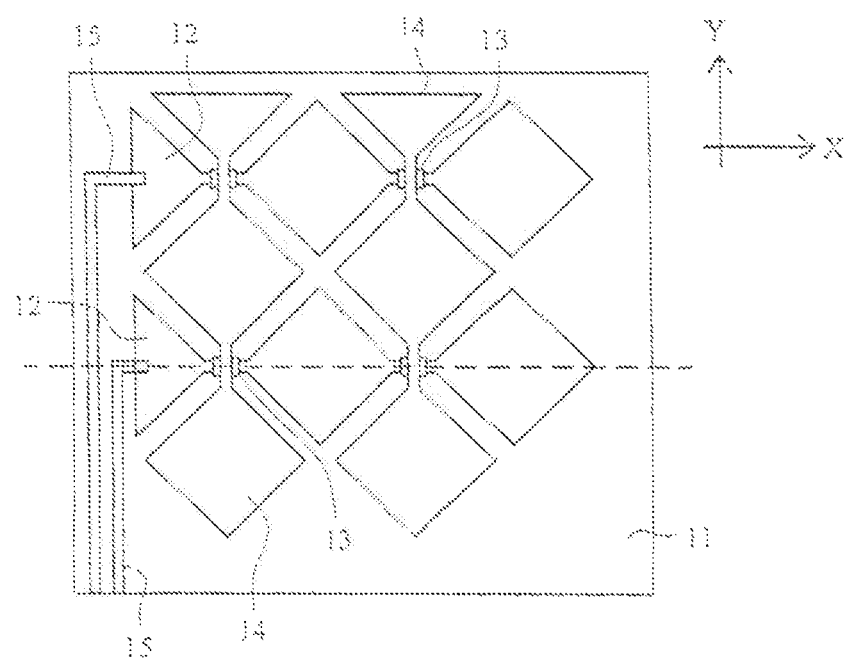
FIGS. 1(a) to 1(h) illustrate examples of prior art projected capacitive touch panels.
Figure 1B:
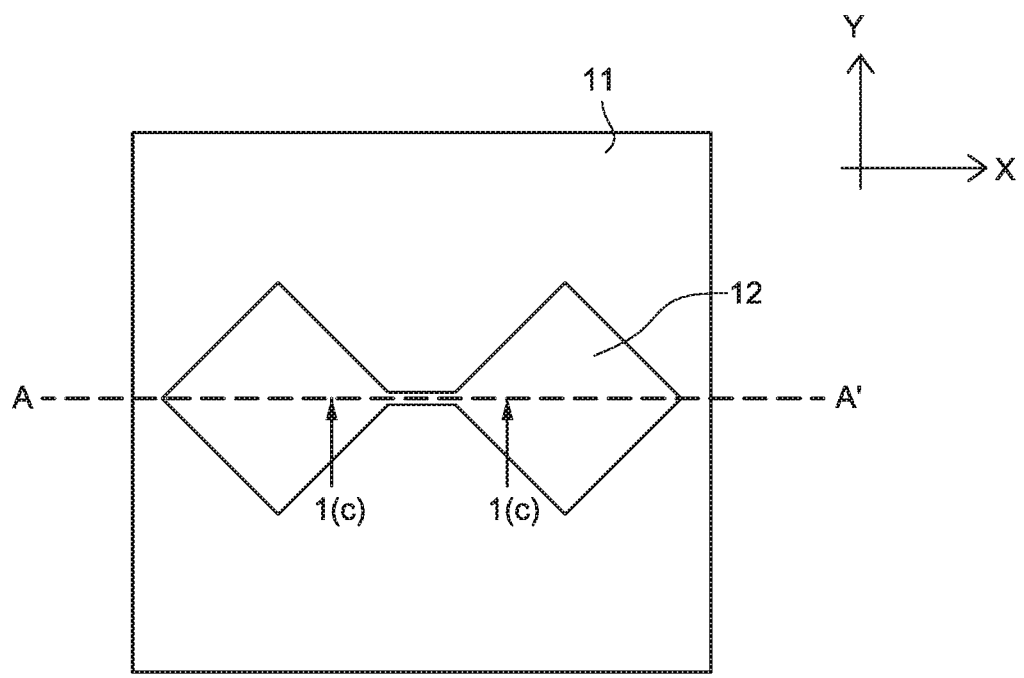
Figure 1C:
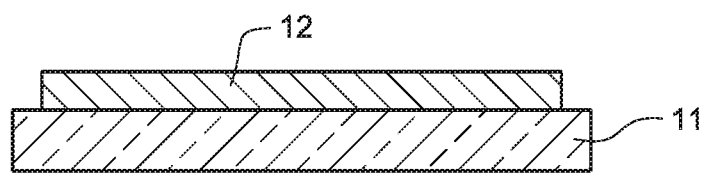
Figure 1D:
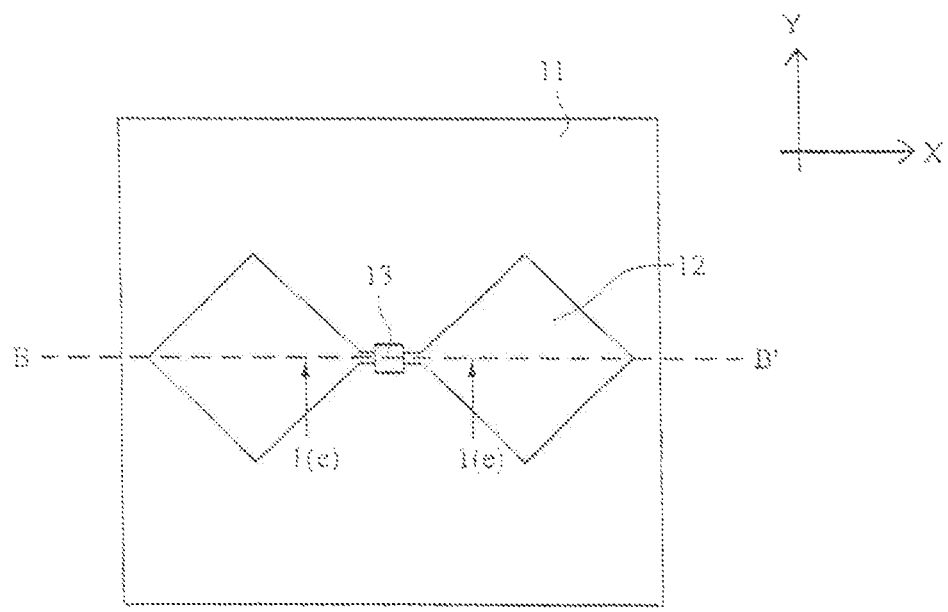
Figure 1E:
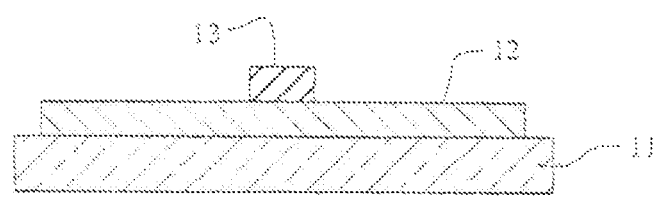
Figure 1F:
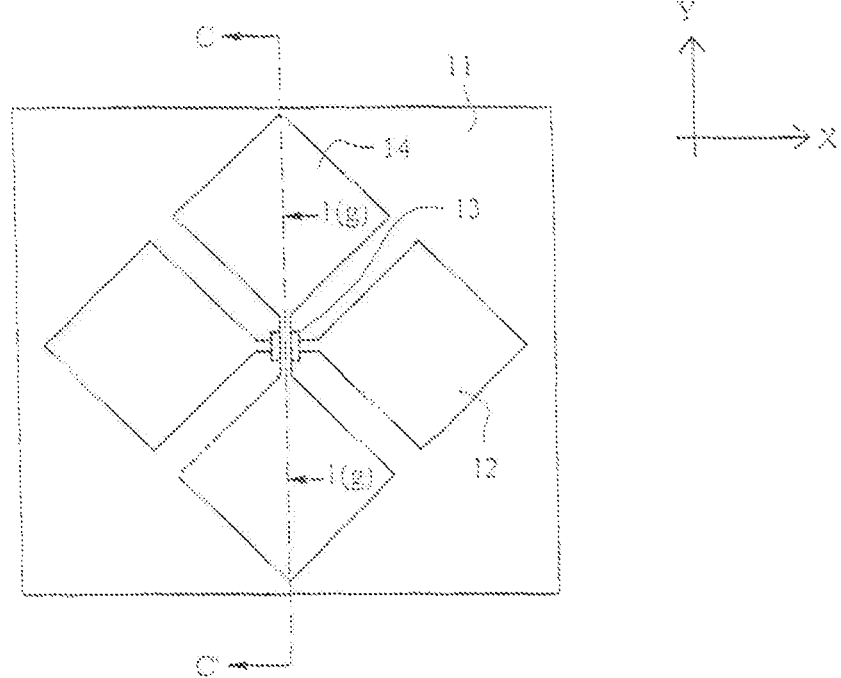
Figure 1G:
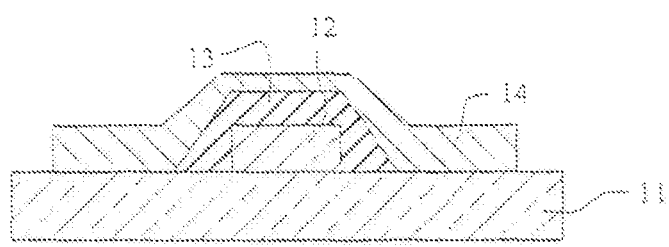
Figure 1H:
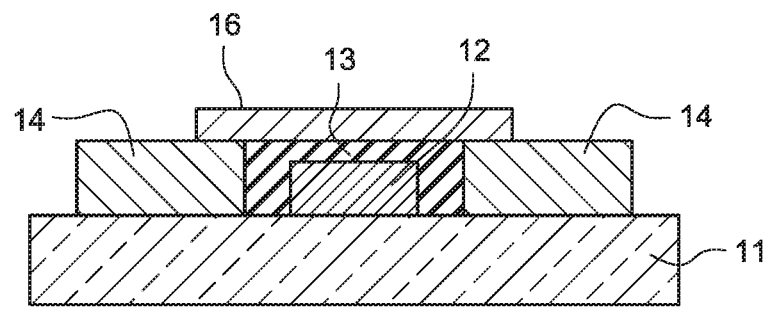

A detailed description of exemplary embodiments is provided with reference to the accompanying drawings. Like reference numerals indicate like parts throughout the drawings.

Example embodiments of this invention relate to a multi-layer conductive coating 41 that is substantially transparent to visible light, contains at least one conductive layer comprising silver 46 that is sandwiched between at least a pair of layers such as dielectric layers, and may be used as an electrode and/or conductive trace in a capacitive touch panel. Example multi-layer transparent conductive coatings 41 are shown in FIGS. 4(a)-(h). The multi-layer conductive coating 41 may be used in applications such as capacitive touch panels for controlling showers (e.g., water on/off control, water temperature control, and/or steam control), appliances, vending machines, music control, thermostat control, electronics, electronic devices, and/or the like. The zirconium oxide and/or DLC layers discussed herein provide for scratch resistance, and resistance to stains and cleaning chemicals in applications such as shower door/wall touch panel applications. In certain example embodiments, the coating includes a silver layer(s) 46 and may be used as an electrode(s) and/or conductive trace(s) in a capacitive touch panel so as to provide for an electrode(s) transparent to visible light but without much visibility due to closely matching visible reflection of the coating on the substrate to that of an underlying substrate in areas where the coating is not present. The coating 41 has improved conductivity (e.g., smaller sheet resistance $R_s$ or smaller emissivity, given a similar thickness and/or cost of deposition) compared to typical ITO coatings used in touch panels. The coating may be used as electrode layers and/or traces in capacitive touch panels such as PROCAP touch panels or any other type of touch panel. The touch panels discussed herein, including the electrodes and traces of the multi-layer coating 41, preferably have a visible transmission (Ill. A, 2 deg. Obs.) of at least 50%, more preferably of at least 60%, and most preferably of at least 70%.

In certain example embodiments, the coating 41 for at least one electrode in the touch panel may have increased resistivity, and thus reduced conductivity, compared to pure silver layers of certain coatings, in order to allow the silver-based coating to be more suitable for certain touch panel electrode applications. The increased sheet resistance, and reduced conductivity, of the silver layer(s) 46 in the coating 41 may be achieved by any of several techniques. For example, the increased sheet resistance, and reduced conductivity, of the silver layer(s) 46 in the coating may be achieved by doping the silver with an impurity such as one or more of Zn, Pt, Pd, Ti, Al or the like. For example, the silver layer 46 of any of FIGS. 4(a)-4(h) may be doped with from about 0.05 to 3.0%, more preferably from about 0.1 to 2.0%, and most preferably from about 0.1 to 0.5% (wt. %), of one or more of Zn, Pt, Pd, Ti, Al, or a combination thereof. The increased sheet resistance, and reduced conductivity, of the silver layer(s) 46 may also or instead be achieved by replacing crystalline zinc oxide 44 directly under and contacting the silver with another material such as a suitable non-crystalline dielectric, amorphous semiconductor, or metal alloy (e.g., NiCr, NiCrMo, etc.) in order to increase the silver's resistance (e.g., see the NiCr based layer under the silver in FIG. 4(f)). The increased sheet resistance, and reduced conductivity, of the silver based layer(s) 46 may be achieved by, for example, one or both of: (a) doping the silver, and/or (b) replacing crystalline zinc oxide 44 directly under the silver with a suitable non-crystalline dielectric, amorphous semiconductor, or metal alloy. Silver with increased sheet resistance may be used for all electrodes and/or traces in the touch panel, or alternatively may be used for only a portion of the electrodes and/or traces in the touch panel.

In certain example embodiments, different electrodes 41 of the touch panel may be designed to have different sheet resistances, with respective silver-based structures of various electrodes being different from one another to provide different sheet resistances for different electrodes. For example, transmit electrodes (T) may have higher sheet resistance than receive electrodes (R) in certain example embodiments. Thus, for example, one, some, or all of the transmit electrodes (T) in any embodiment herein may be made up of a multi-layer coating 41 including a silver layer 46 that has higher sheet resistance (and thus lower conductivity) compared to pure silver in certain types of coatings, with the higher sheet resistance of the silver-based layer 46 being achieved by doping the silver with an impurity such as one or more of Zn, Pt, Pd, Ti, Al or the like, and/or by replacing crystalline zinc oxide directly under and contacting the silver with another material such as a suitable non-crystalline dielectric, amorphous semiconductor, or metal alloy (e.g., NiCr) in order to increase the silver based layer's sheet resistance. The receive electrodes may be designed to have a lower sheet resistance than the transmit electrodes, such as by not doping the silver based receive electrodes and/or by providing them on and contacting a crystalline or substantially crystalline layer of or including zinc oxide 44 which may optionally be doped with from about 1-10%, more preferably from about 1-5% aluminum.

In certain example embodiments of this invention, there is provided a capacitive touch panel that includes a glass substrate 40; a multi-layer transparent conductive coating 41 supported by the glass substrate 40. The multi-layer transparent conductive coating 41 may include at least one conductive layer comprising silver 46, a layer 44 under the conductive layer comprising silver 46, and a dielectric layer comprising one or more of silicon nitride 50, tin oxide 49, titanium oxide 48, $NiCrO_x$ 47 and/or zirconium oxide 75 over the conductive layer comprising silver 46, a plurality of electrodes and a plurality of conductive traces, wherein the electrodes and/or the conductive traces of the touch panel are made of the multi-layer transparent conductive coating 41. A processor (including processing circuitry) may be provided for detecting touch position on the touch panel; wherein the electrodes, and the conductive traces may be formed substantially in a common plane substantially parallel to the glass substrate 40, and a plurality of the electrodes are electrically connected to the processor by conductive traces. The glass substrate may be heat treated (e.g., thermally tempered). For one or more electrode(s) and/or trace(s), increased resistance, and reduced conductivity, of the silver in coating 41 compared to pure silver in certain coatings may be achieved by, for example, one or both of: (a) doping the conductive silver layer 46 with an impurity such as one or more of Zn, Pt, Pd, Ti, Al, or a combination thereof, and/or (b) replacing crystalline zinc oxide directly under the conductive silver 46 with a suitable non-crystalline dielectric [e.g., silicon oxide (e.g., $SiO_2$), silicon oxynitride, silicon nitride (e.g., $Si_3N_4$), titanium oxide (e.g., $TiO_2$), or zinc stannate], amorphous semiconductor (e.g., a-Si), or metal alloy (e.g., NiCr, NiCrMo, or the like).

The multi-layer transparent conductive coating 41 (and thus silver based layer 46 in certain example embodiments) may have a sheet resistance ($R_s$) of less than or equal to about 40 ohms/square, more preferably less than or equal to about 20 ohms/square, more preferably less than or equal to about 15 ohms/square, and most preferably less than or equal to about 10 ohms/square. The multi-layer transparent conductive coating 41, and thus silver based layer 46, may have a resistivity of from $30\times10^{-7}$ to $90\times10^{-7}$ $\Omega\cdot$cm, more preferably from $40\times10^{-7}$ to $80\times10^{-7}$ $\Omega\cdot$m (ohm·cm).

Figure 2A:
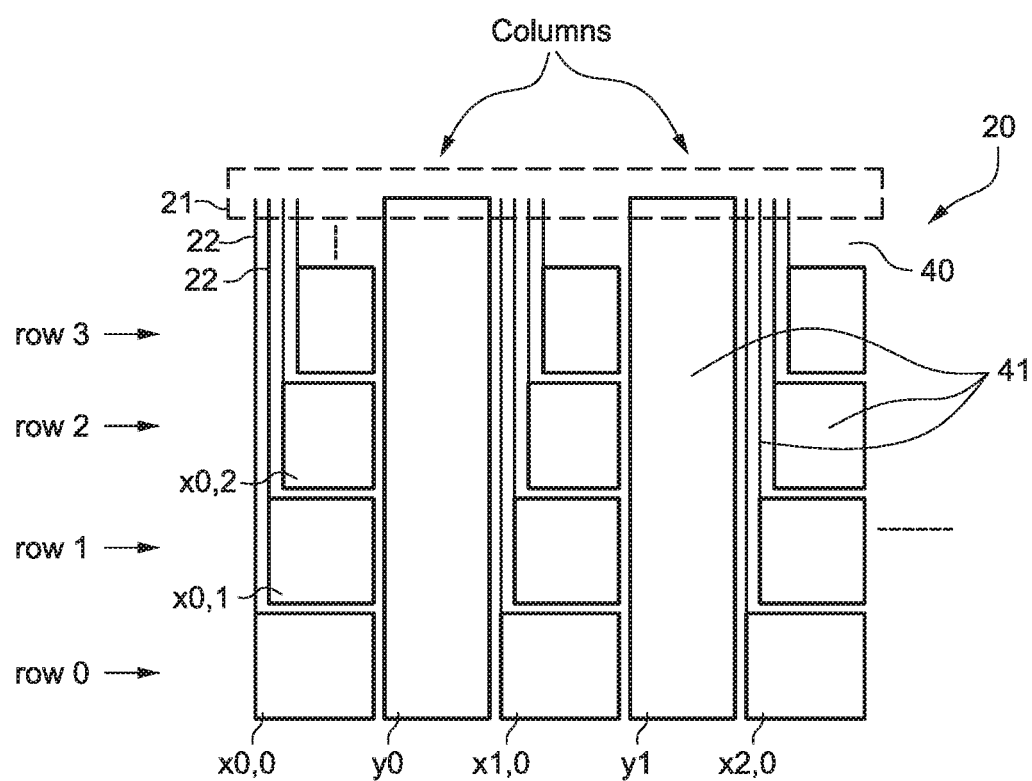
FIG. 2(a) illustrates a top or bottom plan layout of a projected capacitive touch panel according to an exemplary embodiment, that may contain the coating(s) of FIGS. 4, 6, 7, and/or 8 as conductive electrode(s) and/or conductive trace(s).
Figure 7:
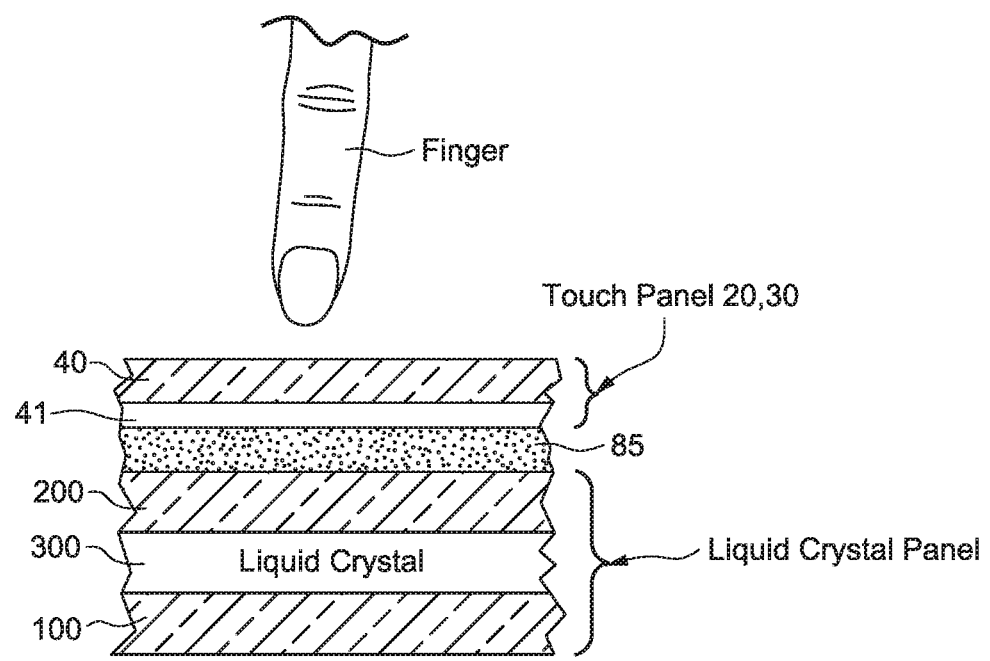
FIG. 7 is a cross sectional view of a touch panel assembly according to an example embodiment of this invention, including a touch panel according to any of FIGS. 2-4, 6, 8-10 coupled to a liquid crystal panel, for use in electronic devices such as portable phones, portable pads, computers, and/or so forth.
Figure 8:
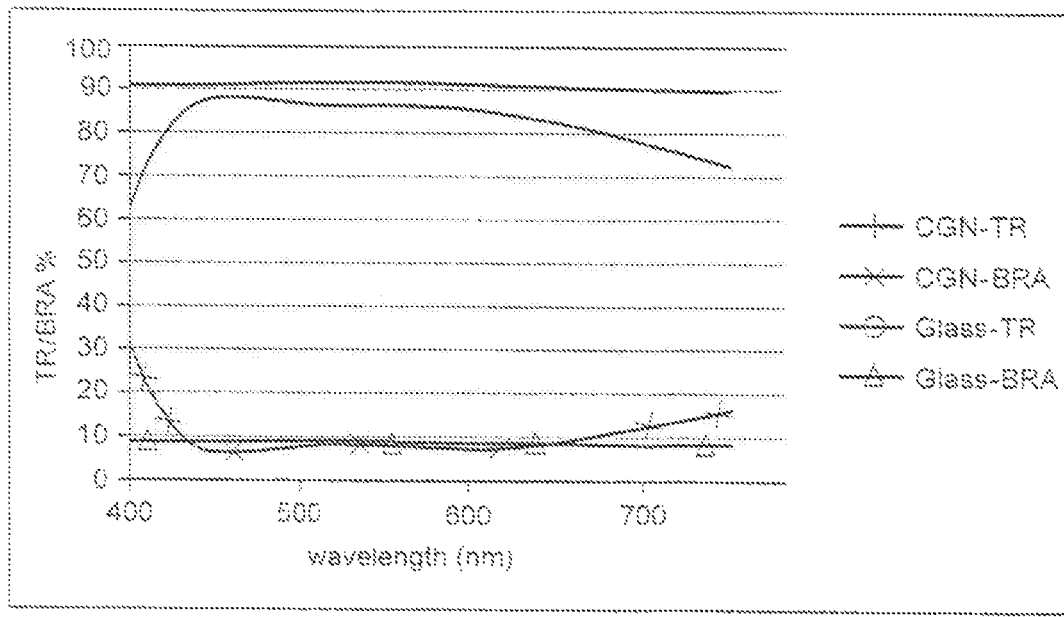
FIG. 8(a) is a percent visible transmission/reflectance vs. wavelength (nm) graph illustrating the visible transmission (CGN-TR or TR) and glass side visible reflection (CGN-BRA or BRA) of an example coating of FIG. 4(b) according to another example embodiment of this invention, demonstrating that it is transparent to visible light and has a glass side visible reflectance more closely matched to the reflectance of the glass substrate alone compared to the CE.
FIG. 8(b) is a percent visible transmission/reflectance vs. wavelength (nm) graph illustrating the visible transmission (CGN-TR or TR) and glass side visible reflection (CGN-BRA or BRA) of an example coating of FIG. 4(c) according to another example embodiment of this invention, demonstrating that it is transparent to visible light and has a glass side visible reflectance more closely matched to the reflectance of the substrate compared to the CE.
Figure 8:
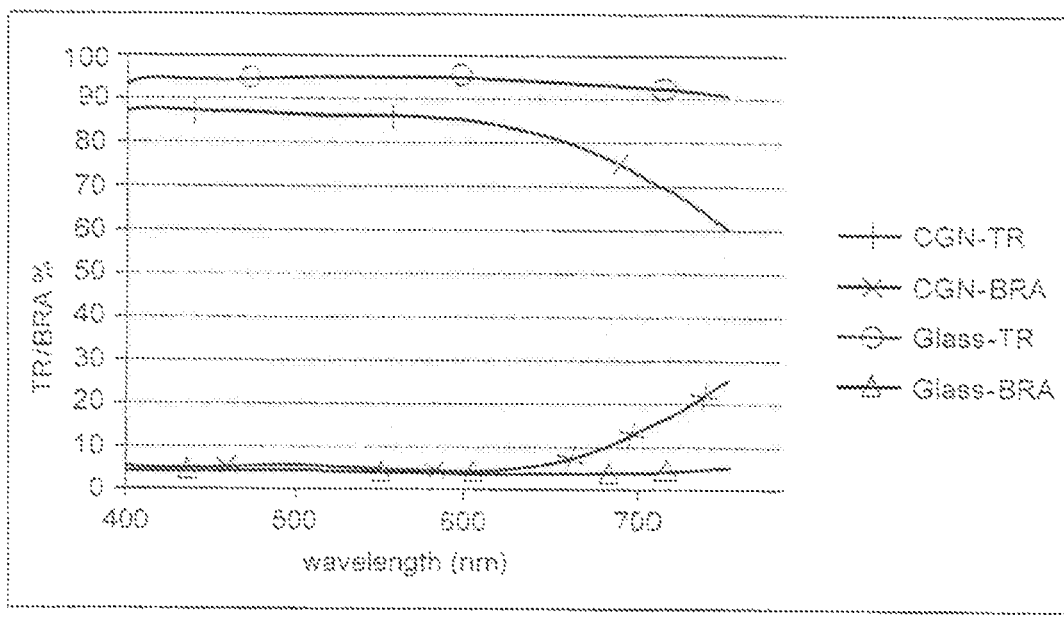

FIG. 2(a) illustrates a top or bottom plan layout of a projected capacitive touch panel according to an exemplary embodiment, that may contain the multi-layer conductive transparent coating 41 of FIGS. 4, 6, 7, and/or 8 as conductive electrode(s) x, y and/or conductive trace(s) 22. Referring to FIG. 2(a), touch panel 20 is provided. Touch panel 20 includes a matrix of electrodes x, y including n columns and m rows, provided on a substrate 40 such as a glass substrate. The glass substrates may also include an antireflective (AR) layer in certain example embodiments. The matrix of row/column electrodes x, y may be provided on the side of the substrate (e.g., glass substrate 40) that is opposite the side touched by person(s) using the touch panel, in order to prevent corrosion of the silver-based coating 41 by human finger touches. In other words, when the touch panel is touched by a finger, stylus, or the like, the glass substrate 40 is typically located between (a) the finger and (b) the matrix of row/column electrodes x, y and conductive traces 22. However, in certain embodiments the matrix of row/column electrodes x, y and traces may be provided on the side of the substrate (e.g., glass substrate 40) that is touched by person(s) using the touch panel, such as in shower door application, glass wall applications, and/or the like, for example in situations where only one glass substrate is provided. Change in capacitance between adjacent row and column electrodes in the matrix as a result of the proximity of a finger or the like is sensed by the electronic circuitry, and the connected circuitry can thus detect where the panel is being touched by a finger or the like. For example, referring to FIG. 2(a), row 0 includes row electrodes $x_{0,0}$, $x_{1,0}$, $x_{2,0}$, etc., through $x_{n,0}$ and columns 0, 1 and 2 respectively include column electrodes $y_0$, $y_1$, $y_2$, etc., through $y_n$. Optionally, the x electrodes in a column direction may also be grouped for column sensing. The number of row and column electrodes is determined by the size and resolution of the touch panel. In this example, the top-right row electrode is $x_{n,m}$. Each row electrode $x_{0,0}$-$x_{n,m}$ of touch panel 20 is electrically connected to interconnect area 21 and corresponding processing circuitry/software by a conductive trace 22. Each column electrode $y_0$-$y_n$ is also electrically connected to interconnect area 21 and corresponding processing circuitry/software, either directly or by a conductive trace. The conductive traces 22 are preferably formed of the same transparent conductive material (multilayer conductive transparent coating 41) as the row and column electrodes (e.g., same material as at least row electrodes $x_{0,0}$, $x_{1,0}$, $x_{2,0}$, etc.). Thus, in certain example embodiments, the matrix of row and column electrodes x, y and corresponding traces 22 can be formed on the substrate (e.g., glass substrate) 40 by forming the coating 41 (e.g., by sputter-depositing the coating 41) on the substrate 40 and by performing only one (or maximum two) photolithography and/or other patterning process in order to pattern the coating 41 into the conductive electrodes x, y and/or conductive traces 22. In certain example embodiments, the silver-inclusive coating (e.g., see example coating 41 in FIGS. 4(a)-(h)) is sputter deposited on the glass substrate 40 and is then subjected to photolithography and/or laser patterning to pattern the silver-inclusive coating 41 into traces 22, row electrodes $x_{0,0}$, $x_{1,0}$, $x_{2,0}$, $x_{0,1}$, $x_{0,2}$, $x_{0,3}$, etc. through $x_{n,m}$, and column electrodes $y_0$-$y_n$. Because the row electrodes $x_{0,0}$-$x_{n,m}$, column electrodes $y_0$-$y_n$, and traces 22 do not overlap as viewed from above/below, the row electrodes $x_{0,0}$-$x_{n,m}$, column electrodes $y_0$-$y_n$, and traces 22 may be formed on the same plane parallel (or substantially parallel) to glass substrate 40 on which the electrodes and traces are formed. And no insulating layer between electrodes x and y is needed in certain example embodiments. Significant portions of traces 22 may also be parallel (or substantially parallel) to the column electrodes in the plane parallel (or substantially parallel) to the substrate 40. Accordingly, touch panel 20 may be made via a smaller number of photolithography or laser patterning steps while achieving traces that achieve sufficient transparency and conductivity, thereby reducing production costs and resulting in a more efficient touch panel for use in a display assembly or the like.

Figure 2B:
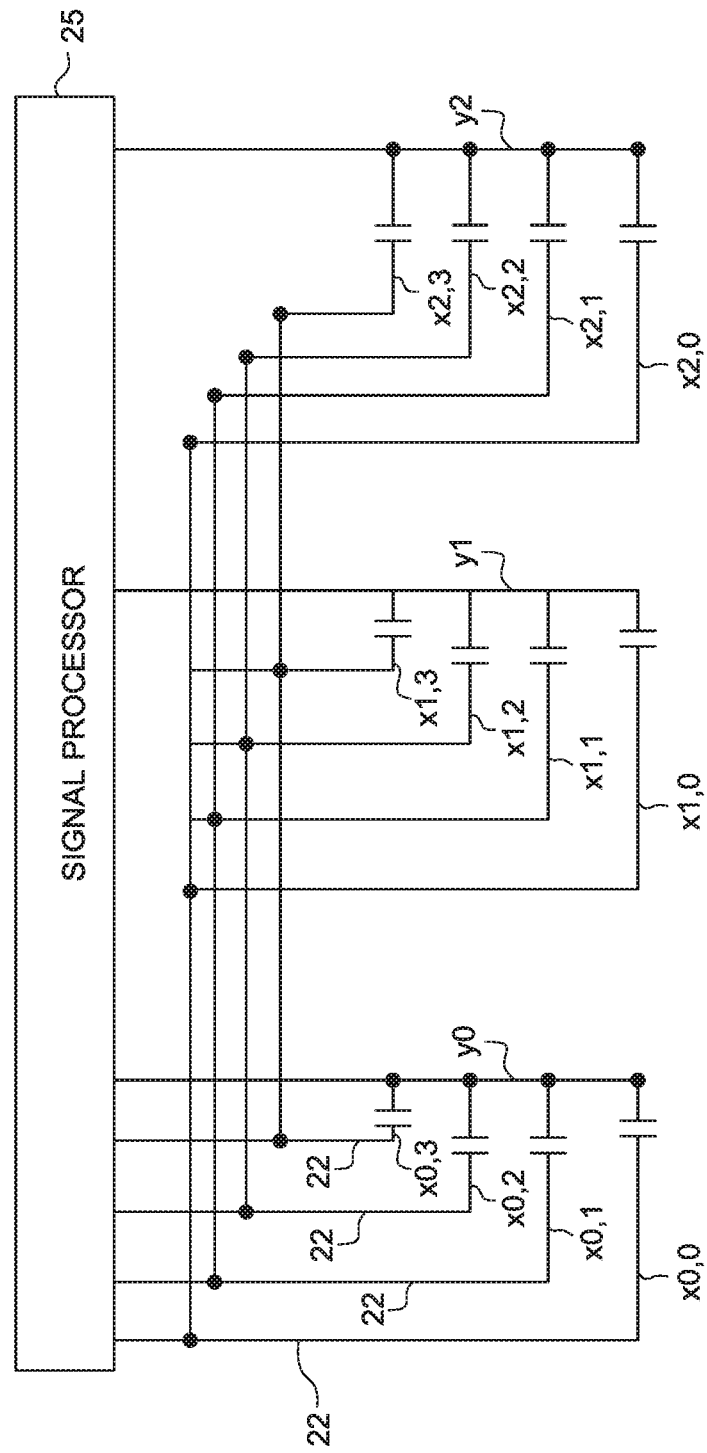
FIG. 2(b) illustrates a schematic representation of circuitry for the projected capacitive touch panel of FIG. 2(a), 3, 9, and/or 10.

FIG. 2(b) illustrates a schematic representation of circuitry for the touch panel 20 illustrated in FIG. 2(a), according to exemplary embodiments. In touch panel 20, there is a capacitance between each row electrode and the adjacent column electrode (for example, between row electrode $x_{0,0}$ and column electrode $y_0$). This capacitance can be measured by applying a voltage to a column electrode (for example, column electrode $y_0$) and measuring the voltage of an adjacent row electrode (for example, row electrode $x_{0,0}$). When a user brings a finger or conductive stylus close to touch panel 20, changes in the local electrostatic field reduce the mutual capacitance. Thus, one may be considered a transmit electrode $y_0$ and the other a receive electrode $x_{0,0}$. The capacitance change at individual points on the surface can be measured by measuring each pair of row electrodes and column electrodes in sequence. The traces 22 of each row electrode in the same row (for example, the traces 22 of row electrodes $x_{0,0}$, $x_{1,0}$, $x_{2,0}$, etc., through $x_{n,0}$ of row 0) may be electrically connected together (as shown in FIG. 2(b)). The interconnection of the first row segments to each other, second row segments to each other, etc., may be made on a flexible circuit(s) attached at the periphery of the touch panel in the interconnection area, so that no cross-overs are needed on the glass substrate 40. In that instance, a voltage is applied to a column electrode and the voltage of each row is measured in sequence before the process is repeated with a voltage applied to another column. Alternatively, each trace 22 may be connected to signal processor 25 and the voltage of each trace 22 may be measured individually. The same capacitance may be measured by applying a voltage to a row electrode and measuring the voltage on an adjacent column electrode rather than applying a voltage to a column electrode and measuring the voltage of an adjacent row electrode. Signal processing (for example, applying and measuring voltages, measuring the capacitance between adjacent electrodes, measuring changes in capacitance over time, outputting signals in response to user inputs, etc.) may be performed by signal processor 25. Signal processor 25 may be one or more hardware processors, may include volatile or non-volatile memory, and may include computer-readable instructions for executing the signal processing. Signal processor 25 is electrically connected to the column electrodes $y_0$-$y_n$ and electrically connected to the row electrodes $x_{0,0}$-$x_{n,m}$ through the traces 22. Signal processor 25 may or may not be located on the same plane as row electrodes $x_{0,0}$-$x_{n,m}$, column electrodes $y_0$-$y_n$, and traces 22 (for example, in interconnect area 21 of FIG. 2(a)).

Figure 3A:
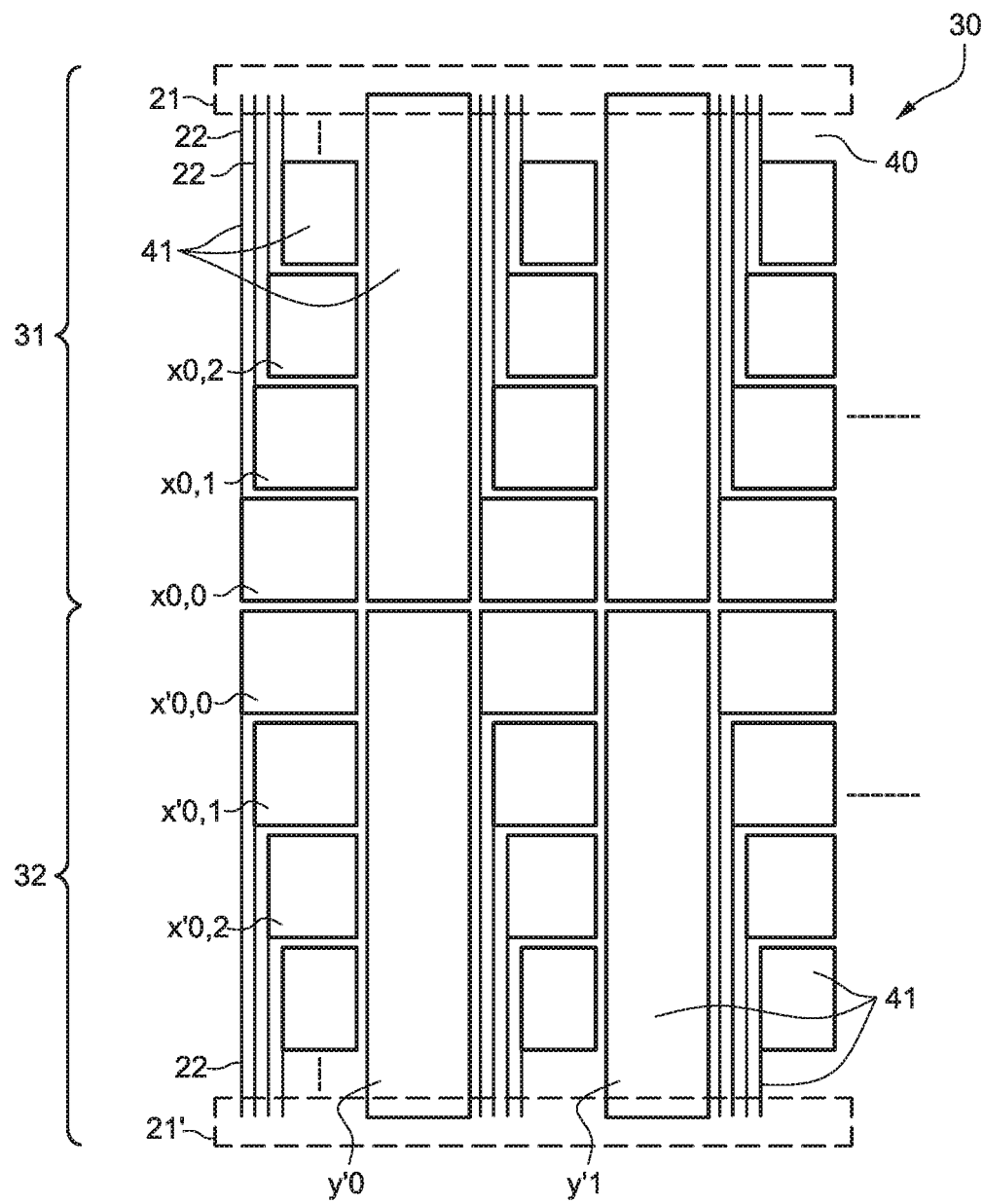
FIG. 3(a) illustrates a top or bottom plan layout of a projected capacitive touch panel according to another example embodiment, that may contain the coating(s) of FIGS. 4, 6, 7, and/or 8 as conductive electrode(s) and/or conductive trace(s).

FIG. 3(a) illustrates a top or bottom plan layout of a projected capacitive touch panel according to another example embodiment, that includes the coating 41 of any of FIGS. 4(a)-(h), 6, 7, and/or 8 patterned to form the conductive electrode(s) x, y and/or conductive trace(s) 22. Referring to FIG. 3(a), touch panel 30 is similar to touch panel 20 of FIG. 2(a), except that touch panel 30 is divided into upper section 31 and lower section 32, each of which includes a matrix of electrodes x, y including n columns and m rows. For example, row 0 of upper section 31 includes row electrodes $x_{0,0}$, $x_{1,0}$, $x_{2,0}$, etc., through $x_{n,0}$. Upper section 31 also includes column electrodes $y_0$, $y_1$, $y_2$, etc., through $y_n$. Likewise, lower section 32 would also include row electrodes, and column electrodes $y_0$-$y_n$ that may be electrically separate from the column electrodes $y_0$-$y_n$ of the upper section 31. Thus, lower section 32 also includes a matrix of row electrodes including n columns and m rows, and n column electrodes. Lower section 32 may have more or less rows than upper section 31 in different example embodiments. The number of row and column electrodes of touch panel 30 is determined by the size and resolution of the touch panel. Each column electrode of upper section 31 is electrically connected to interconnect area 21, and each row electrode of upper section 31 is electrically connected to interconnect area 21 by a trace 22. As with the FIG. 2 embodiment, traces may or may not be used for connecting the column electrodes of upper section 31 to the interconnect area. Each column electrode of lower section 32 is electrically connected to interconnect area 21' and each row electrode of lower section 32 is electrically connected to interconnect area 21' by a trace 22. Again, traces may or may not be used for connecting the column electrodes of the lower section 32 to the interconnect area 21'. Still referring to FIG. 3(a), touch panel 30 is similar to touch panel 20 in that there is a capacitance between each row electrode and the adjacent column electrode which may be measured by applying a voltage to a column electrode and measuring the voltage of an adjacent row electrode (or, alternatively, by applying a voltage to a row electrode and measuring the voltage of an adjacent column electrode). When a user brings a finger or conductive stylus close to touch panel 30, changes in the local electrostatic field reduce the mutual capacitance. The capacitance change at individual points on the surface can be measured by measuring the mutual capacitance of each pair of row electrodes and column electrodes in sequence.

Figures 3B, 3C:
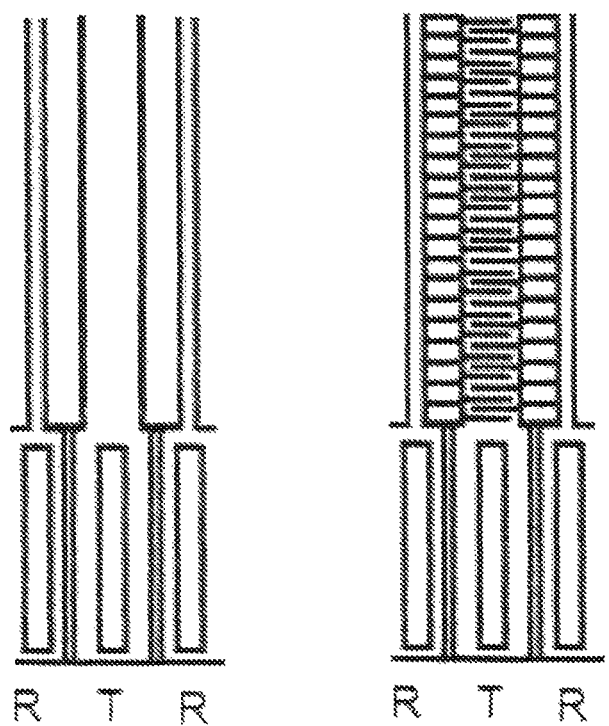
FIG. 3(b) illustrates a top or bottom plan layout of a projected capacitive touch panel electrode arrangement according to another example embodiment, that may contain the coating(s) of FIGS. 4, 6, 7, and/or 8 as conductive electrode(s) and/or conductive trace(s).
FIG. 3(c) illustrates a top or bottom plan layout of a projected capacitive touch panel electrode arrangement according to another example embodiment, that may contain the coating(s) of FIGS. 4, 6, 7, and/or 8 as conductive electrode(s) and/or conductive trace(s).

FIGS. 3(b) and 3(c) illustrate top or bottom plan layouts of a portion of a projected capacitive touch panel according to further example embodiments, that includes the coating 41 of any of FIGS. 4(a)-(h), 6, 7, and/or 8 patterned to form the conductive electrode(s) x, y and/or conductive trace(s) 22. An example electrode configuration of a pro-cap sensor may utilize a single transparent conductive coating 41 patterned into the form of parallel electrode stripes as shown in either FIG. 3(b) of FIG. 3(c). In FIG. 3(b), the electrodes stripes are fairly straight, while in FIG. 3(c) one or more of the electrode stripes may have a zig-zag shape. These electrode stripes correspond to the alternating receiving (R) and transmitting (T) electrodes connected to a driver. The driver charges the transmit/transmitting electrodes (T) with alternating current. The position of a receive/receiving electrode (R) allows the detection of the X coordinate upon touch from a finger, while the output voltage from the transmitting electrode (T) allows the detection of the Y coordinate, thus enabling the positional identification of a single touch or multiple touches. It is desirable to have a set of receiving electrodes (R) made from a material with a low sheet resistance ($R_s$), such as silver (e.g., lower $R_s$ than ITO of a similar thickness), so that the voltage drop along each electrode is minimal/reduced. It is desired, at the same time, that the transmitting electrodes (T) have a higher sheet resistance (reduced conductivity), compared to pure silver in certain coatings so there is a substantial voltage gradient along each transmit electrode to increase the noise-to-signal ratio. Thus, there are competing interests with respect to the sheet resistance of the two sets of electrodes, namely receive electrodes (R) and transmit electrodes (T). For the receive and transmit electrodes, silver-based layer 46 in a coating 41 as a substitute for the commonly used indium-tin-oxide (ITO) is desirable, for a much more conductive electrode material. The silver layer 46 may be sandwiched between at least two dielectric layers, and may use an underlayer (e.g., crystalline zinc oxide 44, which may be doped with Al for example) to attain a higher silver conductivity due to a better crystalline orientation. In this case, the low sheet resistance of silver allows large formats of the touch screen, but may sometimes be too low for effective use of transmitting electrodes. To address this discrepancy, one of the transmitting electrode(s) architectures may use a zigzag pattern as shown in FIG. 3(c) to reduce the width of each electrode, while increasing its effective length and, thus increasing its sheet resistance. Such a reduction in width, however, makes the transmitting electrode prone to defects, such as scratches, particulates, macro-inclusions, etc. Thus, in certain example embodiments of this invention, embodiments are provided reducing the conductivity of the silver layer 46 to make it conductive enough for the receiving electrodes and, at the same time, resistive enough for an effective use of the transmitting electrodes. Thus, the same silver structure may be used for conductive layer(s) 46 for both the transmit and receive electrodes in certain example embodiments. The increase in sheet resistance of the silver layer 46 may be done by one of the following methods or by their combination: (a) doping the conductive silver layer 46 with an impurity such as one or more of Zn, Pt, Pd, Ti, Al, or a combination thereof, and/or (b) replacing crystalline zinc oxide directly under the conductive silver 46 with a suitable non-crystalline dielectric [e.g., silicon oxide (e.g., $SiO_2$), silicon oxynitride, silicon nitride (e.g., $Si_3N_4$), titanium oxide (e.g., $TiO_2$), or zinc stannate], amorphous semiconductor (e.g., a-Si), or metal alloy (e.g., NiCr, NiCrMo, or the like). Doping with some impurities may help make the silver layer 46 more resistive to oxidation and/or environmental degradation.

Because the row electrodes and column electrodes x, y illustrated in FIGS. 3(a)-3(c) do not overlap in certain example embodiments, the row electrodes and column electrodes may (or may not) be formed on the same plane by patterned transparent conductive coating 41, in the manner explained above in connection with FIG. 2. Accordingly, electrode structure x, y for the touch panel 30 of any of FIGS. 3(a)-3(c) may be thin in nature and may be patterned with one process (for example, one photolithography process or one laser patterning process) which reduces the production cost of the projected capacitive touch panel.

However, in certain example embodiments, different silver structure may be used for receive electrodes compared to that used for transmit electrodes of the touch panel. This is applicable to any embodiment herein. As explained herein, referring to FIGS. 3(b)-3(g) for example, it may be desirable to have a set of receiving electrodes (R) made from a material with a low sheet resistance ($R_s$) and low resistivity, such as silver (e.g., lower $R_s$ and lower resistivity than ITO of a similar thickness) so that the voltage drop along each electrode is minimal/reduced, while at the same time it is desirable for the transmitting electrodes (T) to have a higher sheet resistance and higher resistivity (reduced conductivity), compared to pure silver in certain coatings, so there is a substantial voltage gradient along each transmit electrode (T) to increase the noise-to-signal ratio. Thus, there are competing interests with respect to the sheet resistance of the two sets of electrodes, namely receive electrodes (R) and transmit electrodes (T). Therefore, in certain example embodiments, different electrodes 41 of the touch panel may be designed to have different sheet resistances.

For example, referring to any of FIGS. 3(b)-3(g) for example, transmit electrodes (T) may have higher sheet resistance than receive electrodes (R) in certain example embodiments. For example, transmit electrodes (T) may have a sheet resistance of from about 15-50 ohms/square, more preferably from about 20-50 ohms/square, and most preferably from about 20-40 ohms/square. And receive electrodes (R) may have a sheet resistance of from about 1-14 ohms/square, more preferably from about 2-12 ohms/square, and most preferably from about 2-10 ohms/square. In certain example embodiments, the transmit electrodes (T) may have a sheet resistance at least 1 ohm/square higher, more preferably at least 5 ohms/square (more preferably at least 10, 15 or 20 ohms/square) higher, than the sheet resistance of the receive electrodes (R). This may also apply to any other embodiment herein, and may apply to some or all transmit and receive electrodes. For example, one, some, or all of the transmit electrodes (T) in any embodiment herein may be made up of a multi-layer coating 41 including a silver layer 46 that has higher sheet resistance (and thus lower conductivity) compared to pure silver in certain types of coatings, with the higher sheet resistance of the silver-based layer 46 for transmit electrodes (T) being achieved by doping the silver with an impurity such as one or more of Zn, Pt, Pd, Ti, Al or the like, and/or by replacing crystalline zinc oxide directly under and contacting the silver with another material such as a suitable non-crystalline dielectric, amorphous semiconductor, or metal alloy (e.g., NiCr) in order to increase the silver's resistance as discussed above. The receive electrodes (R) may be designed to have a lower sheet resistance than the transmit electrodes (T), such as by not doping the silver based layer 46 in the coating 41 of the receive electrodes and/or by providing them on and contacting a crystalline or substantially crystalline layer of or including zinc oxide 44 which may optionally be doped with from about 1-10%, more preferably from about 1-5% aluminum.

In other example embodiments, the different resistance of the transmit (T) and receive (R) electrodes may be achieved may making the silver-based conductive layer 46 of these respective electrodes at different thicknesses (with the same or different structure/material) in order to adjust the respective sheet resistance of each electrode based on thickness. Different thicknesses for the silver based layers 46 of the different electrodes (T) and (R) may (but need not) be used in combination with other techniques, such as doping and adjustment of the layer directly under the silver discussed herein.

Figures 3D, 3E:
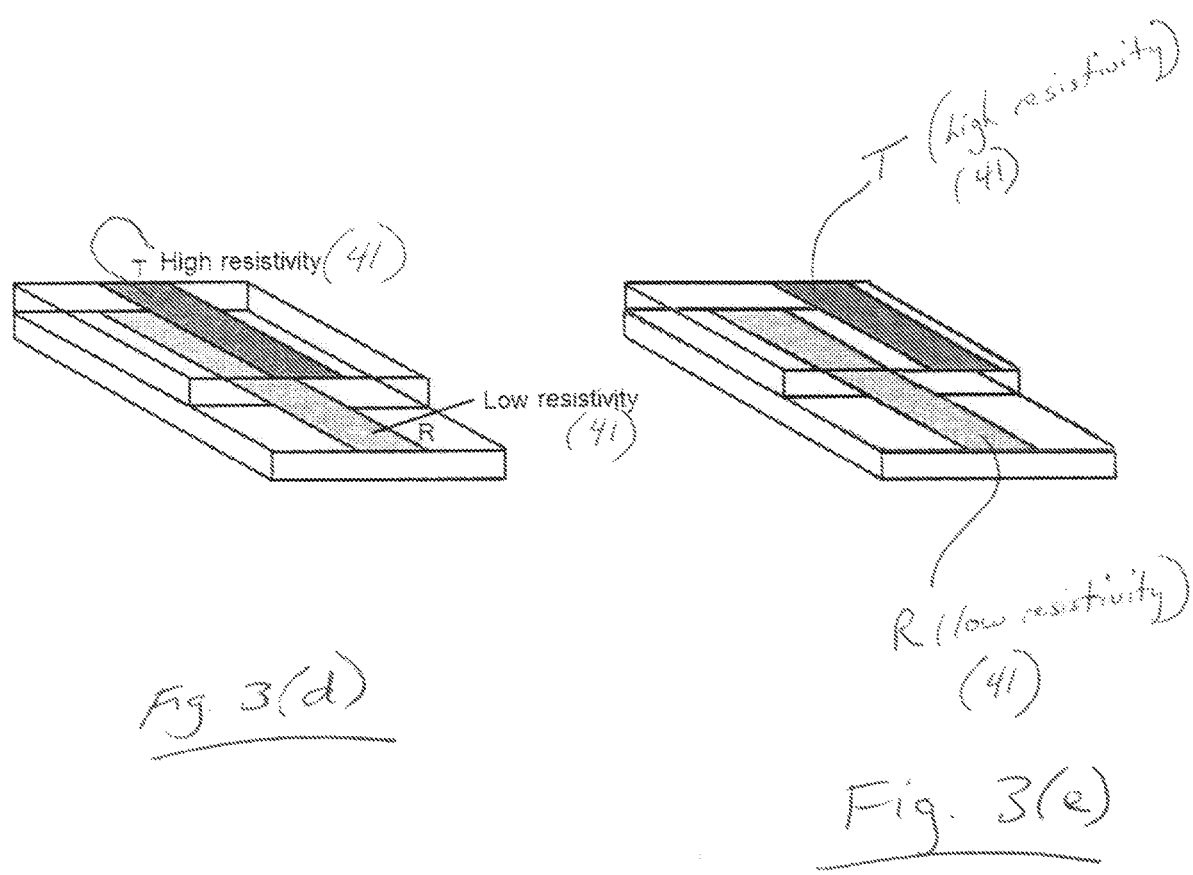
FIG. 3(d) is a perspective view of part of a capacitive touch panel electrode arrangement according to an example embodiment of this invention, where transmit electrodes have higher resistance than do receive electrodes.
FIG. 3(e) is a perspective view of part of a capacitive touch panel electrode arrangement according to an example embodiment of this invention, where transmit electrodes have higher resistance than do receive electrodes.
Figure 4A:
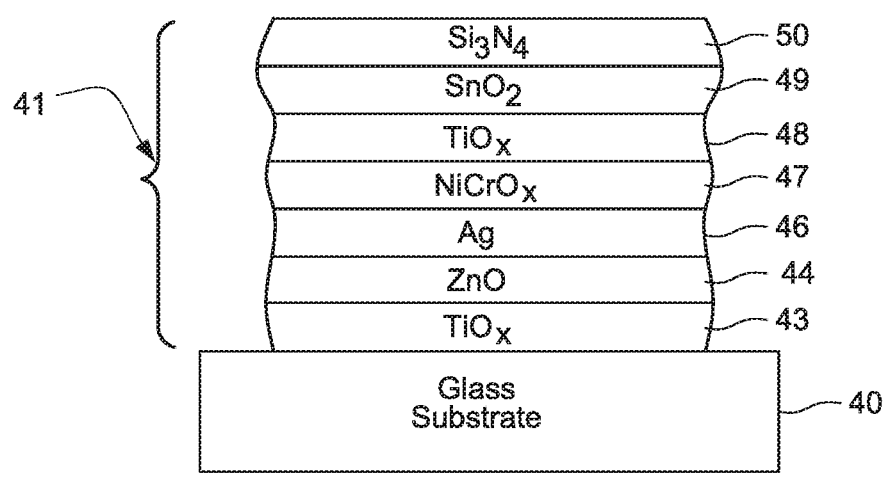

FIG. 3(d) illustrates an example embodiment where the transmit (T) and receive (R) electrodes, with their different respective sheet resistances, are parallel and overlap one another. Thus, the (T) and (R) electrodes are on different planes in the FIG. 3(d) embodiment. In the FIG. 3(d) embodiment, the (T) and (R) electrodes may be formed using different multi-layer coatings 41, or alternatively a single multi-layer coating 41 with two different silver based layers 46 having different resistance may be used to form overlapping (T) and (R) electrodes. In embodiments where the (T) and (R) electrodes are formed using a single multi-layer coating 41 with two different silver based layers 46, the double silver multi-layer coating may be formed, for example, by repeating the layer stacks of any of FIGS. 4(a)-4(h) on top of the illustrated coating so as to provide a coating including two silver based layers 46. For instance, referring to FIG. 4(a), a double silver coating 41 could be made up of the following layers moving outwardly from the glass substrate 40: 40/43/44/46/47/48/49/50/43/44/46/47/48/49/50. Referring to FIG. 4(f), a double silver coating 41 may be formed of the following layers moving away from the glass substrate 40: 40/61/101/46/47/50/61/101/46/47/50, as another example. In each of these example double silver coatings, the bottom conductive silver based layer 46 may be used for one of the electrodes (transmit or receive), and the top silver based layer 46 may be used for the other of the electrodes—this is particularly useful in embodiments such as FIG. 3(d) where the T and R electrodes are parallel, overlap, and are directly over each other.

FIG. 3(e) illustrates an example embodiment where the transmit (T) and receive (R) electrodes, with their different respective sheet resistances, are parallel and do not overlap one another. Thus, the (T) and (R) electrodes may be in the same plane, or on different planes, in the FIG. 3(d) embodiment. In the FIG. 3(e) embodiment, since the transmit and receive electrodes do not overlap, the (T) and (R) electrodes may be formed using different multi-layer coatings 41. In FIGS. 3(d)-(e) for example, the transmit and receive electrodes may generally be of the same shape in certain example embodiments, and may be formed via the same or different patterning steps. While the transmit and receive electrodes are parallel or substantially parallel to each other in FIGS. 3(d)-(e), in other example embodiments the transmit and receive electrodes of the touch panel may be perpendicular to each other and overlap each other.

Figure 3F:
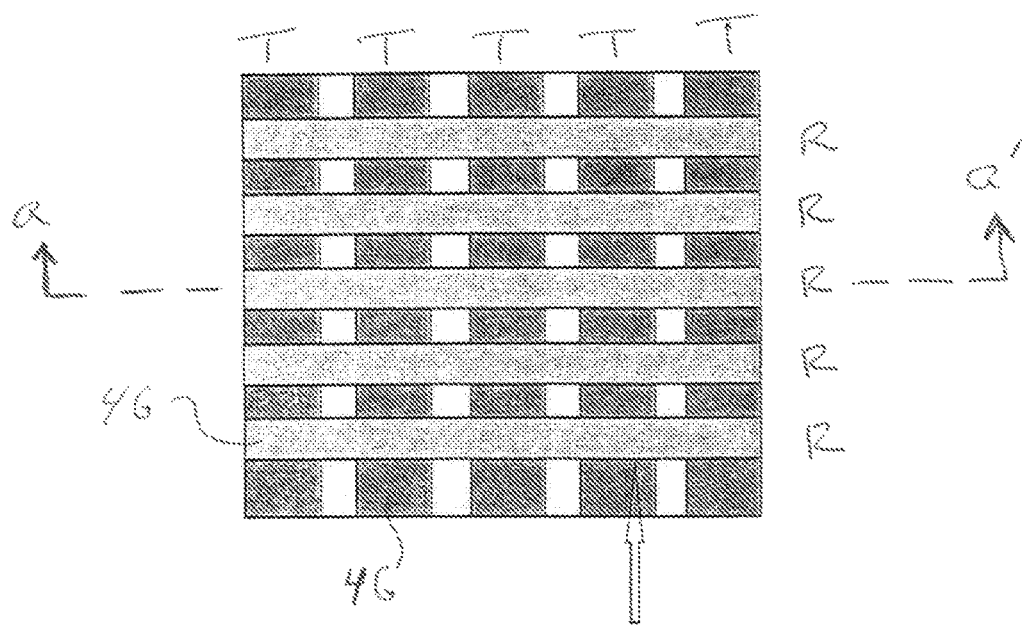
FIG. 3(f) is a top view of part of a capacitive touch panel electrode arrangement according to an example embodiment of this invention, where transmit electrodes and receive electrodes overlap and are substantially orthogonal to one another on different planes.
Figure 3G:
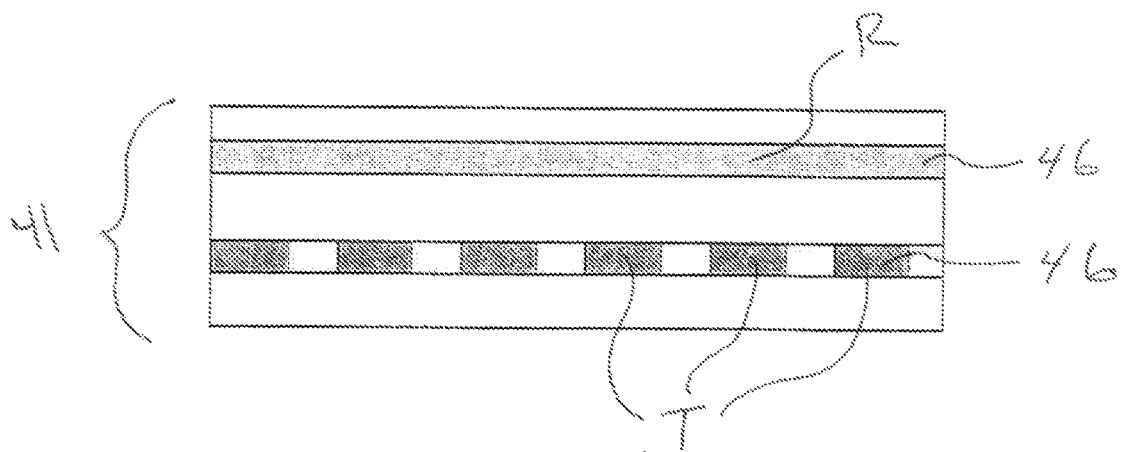
FIG. 3(g) is a cross sectional view of the capacitive touch panel electrode arrangement of FIG. 3(f) along sectional line a-a'.

FIG. 3(f) is a top view of part of a capacitive touch panel electrode arrangement according to an example embodiment of this invention, where transmit electrodes (T) and receive electrodes (R) overlap and are substantially orthogonal to one another on different planes. And FIG. 3(g) is a cross sectional view of the capacitive touch panel electrode arrangement of FIG. 3(f) along sectional line a-a', where transmit electrodes and receive electrodes overlap and are substantially orthogonal to one another on different planes. The supporting glass substrate 40, that supports the electrodes, is not shown in FIGS. 3(f)-(g) for purposes of simplicity.

Figure 4B:
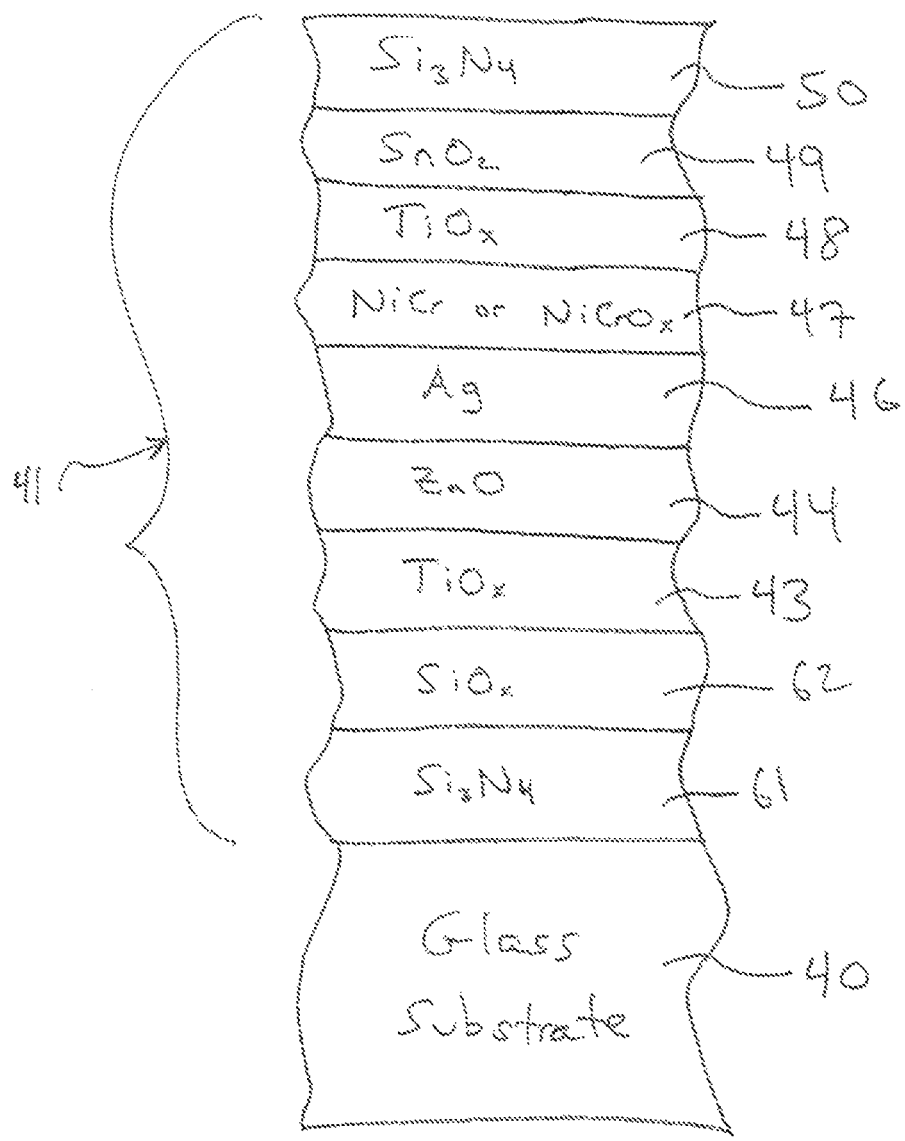
Figure 4C:
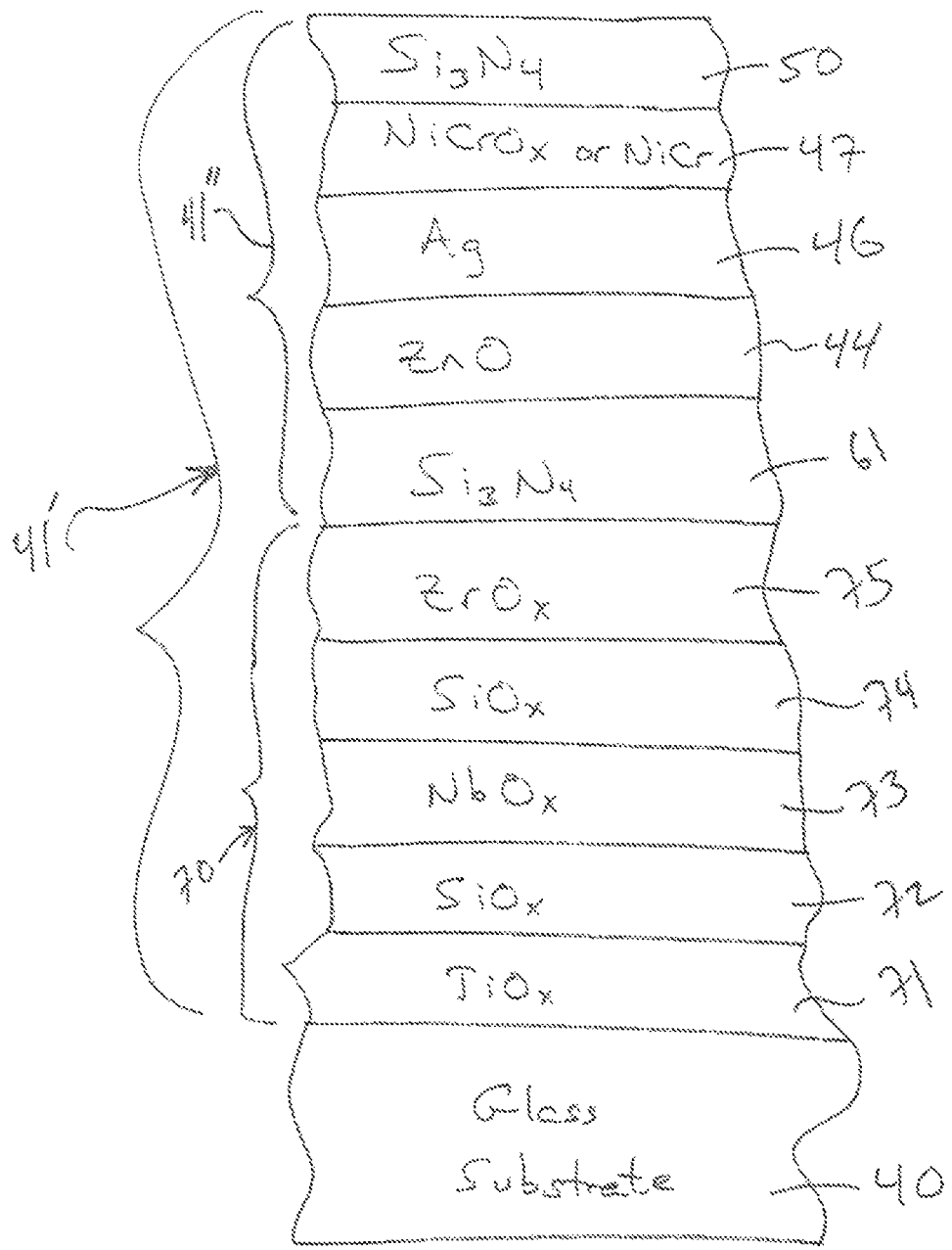
Figure 4E:
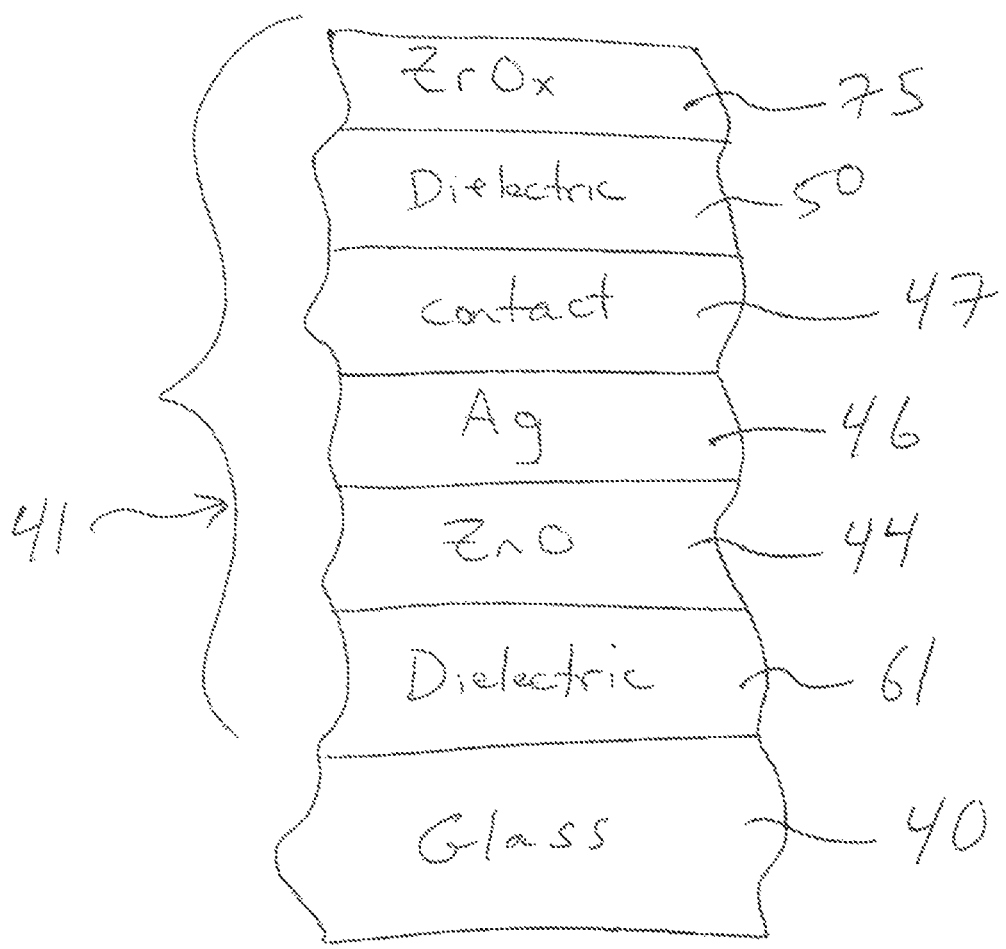
Figure 4H:
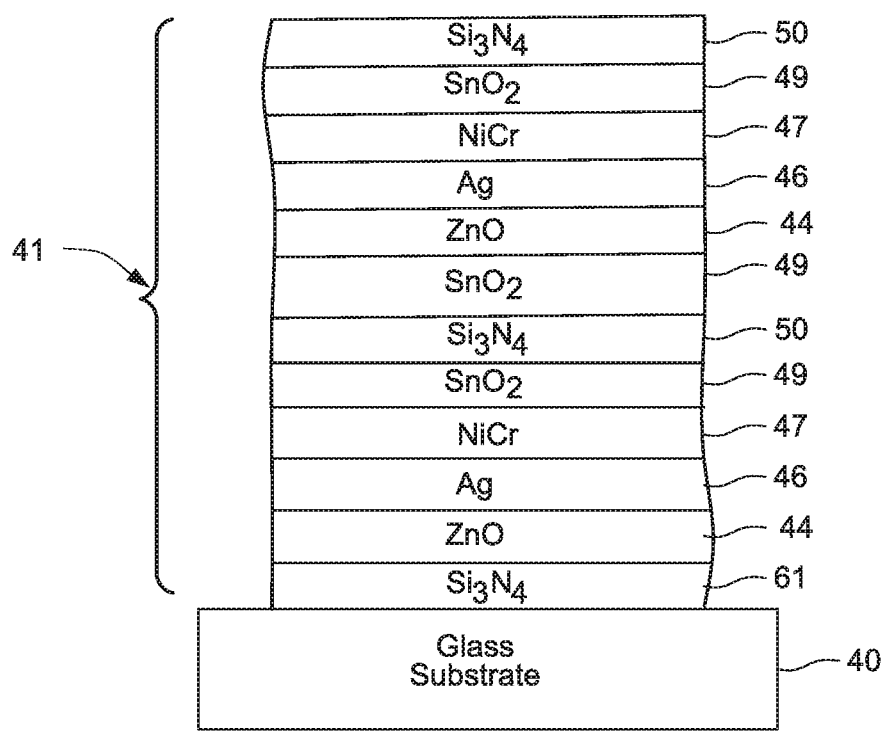

Referring to FIGS. 3(f)-3(g), for example, the transmit electrodes (T) and the receive electrodes (R) may be formed from different silver based layers 46 in the same multi-layer coating 41 in certain example embodiments of this invention (e.g., see FIG. 4(h) or double silver coating stacks discussed herein with respect to any of FIGS. 4(a)-(g)). For example, the transmit electrodes (T) in FIGS. 3(f)-(g) may be formed between the supporting glass substrate 40 and the overlying receive electrodes (R), and the conductors of the transmit electrodes (T) may be formed using the lower silver based layer 46 in the double silver coating of FIG. 4(h) whereas the conductors of the overlying receive electrodes (R) may be formed using the upper silver based layer 46 in the double silver coating of FIG. 4(h). The double silver coating of FIG. 4(h) is used for purposes of example, and other double silver coatings may be used for this purpose, whether disclosed herein or not. Thus, in such embodiments, the transmit electrodes (T) and the receive electrodes (R) may be formed from different silver based layers 46 of the same multi-layer coating 41. In such example embodiments, the transmit electrodes (T) and the receive electrodes (R) are patterned in different steps so as to be patterned into different forms—for example in FIG. 3(f) the transmit electrodes (T) are patterned into column electrodes extending in the y direction while the receive electrodes (R) are patterned into row electrodes extending in the x direction. For example, the transmit electrodes (T) may be patterned into column electrodes extending in the y direction by laser scribing/ablation in a first patterning step, and the receive electrodes (R) may be patterned into row electrodes extending in the x direction by laser scribing/ablation in a second patterning step. Laser scribing, for example, is used to cut through at least the desired silver based layer(s) during patterning.

Mutual capacitance sensors, such as those discussed herein, use a principle of charging at least some electrodes with alternating current and interpreting a change in their capacitance as a touch. Herein, it is discussed to use thin silver (Ag) as a substitute for the ITO, at least because silver has a superior conductivity compared to the ITO as well as a high visible optical transmission. Silver, however, is more susceptible to damage than ITO when exposed to certain chemicals. Thus, it is sometimes desirable to pattern silver using laser patterning techniques, as opposed to conventional photolithography. In certain example embodiments, such as shown in FIGS. 3(f)-(g), it would be desirable to arrange respective sets of transmitting (T) and receiving (R) electrodes of a silver-based mutual capacitance touch sensor in an X-Y configuration using a patterning process on a completed layer stack (e.g., see the multi-layer coating of FIG. 4(h)), preferably by laser scribing. An issue is that to define the two sets of X-Y electrodes—transmitting and receiving—provided in two parallel planes as an orthogonal matrix faces a challenge of scribing the electrodes in the X direction without damaging the underlying electrodes oriented along the Y direction, or vice versa. Thus, in an example embodiment, various wavelengths are used to pattern the two sets of electrodes (T and R) independently. In another example embodiment, the two sets of electrodes are patterned from different sides of the supporting glass substrate 40 either using the same wavelength or using at least two different wavelengths.

In certain example embodiments, different electrodes of the touch panel may be formed by different silver based layers 46 of the same or different multi-layer coatings. In patterning the electrodes (T) and (R), different laser scribing wavelengths may be used to pattern different respective silver based layers 46, of the same or different multi-layer coating(s) 41, in certain example embodiments. For example, when first (e.g., transmit) and second (e.g., receive) electrodes of the touch panel overlap each other (e.g., see FIGS. 3(f)-(g)), a first laser scribing wavelength may be used when patterning the first silver based layer 46 into the first electrode(s), and a second laser scribing wavelength may be used when patterning the second silver based layer 46 into the second electrode(s). For example, transmit electrodes (T) in FIGS. 3(f)-(g) may be laser patterned using a first wavelength(s), and receive electrodes (R) in FIGS. 3(f)-(g) may be laser patterned using a different second wavelength(s). Advantageously, the use of the different wavelengths reduces damage to electrode(s) not intended to be patterned in a given procedure.

In certain example embodiments, when different electrodes of the touch panel may be formed by different silver based layers 46 of the same or different multi-layer coatings 41, a first set of electrodes (e.g., T) may be patterned by laser scribing from a first side of the supporting glass substrate 40, whereas a second set of electrodes (e.g., R) may be patterned by laser scribing from an opposite second side of the supporting glass substrate 40. Thus, since the transmit and receive electrodes are on the same side of the glass substrate 40, one of the two laser patterning procedures is performed through the supporting glass substrate 40. For example, referring to FIGS. 3(f)-(g) and 4(h), transmit electrodes (T) may be laser patterned from a first side of the supporting glass substrate 40, whereas receive electrodes (R) may be laser patterned form the opposite second side of the supporting glass substrate 40 so that the laser beam for patterning the receive electrodes (R) passes through the glass substrate 40. Advantageously, this technique reduces damage to electrodes not intended to be patterned in a given laser patterning procedure. The embodiment involving laser patterning of different electrodes from opposite sides of the supporting glass substrate may, or may not, be used in combination with the embodiment using different wavelengths to pattern different electrodes.

As explained in connection with FIGS. 14(a)-14(b), it has been found that the upper Ag layer 46 in a double silver coating such as shown in FIG. 4(h) is more optically absorbent in the wavelength range of 800-900 nm, while the maximum absorption of the bottom silver layer 46 is shifted to shorter wavelengths. Optimizing the double-silver layer stack allows a better differentiation between the absorption maxima of the two silver layers 46. FIG. 14(b) shows a much greater difference in optical absorption between the top and the bottom silver layers of the FIG. 4(h) coating stack at about 770 nm and much less difference at about 580 nm. This differentiation allows a selective laser scribing of the two conductive silver based layers 46 either from one side (top of the stack, for instance) or from both sides—e.g., the stack side for the top silver and the glass side for the bottom silver layer.

A capacitive touch sensor comprising two Ag separated by at least one non-Ag layer and sandwiched between at least two dielectric layers supported by a substrate and patterned to form two independent sets of transmitting and receiving electrodes substantially parallel to each other and to the substrate, wherein the receiving and transmitting electrodes are formed in the different Ag layers and the two sets of electrodes are orthogonal to each other; the two sets of electrodes are formed by scribing using a laser or lasers with at least two different wavelengths selected to be absorbed preferentially by each of the Ag layers. For example, the bottom silver based layer 46 in the FIG. 4(h) coating may be laser scribed using a laser wavelength of from about 400-620 nm (more preferably from about 500-600 nm) in order to pattern that layer 46 into the transmit electrodes (T) shown in FIGS. 3(f)-(g) or any other embodiment herein. The laser patterning of the bottom silver based layer 46 in the FIG. 4(h) to form the transmit electrodes (T) shown in FIGS. 3(f)-(g) may be done by directing the laser beam through the glass substrate 40. On the other hand, the upper silver based layer 46 in the FIG. 4(h) coating may be laser scribed using a laser wavelength of from about 630-1200 nm (more preferably from about 650-1100 nm, and most preferably from about 700-1000 nm) in order to pattern that layer 46 into the receive electrodes (R) shown in FIGS. 3(f)-(g) or any other embodiment herein. The laser patterning of the upper silver based layer 46 in the FIG. 4(h) to form the overlying receive electrodes (R) shown in FIGS. 3(f)-(g) may be done by directing the laser beam from above the coating 41 so that the laser beam reaches the silver layer 46 before the glass substrate 40. The use of the different wavelength can be advantageous in reducing damage to the silver layer not intended to be patterned in a given patterning procedure, as can the use of lasers from opposite sides of the glass substrate. In certain example embodiments, each of the two resulting electrodes may have a sheet resistance of from about 2-40 ohms/square, more preferably from about 2-20 ohms/square.

As one of ordinary skill in the art would recognize, touch panels 20 and 30 described are not limited to the orientations described above and shown in FIGS. 2-3. In other words, the terms "row," "column" "x-axis," and y-axis as used in this application are not meant to imply a specific direction. Touch panel 20 of FIG. 2(a), for example, may be modified or rotated such that interconnect area 21 is located in any part of touch panel 20.

In the FIG. 2-3 embodiments, narrow transparent conductive traces (e.g., 22) may be routed to electrically connect electrodes to interconnect area 21 (and interconnect area 21'). Because of the large resistance of the narrow ITO traces, narrow ITO traces may only been used in small touch panels, such as for smart phones. To use one of the layouts illustrated in FIGS. 2(a) and 3 on larger touch panels (for example, measuring more than 10 inches diagonally) or otherwise, a transparent conductive coating 41 with lower sheet resistance (compared to ITO at like thickness) is used. The silver inclusive coating 41 shown in FIG. 4 (any of FIGS. 4(a)-(h)) for use in forming the electrodes and traces of FIGS. 2-3 is advantageous in this respect because it has a much lower sheet resistance (and thus more conductivity) than typical conventional ITO traces/electrodes.

Examples of multilayer silver-inclusive transparent conductive coatings (TCC) 41 with low sheet resistance, for forming any and/or all of the conductive electrodes and/or conductive traces of FIGS. 2-3 are illustrated in FIG. 4 (FIGS. 4(a)-4(h)) according to exemplary embodiments of this invention. The low sheet resistance and high transparency of the TCC 41 allow the TCC to form the long narrow traces 22 as well as the row and column electrodes x, y and/or transmit/receive electrodes for example.

Referring to FIG. 4(a), multilayer transparent conductive coating 41 in an example embodiment is provided, either directly or indirectly, on substrate 40. Substrate 40 may be, for example, glass. In alternative embodiments discussed below, an antireflective (AR) coating may be provided between the substrate 40 and the coating 41. Coating 41 may include, for example, a dielectric high index layer 43 of or including a material such as titanium oxide or niobium oxide, which may include titanium oxide (e.g., $TiO_2$ or other suitable stoichiometry); a dielectric layer of or including zinc oxide 44, optionally doped with aluminum, to be in contact with the silver-based layer; a silver-based conductive layer 46 on and directly contacting the zinc oxide based layer 44; an upper contact layer 47 including nickel and/or chromium or other suitable material which may be oxided and/or nitrided, that is over and contacting the silver-based conductive layer 46; a dielectric high index layer 48 of or including a material such as titanium oxide or niobium oxide, which may include titanium oxide (e.g., $TiO_2$ or other suitable stoichiometry); a dielectric layer 49 of or including tin oxide (e.g., $SnO_2$); and a dielectric layer 50 of or including silicon nitride and/or silicon oxynitride which may be doped with from 1-8% Al for example. Each of the layers in the coating 41 is designed to be substantially transparent (e.g., at least 70% or at least 80% transparent) to visible light. The dielectric high index layer 43 may be fully oxidized or sub-stoichiometric in different example embodiments. The silver layer 46 may or may not be doped with other materials (e.g., Pd, Pt, Zn, Ti and/or Al) in certain example embodiments, as discussed herein. Instead, of zinc oxide, layer 44 may be of or include Upper contact layer 47 may be of or include materials such as NiCr, $NiCrO_x$, $NiCrN_x$, $NiCrON_x$, NiCrMo, $MiCrMoO_x$, $TiO_x$, or the like. The zinc oxide of layer 44 directly under the conductive silver 46 may be replaced with an amorphous or substantially amorphous dielectric [e.g., silicon oxide (e.g., $SiO_2$), silicon oxynitride, silicon nitride (e.g., $Si_3N_4$), titanium oxide (e.g., $TiO_2$), or zinc stannate], an amorphous semiconductor (e.g., a-Si), or a metal alloy (e.g., NiCr, NiCrMo, or the like) as layer 44, in order to adjust the conductivity of the silver based layer 46 as discussed herein.

The coating 41 is designed to achieve good conductivity via conductive silver based layer 46, while optionally at the same time to reduce visibility by more closely matching is visible reflectance (glass side and/or film side visible reflectance) to the visible reflectance of the supporting substrate 40. Note that the glass side visible reflectance is measured from the side of the coated glass substrate opposite the coating, whereas the film side visible reflectance is measured from the side of the coated glass substrate having the coating. Substantial matching of the visible reflectance of the coating 41 and the visible reflectance of the supporting glass substrate 40 reduces visibility of the electrodes and traces formed of the coating material 41. Surprisingly and unexpectedly, it has been found that adjusting certain dielectric thicknesses of the FIG. 4(a) coating can surprising improve (reduce) the visibility of the coating 41 and thus make the patterned electrodes and traces of the touch panel less visible to users and therefore more aesthetically pleasing.

While various thicknesses and materials may be used in layers in different embodiments of this invention, example thicknesses and materials for the respective sputter-deposited layers of coating 41 on the glass substrate 40 in the FIG. 4(a) embodiment are as follows, from the glass substrate outwardly:

TABLE 1

FIG. 4(a) Transparent Conductive Coating

| Ref | Material | Preferred Thickness (Å) | More Preferred Thickness (Å) | Example Thickness (Å) |
|---|---|---|---|---|
| 43 | $TiO_x$ | 130-185 | 150-185 | 177 |
| 44 | ZnO | 50-140 | 60-100 | 83 |
| 46 | Ag | 90-160 | 115-140 | 124 |
| 47 | NiCrOx | 15-50 | 15-30 | 20 |
| 48 | $TiO_x$ | 10-60 | 15-35 | 23 |
| 49 | $SnO_2$ | 80-220 | 110-150 | 130 |
| 50 | $Si_xN_y$ | 300-400 | 300-320 | 305 |

It is noted that the above materials for coating 41 in the FIG. 4(a) embodiment are exemplary, so that other material(s) may instead be used and certain layers may be omitted in certain example embodiments. This coating has both low sheet resistance, and has layers designed to reduce visibility of the coating 41 on the supporting glass substrate 40. In certain exemplary embodiments, glass substrate 40 with coating 41 thereon may be heat treated (e.g., thermally tempered), e.g., after coating, or chemically strengthened before coating.

In FIGS. 4(a)-(h), silver-inclusive coating 41 is inexpensive, has a low sheet resistance (preferably less than 40 ohms/square, more preferably less than 20 ohms/square, even more preferably less than about 15 or 10 ohms/square) and maintains high visible transmittance (preferably at least 60%, more preferably at least 70%, more preferably at least 80%, and most preferably at least 84%). The coating 41 is preferably deposited on substantially the entirety of the major surface of the glass substrate 40, and then patterned to form the electrodes and/or traces. For example, the example display assembly shown in FIG. 7 includes a touch panel (20 or 30 or 50) mounted on a liquid crystal display panel (100-300). In the FIG. 7 embodiment, one or more of the row electrodes, column electrodes, and traces may be formed from coating 41 on the surface of the glass substrate 40 opposite the finger, and the touch panel (20, 30 or 50) may be adhered to the LCD panel via an index-matching adhesive layer 85. The LCD panel includes first and second substrates (e.g., glass substrates) 100, 200 with a liquid crystal layer 300 provided therebetween. In order to form a touchscreen, the touch panel 20, 30 may optionally be mounted on the LCD panel with a small air gap or bonded to the display with an index-matching adhesive 85. Thus, reference numeral 85 in FIG. 7 represents either an air gap or an index matching adhesive between the display and the touch panel. It is noted that for the measurements taken for FIGS. 5-6 and 8(a)-(b), an air gap 85 was assumed so that the coating 41 was adjacent an air gap 85. In air gap embodiments, the periphery of the substrate 40 supporting the coating 41 may be bonded to the liquid crystal panel via adhesive or any other suitable type of edge seal material.

The pixel pitch for projected capacitive touch panels may, for example, be in the range of from about 6 to 7 mm. Touch location can be determined more accurately for example, to about 1 mm, by signal processing and interpolation. If the line width/spacing for the traces 22 is approximately 10 μm to 20 μm, it can be calculated that a projected capacitive touch panel of at least 20 inches (measured diagonally) is possible for a TCC sheet resistance of about 4 ohms/square. Further optimization of the routing, signal processing and/or noise suppression allows for production of even larger touch panels (for example, up to 40 or 50 inches diagonally). This invention is also applicable to smaller touch panels in certain example embodiments.

Example 1 Vs. Comparative Example (CE)

Surprisingly and unexpectedly, it has been found that adjusting certain dielectric thicknesses of the FIG. 4(a) coating can surprisingly reduce the visibility of the coating 41 on the supporting substrate 40, and thus make the electrodes and traces of the touch panel less visible to users and therefore the overall panel more aesthetically pleasing. This is evidenced, for example, by the comparison below between a Comparative Example (CE) and Example 1 of this invention, where the coatings include from the glass substrate outwardly:

TABLE 2

Comparative Example (CE) vs. Example 1

| Ref | Material | Comparative Example (CE) Thickness (Å) | Example 1 Thickness (Å) |
|---|---|---|---|
| 43 | $TiO_x$ | 194 | 177 |
| 44 | ZnO | 83 | 83 |
| 46 | Ag | 124 | 124 |
| 47 | NiCrOx | 20 | 20 |
| 48 | $TiO_x$ | 23 | 23 |
| 49 | $SnO_2$ | 30 | 130 |
| 50 | $Si_xN_y$ | 295 | 305 |

It can be seen from Table 2 above that the only difference between Example 1 according to this invention and the Comparative Example (CE) are the thicknesses of the dielectric layers 43 and 50. Surprisingly and unexpectedly, it has been found that adjusting the thicknesses of layers 43 and 50 the coating can surprising reduce the visibility of the coating 41 areas on the supporting glass substrate 40 by more closely matching the visible reflectance (e.g., glass side visible reflectance) of the coating 41 on the glass substrate to the visible reflection of the glass substrate 40 alone, and thus make the electrodes and traces of the touch panel less visible to users and therefore more aesthetically pleasing. This is shown in FIGS. 5-6 and also in the tables below.

FIG. 5 is a percent transmission/reflectance vs. wavelength (nm) graph illustrating the visible transmission (TR) percentage and glass side visible reflection (BRA) percentage of the Comparative Example (CE) coating on a glass substrate, compared to those values for the glass substrate alone (Glass-TR, Glass-BRA). Note that FIG. 5 includes the visible spectrum, as well as some wavelength outside the visible spectrum. The line plot with the "x" through it in FIG. 5 is the glass side visible reflection of the CE coating on the glass substrate 40 (i.e., reflection taken from the side of the finger in FIG. 7), and the line plot in FIG. 5 with the triangle marking through it is the visible reflection of the glass substrate 40 alone in areas where the coating 41 is not present. The difference between these two lines is relevant, because it shows the difference in glass side visible reflection between: (a) areas of the glass substrate 40 where the CE coating is not present (i.e., in non-electrode and non-trace areas), and (b) areas of the glass substrate 40 where the CE coating is present (i.e., in electrode and trace areas). Thus, the larger the difference between these two lines (the bottom two lines in the FIG. 5 graph), the more visible the electrodes and traces are to a viewer from the point of view on the finger side in FIG. 7. It can be seen in FIG. 5 that there is a significant gap (more than 2.0 difference in reflectance percentage) between these two lines around the visible wavelength 600 nm (including on both sides thereof), meaning that the electrodes and traces on a touch panel made of the CE material will be very visible which can render a touch panel or the like aesthetically non-pleasing.

In contrast, FIG. 6 is a percent visible transmission/reflectance vs. wavelength (nm) graph illustrating the visible transmission (CGN-TR or TR) and glass side visible reflection (CGN-BRA or BRA) of the Example 1 coating of FIG. 4(a) according to an example embodiment of this invention on a glass substrate, demonstrating that it is transparent to visible light and has glass side visible reflectance more closely matched to that of the glass substrate compared to the CE in FIG. 5. FIG. 6, like FIG. 5, also illustrates the visible transmission (Glass-TR) and visible reflectance (Glass-BRA) for the glass substrate alone in areas without the coating on it. The line plot with the "x" through it in FIG. 6 is the glass side visible reflection of the Example 1 coating 41 on the glass substrate 40, and the line plot in FIG. 6 with the triangular marking through it is the visible reflection of the glass substrate 40 alone without the coating 41 on it. The difference between these two lines is relevant, because it shows the difference in visible reflection (from the point of view of the finger in FIG. 7) between (a) areas of the glass substrate and touch panel where coating 41 is not present (i.e., in non-electrode and non-trace areas), and (b) areas of the glass substrate and touch panel where the coating 41 is present (i.e., in electrode and trace areas). Thus, the larger the difference between these two lines (the bottom two lines in the FIG. 6 graph), the more visible the electrodes and traces are to a viewer. And the smaller the difference between these two lines (the bottom two lines in the FIG. 6 graph), the less visible the electrodes and traces are to a viewer. Comparing FIGS. 5 and 6 to each other, it can be seen that in FIG. 6 that there is a much smaller gap (if any) between these two lines for the visible wavelengths from about 550 nm to about 650 nm compared to the larger gap for the CE in FIG. 5, meaning that the electrodes and traces on a touch panel made of the Example 1 material (FIG. 6) will be much less visible (compared to the CE material of FIG. 5) which renders the touch panel more aesthetically pleasing. In other words, compared to the CE, Example 1 more closely matches the glass side visible reflectance of the coating 41 on the glass substrate 40 to the visible reflection of the glass substrate 40 in areas where the coating is not present, and thus make the electrodes and traces of the touch panel less visible to users and therefore more aesthetically pleasing.

The table below shows optical differences between the Comparative Example (CE) and Example 1, where at 550 nm TR is visible transmission, RA is film side visible reflectance which is measured viewing the glass/coating combination from the coating side, and BRA is glass side visible reflectance which is measured viewing the glass/coating combination from the glass side. As will be recognized by one skilled in the art, a* and b* are color values measured with respect to transmissive color [a*(TR) and b*(TR)], and glass side reflective color [a*(BRA and b*(BRA)].

TABLE 3

Comparative Example (CE) vs. Example 1
(Optical Parameters) [Ill. C 2 deg.]

| Parameter | Comparative Example (CE) on glass substrate | Example 1 on glass substrate (FIG. 4a embodiment) | Glass substrate alone |
|---|---|---|---|
| TR (%) | 88% | 85.47% | 91.7% |
| a* (TR) | −1 | −0.60 | −0.35 |
| b* (TR) | 1.5 | 1.05 | 0.18 |
| BRA(%) | 5.8% | 8.20% | 8.11% |
| a* (BRA) | −2.2 | −2.37 | −0.17 |
| b* (BRA) | −6 | −6.43 | −0.74 |

The glass side visible reflection (BRA) of the coating 41 on the glass substrate 40 for Example 1 more closely matches the visible reflection of the glass substrate 40 alone (8.20% vs. 8.11%), compared to the CE (5.8% vs. 8.11%). Thus, the patterned coating 41 on the glass substrate 40 is much less visible for Example 1 compared to the CE.

In certain example embodiments of this invention (e.g., FIGS. 2-7), the coating 41 (unlike the CE) on a glass substrate 40 has a film side visible reflectance (RA) from 550-600 nm of from 7-10%, more preferably from 7.5 to 8.5%. And in certain example embodiments of this invention, the coating 41 (unlike the CE) on a glass substrate 40 has a glass side visible reflectance (BRA) from 550-600 nm of from 7-13%, more preferably from 7-9%, and still more preferably from 7.25 to 8.75% (the BRA for the CE was only 5.8% as seen above). In certain example embodiments of this invention, unlike the CE, there is no more than a 2.0 difference (more preferably no more than a 1.5 or 1.0 difference) at 550 nm and/or 600 nm, or in the range from 550-600 nm, between: (a) the film side and/or glass side visible reflectance percentage of a coated article including the coating 41 on a glass substrate 40 (in the area where the coating 41 is present), and (b) the visible reflectance percentage of the glass substrate alone in areas where coating 41 is not present. This can be seen in FIG. 6 for example (see also FIGS. 8(a)-(b)). In contrast, for example, for the CE it can be seen from the above that there is a 2.31 difference (8.11%−5.8%=2.31) between (a) the glass side visible reflectance percentage of a coated article including the CE coating on a glass substrate 40 in the area where the coating 41 is present, and (b) the visible reflectance percentage of the glass substrate alone, which is too much of a difference and renders the electrodes and traces easily visible to viewers viewing the device from the side of the finger shown in FIG. 7. Example embodiments of this invention have reduced this difference to no more than 2.0, more preferably no more than 1.5, and most preferably no more than 1.0.

While the Comparative Example (CE) is discussed above in connection with comparison to Example 1, it is noted that the coatings of both the CE and Example 1 may be used as the electrodes and/or traces in a touch panel according to example embodiments of this invention.

In certain example embodiments, an antireflective (AR) coating may be provided between the glass substrate 40 and the coating 41 of any of FIGS. 4(a)-(h) to still more closely match the visible reflectance (glass side and/or film side) of the coating to that of the supporting substrate (glass plus AR coating). The AR coating may be applied across the entire or substantially the entire major surface of the glass substrate 40, and unlike the transparent conductive coating 41, the AR coating need not be patterned in certain example embodiments. As another optional, an AR coating may in effect be provided as a bottom portion of the coating 41 in order to add AR effect to the coating 41.

FIG. 4(b) illustrates a multilayer transparent conductive coating 41 according to another example embodiment which may be provided, either directly or indirectly, substrate 40 in any of the devices or products discussed herein (e.g., see FIGS. 2-3, 7 and 9-17). Substrate 40 may be, for example, glass or glass coated with an AR coating. Coating 41 of the FIG. 4(b) embodiment may include, for example, base dielectric layer 61 or of including silicon nitride (e.g., $Si_3N_4$ or other suitable stoichiometry), which may or may not be doped with Al and/or oxygen; low index dielectric layer 62 of or including silicon oxide (e.g., $SiO_2$ or other suitable stoichiometry) which may or may not be doped with Al and/or nitrogen; a dielectric high index layer 43 of or including a material such as titanium oxide or niobium oxide, which may include titanium oxide (e.g., $TiO_2$ or other suitable stoichiometry); a dielectric layer 44 of or including zinc oxide (optionally doped with Al) or any of the other materials discussed herein in connection with layer 44, to be in contact with the silver-based layer; a silver-based conductive layer 46 on and directly contacting the zinc oxide based layer 44; an upper contact layer 47 including nickel and/or chromium which may be oxided and/or nitrided, that is over and contacting the silver-based conductive layer 46; a dielectric high index layer 48 of or including a material such as titanium oxide or niobium oxide, which may include titanium oxide (e.g., $TiO_2$ or other suitable stoichiometry); a dielectric layer 49 of or including tin oxide (e.g., $SnO_2$); and an outer-most protective dielectric layer 50 of or including silicon nitride and/or silicon oxynitride. Each of the layers in the coating 41 is designed to be substantially transparent (e.g., at least 70% or at least 80% transparent) to visible light. The silver layer 46 may or may not be doped with other materials as discussed herein.

The coatings 41 of FIGS. 4(a)-(c) are designed to achieve good conductivity while at the same time to reduce visibility by more closely matching is visible reflectance (glass side and/or film side visible reflectance) to the visible reflectance of the supporting substrate 40. Substantial matching of the visible reflectance of the coating 41 and the visible reflectance of the supporting glass substrate 40 reduces visibility of the electrodes and traces formed of the coating material 41. While various thicknesses and materials may be used in layers in different embodiments of this invention, example thicknesses and materials for the respective sputter-deposited layers of coating 41 on the glass substrate 40 in the FIG. 4(b) embodiment are as follows, from the glass substrate outwardly:

TABLE 4

| FIG. 4(b) Transparent Conductive Coating | | | |
|---|---|---|---|
| Ref | Material | Preferred Thickness (Å) | More Preferred Thickness (Å) | Example Thickness (Å) |
| 61 | $Si_xN_y$ | 200-500 | 250-400 | 318 |
| 62 | $SiO_x$ | 200-600 | 400-500 | 440 |
| 43 | $TiO_x$ | 130-185 | 150-185 | 354 |
| 44 | ZnO | 50-140 | 60-100 | 83 |
| 46 | Ag | 90-160 | 115-140 | 124 |

TABLE 4-continued

| FIG. 4(b) Transparent Conductive Coating | | | |
|---|---|---|---|
| Ref | Material | Preferred Thickness (Å) | More Preferred Thickness (Å) | Example Thickness (Å) |
| 47 | NiCrOx | 15-50 | 15-30 | 20 |
| 48 | $TiO_x$ | 10-60 | 15-35 | 23 |
| 49 | $SnO_2$ | 80-220 | 110-150 | 130 |
| 50 | $Si_xN_y$ | 300-400 | 300-320 | 303 |

It is noted that the above materials for FIG. 4(b) coating 41 are exemplary, so that other material(s) may instead be used and certain layers may be omitted in certain example embodiments. This coating has both low sheet resistance, and has layers designed to reduce visibility of the coating 41 on the supporting glass substrate 40. In certain exemplary embodiments, glass substrate 40 with coating 41 thereon may be heat treated (e.g., thermally tempered), e.g., after coating, or chemically strengthened before coating. As with the FIG. 4(a) embodiment, the silver-based coating 41 of the FIG. 4(b) embodiment is inexpensive, has a low sheet resistance (preferably less than 15 ohms/square, more preferably less than about 10 or 5 ohms/square, with an example being approximately 4 ohms per square) and maintains high visible transmittance (preferably at least 60%, more preferably at least 70%, more preferably at least 80%, and most preferably at least 84%). The coating 41 is preferably deposited on substantially the entirety of the major surface of the glass substrate 40, and then patterned to form the electrodes and/or traces discussed herein.

Example 2 Vs. Comparative Example (CE)

Example 2 utilizes a coating according to the FIG. 4(b) embodiment. Surprisingly and unexpectedly, it has been found that the FIG. 4(b) coating can surprisingly reduce the visibility of the coating 41 on the supporting substrate 40, and thus make the electrodes and traces of the touch panel less visible to users and therefore the overall panel more aesthetically pleasing compared to the CE discussed above. This is evidenced, for example, by the comparison below between a Comparative Example (CE) and Example 2 of this invention, where the coatings include from the glass substrate outwardly:

TABLE 5

| Comparative Example (CE) vs. Example 2 | | |
|---|---|---|
| Ref | Material | Example 2 Thickness (Å) |
| 61 | $Si_3N_4$ | 318 |
| 62 | $SiO_2$ | 440 |
| 43 | $TiO_2$ | 354 |
| 44 | ZnO | 83 |
| 46 | Ag | 124 |
| 47 | NiCrOx | 20 |
| 48 | $TiO_2$ | 23 |
| 49 | $SnO_2$ | 130 |
| 50 | $Si_3N_4$ | 303 |

FIG. 5 is discussed above, and illustrates properties of the CE.

In contrast, FIG. 8(a) is a percent visible transmission/reflectance vs. wavelength (nm) graph illustrating the visible transmission (CGN-TR or TR) and glass side visible reflection (CGN-BRA or BRA) of Example 2 of this invention, demonstrating that it is transparent to visible light and has a glass side visible reflectance more closely matched to the reflectance of the glass substrate alone compared to the CE of FIG. 5. FIG. 8(a) also illustrates the visible transmission (Glass-TR) and visible reflectance (Glass-BRA) for just the glass substrate absent the coating. The line plot with the "x" through it in FIG. 8(a) is the glass side visible reflection of the Example 2 coating 41 on the glass substrate 40, and the line plot in FIG. 8(a) with the triangular marking through it is the visible reflection of the glass substrate 40 alone without the coating 41 on it. The difference between these two lines is significant, because it shows the difference in visible reflection (from the point of view of the finger in FIG. 7) between (a) areas of the glass substrate and touch panel where coating 41 is not present (i.e., in non-electrode and non-trace areas), and (b) areas of the glass substrate and touch panel where the coating 41 is present (i.e., in electrode and trace areas). Thus, the larger the difference between these two lines (the bottom two lines in the FIG. 8(a) graph), the more visible the electrodes and traces are to a viewer. And the smaller the difference between these two lines (the bottom two lines in the FIG. 8(a) graph), the less visible the electrodes and traces are to a viewer. Comparing FIGS. 5 and 8(a) to each other, it can be seen that in FIG. 8(a) that there is a much smaller gap (if any) between these two lines for the visible wavelengths from about 550 nm to about 650 nm compared to the larger gap for the CE in FIG. 5, meaning that the electrodes and traces on a touch panel made of the Example 2 material will be much less visible (compared to the CE material of FIG. 5) which renders the touch panel more aesthetically pleasing. In other words, compared to the CE, Example 2 more closely matches the glass side visible reflectance of the coating 41 on the glass substrate 40 to the visible reflection of the glass substrate 40 in areas where the coating is not present, and thus make the electrodes and traces of the touch panel less visible to users and therefore more aesthetically pleasing.

The table below shows optical differences between the Comparative Example (CE) and Example 2, where at 550 nm TR is visible transmission, RA is film side visible reflectance which is measured viewing the glass/coating combination from the coating side, and BRA is glass side visible reflectance which is measured viewing the glass/coating combination from the glass side. As will be recognized by one skilled in the art, a* and b* are color values measured with respect to transmissive color [a*(TR) and b*(TR)], and glass side reflective color [a*(BRA and b*(BRA)].

TABLE 6

Comparative Example (CE) vs. Example 2
(Optical Parameters) [Ill. C 2 deg.]

| Parameter | Comparative Example (CE) on glass substrate | Example 2 on glass substrate (FIG. 4b embodiment) | Glass substrate alone |
|---|---|---|---|
| TR (%) | 88% | 85.75% | 91.7% |
| a* (TR) | −1 | −1.05 | −0.35 |
| b* (TR) | 1.5 | −0.31 | 0.18 |
| BRA(%) | 5.8% | 7.86% | 8.11% |
| a* (BRA) | −2.2 | 0.02 | −0.17 |
| b* (BRA) | −6 | −0.33 | −0.74 |

It is relevant here that the glass side visible reflection (BRA) of the coating 41 on the glass substrate 40 for Example 2 more closely matches the visible reflection of the glass substrate 40 alone (7.86% vs. 8.11%), compared to the CE (5.8% vs. 8.11%). Thus, the patterned coating 41 on the glass substrate 40 is much less visible for Example 2 compared to the CE. As discussed above, in certain example embodiments of this invention (e.g., FIGS. 2-7), the coating 41 (unlike the CE) on a glass substrate 40 has a film side visible reflectance (RA) from 550-600 nm of from 7-10%, more preferably from 7.5 to 8.5%. And in certain example embodiments of this invention, the coating 41 (unlike the CE) on a glass substrate 40 has a glass side visible reflectance (BRA) from 550-600 nm of from 7-13%, more preferably from 7-9%, and still more preferably from 7.25 to 8.75% (the BRA for the CE was only 5.8% as seen above). As also mentioned above, in certain example embodiments of this invention there is no more than a 2.0 difference (more preferably no more than a 1.5 or 1.0 difference) at 550 nm and/or 600 nm, or in the range from 550-600 nm, between: (a) the film side and/or glass side visible reflectance percentage of a coated article including the coating 41 on a glass substrate 40 (in the area where the coating 41 is present), and (b) the visible reflectance percentage of the glass substrate alone in areas where coating 41 is not present. This can be seen in FIG. 8(a) for example (see also FIGS. 6 and 8(b)). In contrast, for example, for the CE it can be seen from the above that there is a 2.31 difference (8.11%−5.8%=2.31) between (a) the glass side visible reflectance percentage of a coated article including the CE coating on a glass substrate 40 in the area where the coating 41 is present, and (b) the visible reflectance percentage of the glass substrate alone, which is too much of a difference and renders the electrodes and traces easily visible to viewers viewing the device from the side of the finger shown in FIG. 7. Example embodiments of this invention have reduced this difference to no more than 2.0, more preferably no more than 1.5, and most preferably no more than 1.0.

FIG. 4(c) illustrates a multilayer transparent conductive coating (41' or 41", both of which may also be referred to as 41) according to another example embodiment which may be provided, either directly or indirectly, substrate 40 in any of the devices or products discussed herein (e.g., see FIGS. 2-3, 7 and 9-17). Substrate 40 may be, for example, glass. Coating 41' of the FIG. 4(c) embodiment may include, for example, an antireflective (AR) section 70 including a dielectric high index layer 71 of or including a material such as titanium oxide or niobium oxide, which may include titanium oxide (e.g., TiO$_2$ or other suitable stoichiometry); low index dielectric layer 72 of or including silicon oxide (e.g., SiO$_2$ or other suitable stoichiometry) which may or may not be doped with Al and/or nitrogen; a dielectric high index layer 73 of or including a material such as titanium oxide or niobium oxide; another low index dielectric layer 74 of or including silicon oxide (e.g., SiO$_2$ or other suitable stoichiometry) which may or may not be doped with Al and/or nitrogen, and a dielectric layer 75 of or including zirconium oxide (e.g., ZrO$_2$ or other suitable stoichiometry). The "substrate" in the FIG. 4(c) embodiment may be considered the glass 40 plus the AR section 70 of the coating, as the AR section 70 of the coating 41' need not be patterned along with the rest of the coating 41', and in such a case the transparent conductive coating of the FIG. 4(c) embodiment may be considered to be made up of just the layers 61, 44, 46, 47 and 50. In other words, in the FIG. 4(c) embodiment, the multi-layer transparent conductive coating may be considered as 41" which is made up of layers 61, 44, 46, 47 and 50, and the "substrate" may be considered to be the combination of the glass 40 and the AR coating 70.

The coating 41 of the FIG. 4(c) embodiment may further include, as section 41", dielectric layer 61 or of including silicon nitride (e.g., $Si_3N_4$ or other suitable stoichiometry), which may or may not be doped with Al and/or oxygen; a dielectric layer 44 of or including zinc oxide (optionally doped with Al) or any of the other materials discussed herein in connection with layer 44, to be in contact with the silver-based layer; a silver-based conductive layer 46 on and directly contacting the zinc oxide based layer 44; an upper contact layer 47 including nickel and/or chromium which may be oxided and/or nitrided, that is over and contacting the silver-based conductive layer 46; optionally a dielectric high index layer 48 of or including a material such as titanium oxide or niobium oxide, which may include titanium oxide (e.g., $TiO_2$ or other suitable stoichiometry); and an outer-most protective dielectric layer 50 of or including silicon nitride and/or silicon oxynitride. Each of the layers in the coating 41 of the FIG. 4(a)-(c) embodiments is designed to be substantially transparent (e.g., at least 70% or at least 80% transparent) to visible light. Silver layer 46 may or may not be doped as discussed herein.

The coating 41 of FIG. 4(c) is designed to achieve good conductivity while at the same time to reduce visibility by more closely matching is visible reflectance (glass side and/or film side visible reflectance) to the visible reflectance of the supporting substrate. Substantial matching of the visible reflectance of the coating 41 and the visible reflectance of the supporting substrate reduces visibility of the electrodes and traces formed of the coating material 41. While various thicknesses and materials may be used in layers in different embodiments of this invention, example thicknesses and materials for the respective sputter-deposited layers of coating 41 on the glass 40 in the FIG. 4(c) embodiment are as follows, from the glass outwardly:

TABLE 7

FIG. 4(c) Coating

| Ref | Material | Preferred Thickness (Å) | More Preferred Thickness (Å) | Example Thickness (Å) |
|---|---|---|---|---|
| 71 | $TiO_x$ | 40-350 | 50-250 | 100 |
| 72 | $SiO_x$ | 200-600 | 300-450 | 373 |
| 73 | $NbO_x$ | 200-2000 | 500-1500 | 1112 |
| 74 | $SiO_x$ | 200-1200 | 500-950 | 744 |
| 75 | $ZrO_x$ | 30-120 | 30-80 | 50 |
| 61 | $Si_xN_y$ | 150-500 | 200-400 | 271 |
| 44 | ZnO | 50-140 | 60-100 | 83 |
| 46 | Ag | 90-160 | 115-150 | 131 |
| 47 | NiCrOx | 15-50 | 15-30 | 20 |
| 50 | $Si_xN_y$ | 300-450 | 300-350 | 339 |

It is noted that the above materials for FIG. 4(c) coating 41 are exemplary, so that other material(s) may instead be used and certain layers may be omitted in certain example embodiments. The coating has both low sheet resistance, and has layers designed to reduce visibility of the coating 41 on the supporting substrate. In certain exemplary embodiments, glass substrate 40 with coating 41 thereon may be heat treated (e.g., thermally tempered), e.g., after coating, or chemically strengthened before coating. As with the FIG. 4(a)-(b) embodiments, the silver-based coating 41 of the FIG. 4(c) embodiment is inexpensive, has a low sheet resistance (preferably less than 15 ohms/square, more preferably less than about 10 or 5 ohms/square, with an example being approximately 4 ohms per square) and maintains high visible transmittance (preferably at least 60%, more preferably at least 70%, more preferably at least 80%, and most preferably at least 84%). The coating 41 is preferably deposited on substantially the entirety of the major surface of the glass substrate 40 and then patterned to form the electrodes and traces discussed herein.

Example 3 Vs. Comparative Example (CE)

Example 3 utilizes a coating according to the FIG. 4(c) embodiment. Surprisingly and unexpectedly, it has been found that the FIG. 4(c) coating can surprisingly reduce the visibility of the coating 41 on the supporting substrate, and thus make the electrodes and traces of the touch panel less visible to users and therefore the overall panel more aesthetically pleasing compared to the CE discussed above. This is evidenced, for example, by the comparison below between a Comparative Example (CE) and Example 3 of this invention, where the coatings include from the glass outwardly:

TABLE 8

Comparative Example (CE) vs. Example 3

| Ref | Material | Example 3 Thickness (Å) |
|---|---|---|
| 71 | $TiO_2$ | 100 |
| 72 | $SiO_2$ | 373 |
| 73 | $NbO_x$ | 1112 |
| 74 | $SiO_2$ | 744 |
| 75 | $ZrO_2$ | 50 |
| 61 | $Si_3N_4$ | 271 |
| 44 | ZnO | 83 |
| 46 | Ag | 131 |
| 47 | NiCrOx | 20 |
| 50 | $Si_3N_4$ | 339 |

FIG. 5 is discussed above, and illustrates properties of the CE.

In contrast, FIG. 8(b) is a percent visible transmission/reflectance vs. wavelength (nm) graph illustrating the visible transmission (CGN-TR or TR) and glass side visible reflection (CGN-BRA or BRA) of Example 3 according to another example embodiment of this invention, demonstrating that it is transparent to visible light and has a glass side visible reflectance more closely matched to the reflectance of the substrate compared to the CE. FIG. 8(b) also illustrates the visible transmission (Glass-TR) and visible reflectance (Glass-BRA) for just the glass substrate and AR section 71-75 absent the other layers (61, 44, 46, 47 and 50) of the coating. The line plot with the "x" through it in FIG. 8(b) is the glass side visible reflection of the Example 3 coating 41 on the glass substrate 40, and the line plot in FIG. 8(b) with the triangular marking through it is the visible reflection of the glass substrate 40 with only the AR section 70-75 thereon. The difference between these two lines is relevant, because it shows the difference in visible reflection (from the point of view of the finger in FIG. 7) between (a) areas of the glass substrate and touch panel where just the AR section of the coating is present (i.e., in non-electrode and non-trace areas), and (b) areas of the glass substrate and touch panel where the entire coating 41 is present (i.e., in electrode and trace areas). Thus, the larger the difference between these two lines (the bottom two lines in the FIG. 8(b) graph), the more visible the electrodes and traces are to a viewer. And the smaller the difference between these two lines (the bottom two lines in the FIG. 8(b) graph), the less visible the electrodes and traces are to a viewer. Comparing FIGS. 5 and 8(b) to each other, it can be seen that in FIG. 8(b) that there is a much smaller gap (if any) between these two lines for the visible wavelengths from about 550 nm to about 650 nm compared to the larger gap for the CE in FIG. 5, meaning that the electrodes and traces on a touch panel made of the Example 3 material will be much less visible (compared to the CE material of FIG. 5) which renders the touch panel more aesthetically pleasing. In other words, compared to the CE, Example 3 more closely matches the glass side visible reflectance of the coating 41 on the glass substrate 40 to the visible reflection of the supporting substrate (glass plus AR layers), and thus make the electrodes and traces of the touch panel less visible to users and therefore more aesthetically pleasing.

The table below shows optical characteristics of Example 3, where at 550 nm TR is visible transmission, RA is film side visible reflectance which is measured viewing the glass/coating combination from the coating side, and BRA is glass side visible reflectance which is measured viewing the glass/coating combination from the glass side. As will be recognized by one skilled in the art, a* and b* are color values measured with respect to transmissive color [a*(TR) and b*(TR)], and glass side reflective color [a*(BRA and b*(BRA)]. In the table below for Example 3, the glass substrate parameters are for the glass substrate with only AR layers 71-75 thereon across the entire substrate 40, and the Example 3 parameters are for the entire coating 41 on the glass substrate 40 (i.e., the AR layers 71-75 may be provided across substantially the entire substrate whereas the layers 61, 44, 46, 47 and 50 may be patterned to form the electrodes and traces).

TABLE 9

Example 3 (Optical Parameters) [Ill. C 2 deg.]

| Parameter | Example 3 on glass substrate (FIG. 4c embodiment) | Glass substrate with only AR layers 71-75 thereon |
|---|---|---|
| TR(%) | 85.61% | 94.80% |
| a* (TR) | −0.78 | −0.30 |
| b* (TR) | −0.94 | 0.35 |
| BRA(%) | 4.99% | 4.51% |
| a* (BRA) | −0.15 | −0.44 |
| b* (BRA) | −1.38 | −2.34 |

The glass side visible reflection (BRA) of the entire coating 41 on the glass substrate 40 for Example 3 closely matches the visible reflection of the glass substrate 40 with only the AR layers 71-75 thereon (4.99% vs. 4.51%). Thus, the patterned coating portion (61, 44, 46, 47 and 50) on the substrate is much less visible for Example 3 compared to the CE. In certain example embodiments of this invention, the coating 41 (unlike the CE) of this embodiment on a glass substrate 40 has a glass side visible reflectance (BRA) from 550-600 nm of from 4-13%, more preferably from 4.5-9%, and still more preferably from 4.5 to 8.75%. As also mentioned above, in certain example embodiments of this invention (FIGS. 2-14) there is no more than a 2.0 difference (more preferably no more than a 1.5 or 1.0 difference) at 550 nm and/or 600 nm, or in the range from 550-600 nm, between: (a) the film side and/or glass side visible reflectance percentage of a coated article including the entire coating 41 on a glass substrate 40 (in the area where the coating 41 is entirely present), and (b) the visible reflectance percentage of the glass substrate areas where only the glass 40 and AR layers 71-75 are present. This can be seen in FIG. 8(b) for example. In contrast, for example, for the CE it can be seen from the above that there is a 2.31 difference (8.11%−5.8%=2.31) between (a) the glass side visible reflectance percentage of a coated article including the CE coating on a glass substrate 40 in the area where the coating 41 is present, and (b) the visible reflectance percentage of the glass substrate alone, which is too much of a difference and renders the electrodes and traces easily visible to viewers viewing the device from the side of the finger shown in FIG. 7. Example embodiments of this invention have reduced this difference to no more than 2.0, more preferably no more than 1.5, and most preferably no more than 1.0.

FIG. 4(d) illustrates a multilayer transparent conductive coating 41 according to another example embodiment which may be provided, either directly or indirectly, on substrate 40 in any of the devices or products discussed herein (e.g., see FIGS. 2-3, 7 and 9-17). Substrate 40 may be, for example, glass or glass coated with an AR coating. Coating 41 of the FIG. 4(d) embodiment may include, for example, base dielectric layer 61 or of including silicon nitride (e.g., $Si_3N_4$ or other suitable stoichiometry) which may or may not be doped with Al and/or oxygen, silicon oxynitride, or other suitable dielectric material; lower contact layer 44 of or including zinc oxide which may be doped with from about 1-8% Al, or may be of or include any of the other materials discussed herein in connection with layer 44, and is in contact with the silver based layer; silver-based conductive layer 46 on and directly contacting the lower contact layer 44; an upper contact layer 47 including nickel and/or chromium which may be oxided and/or nitrided that is over and contacting the silver-based conductive layer 46; dielectric layer 50 of or including silicon nitride and/or silicon oxynitride or other suitable material, dielectric layer of or including zirconium oxide (e.g., $ZrO_2$) 75, and optionally protective layer of or including diamond-like carbon (DLC) 120. The DLC of layer 120 may, for example, be any of the DLC materials discussed in any of U.S. Pat. Nos. 6,261,693, 6,303,225, 6,447,891, 7,622,161, and/or 8,277,946, which are incorporated herein by reference. Each of the layers in the coating 41 is designed to be substantially transparent (e.g., at least 70% or at least 80% transparent) to visible light. The silver layer 46 may or may not be doped with other materials as discussed herein. Upper contact layer 47 may be of or include materials such as NiCr, $NiCrO_x$, $NiCrN_x$, $NiCrON_x$, NiCrMo, $MiCrMoO_x$, $TiO_x$, or the like.

While various thicknesses and materials may be used in layers in different embodiments of this invention, example thicknesses and materials for the respective sputter-deposited layers of coating 41 on the glass 40 in the FIG. 4(d) embodiment are as follows, from the glass outwardly:

FIG. 4(d) Coating

| Ref | Material | Preferred Thickness (Å) | More Preferred Thickness (Å) | Example Thickness (Å) |
|---|---|---|---|---|
| 61 | $Si_xN_y$ | 150-500 | 200-400 | 271 |
| 44 | ZnO | 50-140 | 60-100 | 83 |
| 46 | Ag | 90-160 | 115-150 | 131 |
| 47 | NiCrNx | 15-50 | 15-30 | 20 |
| 50 | $Si_xN_y$ | 200-500 | 300-350 | 339 |
| 75 | $ZrO_2$ | 40-300 | 50-200 | 100 |
| 120 | DLC | 10-200 | 20-150 | 40-120 |

FIG. 4(e) illustrates a multilayer transparent conductive coating 41 according to another example embodiment which may be provided, either directly or indirectly, on substrate 40 in any of the devices or products discussed herein (e.g., see FIGS. 2-3, 7 and 9-17). The FIG. 4(e) coating is the same as the FIG. 4(d) coating, except that layer 120 is not present in the FIG. 4(e) coating.

FIG. 4(f) illustrates a multilayer transparent conductive coating 41 according to another example embodiment which may be provided, either directly or indirectly, on substrate 40 in any of the devices or products discussed herein (e.g., see FIGS. 2-3, 7 and 9-17). Substrate 40 may be, for example, glass or glass coated with an AR coating. Coating 41 of the FIG. 4(f) embodiment may include, for example, base dielectric layer 61 or of including silicon nitride (e.g., $Si_3N_4$ or other suitable stoichiometry), which may or may not be doped with Al and/or oxygen; lower contact layer 101 in contact with the silver based layer and which may include nickel and/or chromium which may be oxided and/or nitrided; silver-based conductive layer 46 on and directly contacting the lower contact layer 101; an upper contact layer 47 including nickel and/or chromium which may be oxided and/or nitrided that is over and contacting the silver-based conductive layer 46; and an protective dielectric layer 50 of or including silicon nitride and/or silicon oxynitride. Each of the layers in the coating 41 is designed to be substantially transparent (e.g., at least 70% or at least 80% transparent) to visible light. The silver layer 46 may or may not be doped as discussed herein. Upper and lower contact layers 47 and 101 may be of or include materials such as NiCr, $NiCrO_x$, $NiCrN_x$, $NiCrON_x$, NiCrMo, $MiCrMoO_x$, $TiO_x$, or the like. Optionally, a layer of or including diamond-like carbon (DLC) or zirconium oxide (e.g., $ZrO_2$) may be provided as a protective overcoat in the coating 41 over the layer 50 in the FIG. 4(f) embodiment. The zirconium oxide and/or DLC layers discussed herein provide for scratch resistance, and resistance to stains and cleaning chemicals in applications such as shower door/wall touch panel applications. The use of one or more of NiCr, $NiCrO_x$, $NiCrN_x$, $NiCrON_x$, NiCrMo, and/or MiCrMoO for layer lower contact layer 101, instead of crystalline zinc oxide layer 44, allows the conductivity of the silver layer 46 to be reduced in a manner that is sometimes desirable, as discussed herein.

While various thicknesses and materials may be used in layers in different embodiments of this invention, example thicknesses and materials for the respective sputter-deposited layers of coating 41 on the glass 40 in the FIG. 4(f) embodiment are as follows, from the glass outwardly:

| | | FIG. 4(f) Coating | | |
|---|---|---|---|---|
| Ref | Material | Preferred Thickness (Å) | More Preferred Thickness (Å) | Example Thickness (Å) |
| 61 | $Si_xN_y$ | 10-500 | 20-200 | 100 |
| 101 | $NiCrN_x$ | 5-50 | 10-30 | 20 |
| 46 | Ag | 50-160 | 115-150 | 131 |
| 47 | NiCrNx | 5-50 | 10-30 | 20 |
| 50 | $Si_xN_y$ | 100-500 | 200-300 | 250 |

FIG. 4(g) illustrates a multilayer transparent conductive coating 41 according to another example embodiment which may be provided, either directly or indirectly, on substrate 40 in any of the devices or products discussed herein (e.g., see FIGS. 2-3, 7 and 9-17). Substrate 40 may be, for example, glass or glass coated with an AR coating. Coating 41 of the FIG. 4(g) embodiment may include, for example, base dielectric layer 61 or of including silicon nitride (e.g., $Si_3N_4$ or other suitable stoichiometry), which may or may not be doped with Al and/or oxygen; lower contact layer 44 as discussed above in connection with other figures; silver-based conductive layer 46 on and directly contacting the lower contact layer 44; an upper contact layer 47 including nickel and/or chromium which may be oxided and/or nitrided that is over and contacting the silver-based conductive layer 46; dielectric layer 50 of or including silicon nitride and/or silicon oxynitride, which may be doped with from about 1-8% (atomic %) Al; and protective overcoat of or including zirconium oxide (e.g., $ZrO_2$) 75. Each of the layers in the coating 41 is designed to be substantially transparent (e.g., at least 70% or at least 80% transparent) to visible light. The silver layer 46 may or may not be doped with other materials as discussed herein. Upper contact layer 47 may be of or include materials such as NiCr, $NiCrO_x$, $NiCrN_x$, $NiCrON_x$, NiCrMo, $MiCrMoO_x$, $TiO_x$, or the like. Optionally, a layer of or including diamond-like carbon (DLC) may be provided as a protective overcoat in the coating 41 over the layer 75 in the FIG. 4(g) embodiment. Note that layer 47 may optionally be omitted from the FIG. 4(g) embodiment in certain example embodiments of this invention.

While various thicknesses and materials may be used in layers in different embodiments of this invention, example thicknesses and materials for the respective sputter-deposited layers of coating 41 on the glass 40 in the FIG. 4(g) embodiment are as follows, from the glass outwardly:

| | | FIG. 4(g) Coating | | |
|---|---|---|---|---|
| Ref | Material | Preferred Thickness (Å) | More Preferred Thickness (Å) | Example Thickness (Å) |
| 61 | $Si_xN_y$ | 10-500 | 20-200 | 100 |
| 44 | ZnO | 20-140 | 30-100 | 83 |
| 46 | Ag | 50-160 | 115-150 | 131 |
| 47 | NiCrNx | 5-50 | 10-30 | 20 |
| 50 | $Si_xN_y$ | 100-500 | 200-300 | 250 |
| 75 | $ZrO_2$ | 40-300 | 50-200 | 100 |

FIG. 4(h) illustrates another double silver multilayer transparent conductive coating 41 according to another example embodiment which may be provided, either directly or indirectly, on substrate 40 in any of the devices or products discussed herein (e.g., see FIGS. 2-3, 7 and 9-17). Substrate 40 may be, for example, glass or glass coated with an AR coating. Coating 41 of the FIG. 4(h) embodiment may include, for example, base dielectric layer 61 or of including silicon nitride (e.g., $Si_3N_4$ or other suitable stoichiometry), which may or may not be doped with Al and/or oxygen; lower contact layers 44 as discussed above in connection with other figures; silver-based conductive layers 46 on and directly contacting the lower contact layers 44; upper contact layers 47 including nickel and/or chromium which may be oxided and/or nitrided that are over and contacting the respective silver-based conductive layers 46; dielectric layers 50 of or including silicon nitride and/or silicon oxynitride, which may be doped with from about 1-8% (atomic %) Al; and dielectric layers 49 of or including tin oxide or zinc stannate for example. Each of the layers in the coating 41 is designed to be substantially transparent (e.g., at least 70% or at least 80% transparent) to visible light. The silver layer 46 may or may not be doped with other materials as discussed herein. Upper contact layers 47 may be of or include materials such as NiCr, $NiCrO_x$, $NiCrN_x$, $NiCrON_x$, NiCrMo, $MiCrMoO_x$, $TiO_x$, or the like. Optionally, a layer of or including diamond-like carbon (DLC) may be provided as a protective overcoat in the coating 41 over the top layer 50 in the FIG. 4(*h*) embodiment, or alternatively the top layer 50 could be replaced with an overcoat of or including zirconium oxide. Note that certain layer(s) may optionally be omitted from the FIG. 4(*h*) embodiment, and/or other layer(s) may optionally be added, in certain example embodiments of this invention.

While various thicknesses and materials may be used in layers in different embodiments of this invention, example thicknesses and materials for the respective sputter-deposited layers of coating 41 on the glass 40 in the FIG. 4(*h*) embodiment are as follows, from the glass outwardly:

| | | FIG. 4(h) Coating | | |
|---|---|---|---|---|
| Ref | Material | Preferred Thickness (Å) | More Preferred Thickness (Å) | Example Thickness (Å) |
| 61 | $Si_xN_y$ | 10-500 | 20-200 | 100 |
| 44 | ZnO | 20-140 | 30-100 | 83 |
| 46 | Ag | 50-160 | 100-150 | 131 |
| 47 | $NiCrO_x$ | 5-50 | 10-30 | 20 |
| 49 | $SnO_2$ | 50-1000 | 100-500 | 100-300 |
| 50 | $Si_xN_y$ | 100-500 | 200-300 | 250 |
| 49 | $SnO_2$ | 50-1000 | 100-500 | 100-300 |
| 44 | ZnO | 20-140 | 30-100 | 83 |
| 46 | Ag | 50-160 | 100-150 | 131 |
| 47 | $NiCrO_x$ | 5-50 | 10-30 | 20 |
| 49 | $SnO_2$ | 50-400 | 50-250 | 100-200 |
| 50 | $Si_xN_y$ | 10-500 | 50-250 | 80-200 |

In the FIG. 4(*h*) coating, as with other double silver coatings discussed herein, the lower silver layer 46 may be used as the conductor for one set of electrodes of the touch panel, and the upper silver layer 46 may be used as the conductor for another set of electrodes. For example, in any embodiment herein, the lower silver layer 46 may be used as the conductor for the transmit electrodes (T) of the touch panel, and the upper silver layer 46 may be used as the conductor for the receive electrodes (R) of the touch panel, or vice versa. In such a scenario, the transmit electrodes and receive electrodes may be on different respective planes.

The coatings shown in any of FIGS. 4-6 of parent case Ser. No. 13/685,871 (now U.S. Pat. No. 9,354,755, and incorporated herein by reference), and/or described elsewhere in parent case Ser. No. 13/685,871, may also be used as the multi-layer transparent conductive coatings 41 in touch panels for electrodes and/or traces in any of the various embodiments discussed herein.

Figure 9:
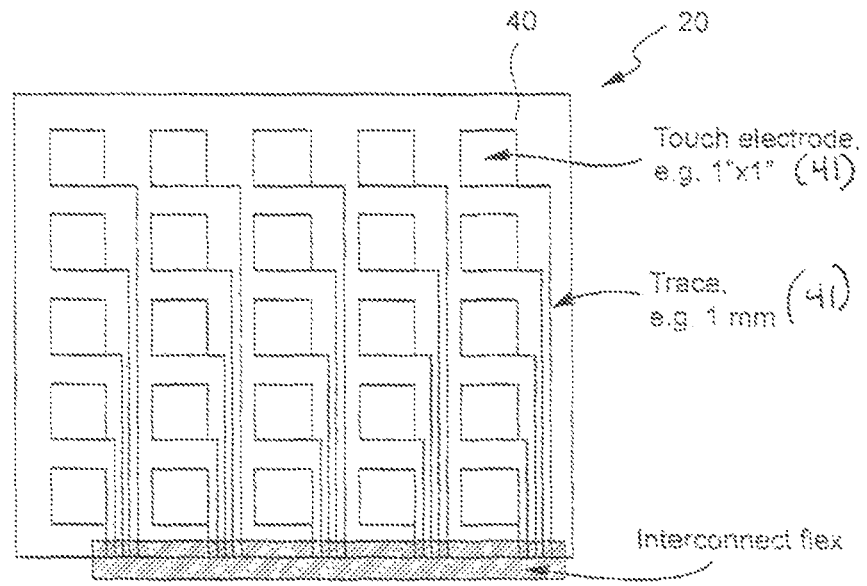
FIG. 9 illustrates a top or bottom plan layout of a low resolution capacitive touch panel according to another example embodiment, that may contain the coating(s) of FIGS. 4, 6, 7, 8 as conductive electrode(s) and/or conductive trace(s).

The patterned low sheet resistance coatings 41 herein (e.g., any of the FIG. 2-8 embodiments) may also be used in low resolution touch panel applications (e.g., see FIG. 9). Example applications for touch panels discussed herein are interactive storefronts, preferably standalone, but possibly also in combination with a projected image on the glass assembly or with direct view displays, shower controls on glass based shower doors or glass based shower walls, light controls on glass walls in office buildings, controls for appliances such as ovens, stovetops, refrigerators, and the like. The glass substrate 40 may be flat or curved (e.g., heat bent) in different embodiments of this invention. The silver based coatings 41 discussed herein are advantageous with respect to bent substrates, because conventional ITO coatings for touch panels are typically highly crystalline and relatively thick and brittle when bent, which can readily lead to failure of the ITO. In bent glass applications, the glass or plastic substrate 40 may be bent for example via heat bending, cold lamination, or any other suitable technique, and may end up with a curvature radius after bending of from about 0.05 to 100 nm. Low resolution touch panels on glass allow the user to select information or otherwise interact with the glass surface while simultaneously viewing what's behind the glass. In a standalone configuration, for example, the touch panel may be operated from both sides of the glass panel. Low resolution capacitive touch panels may be for example an array of 5×5 touch buttons, each about a square inch and separated by about half an inch, as shown in FIG. 9. The touch principle of operation may be self-capacitance which can detect gloved fingers as well as bare fingers. The interconnect flex circuit in FIG. 9 is connected to a touch controller and the function of each button can therefore be reconfigured in software or firmware. The lower resolution touch interface is easier to make than a multi-touch panel on top of a high resolution LCD, because the minimum feature size for the patterning coating 41 by laser, photolithography or other method can be much larger. For example, the minimum feature size for the traces could be about 1 mm, so that the requirements for pinholes, scratches and other defects in the glass and in the coating are greatly relaxed. In other words, it allows the use of standard soda lime glass 40 and coatings 41 produced in a horizontal architectural coater. For certain low resolution touch applications, there is no need for the advanced clean room facilities that typically are used to produce high resolution multi-touch panels for phones, tablets, laptops and larger size multi-touch panels. The wider traces (e.g ~1 mm) also reduce the resistance and signal delay from the touch electrodes.

Figure 10:
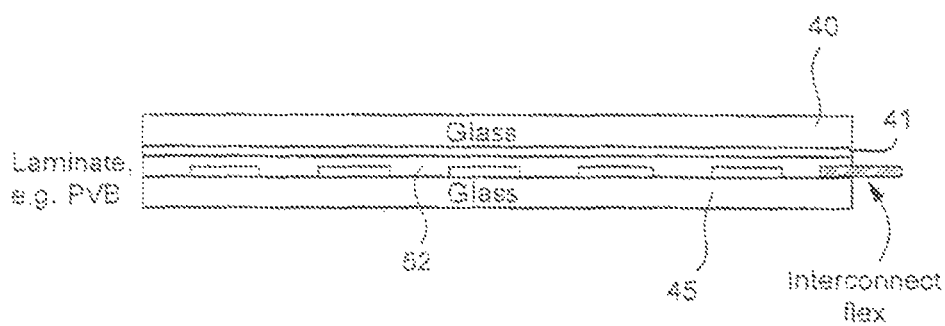
FIG. 10 is a cross sectional view of a low resolution capacitive touch panel according to another example embodiment where the substrate supporting the coating of this invention of FIG. 9 may be laminated to another substrate (e.g., glass) via a polymer inclusive interlayer such as PVB or EVA.
Figure 11:
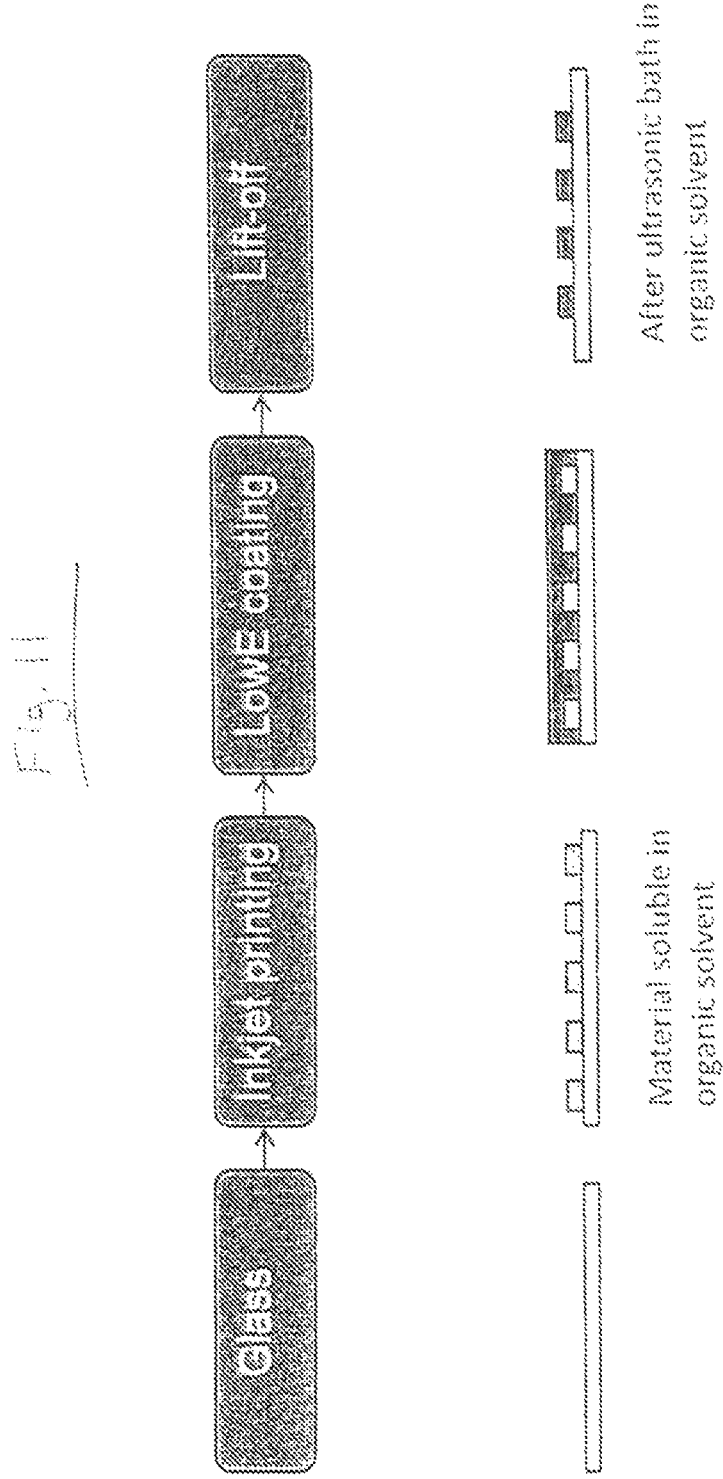
FIG. 11 is a flow chart of a process for making the transparent conductive coating pattern according to any of FIG. 2, 3, 4, 7, 8, 9, or 10 according to an example embodiment of this invention.
Figure 12:
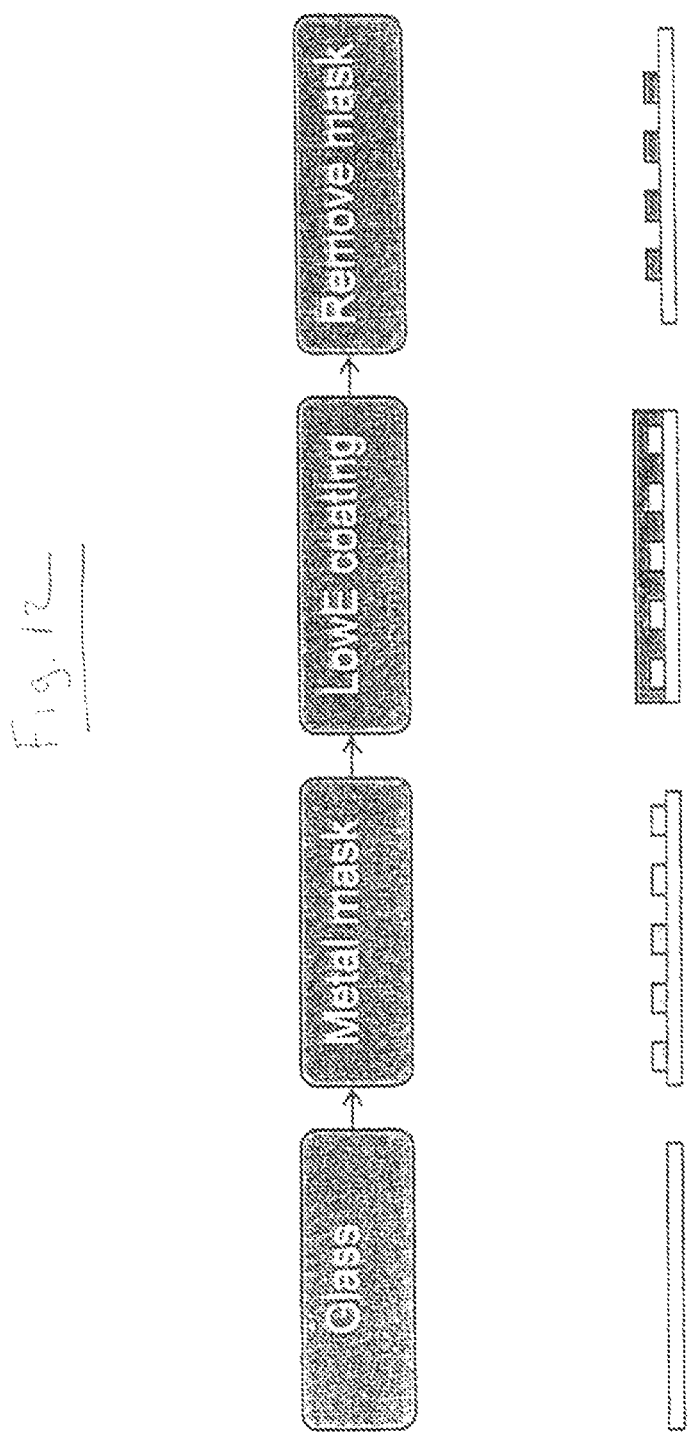
FIG. 12 is a flow chart of a process for making the transparent conductive coating pattern according to any of FIG. 2, 3, 4, 7, 8, 9, or 10 according to another example embodiment of this invention.
Figure 13:
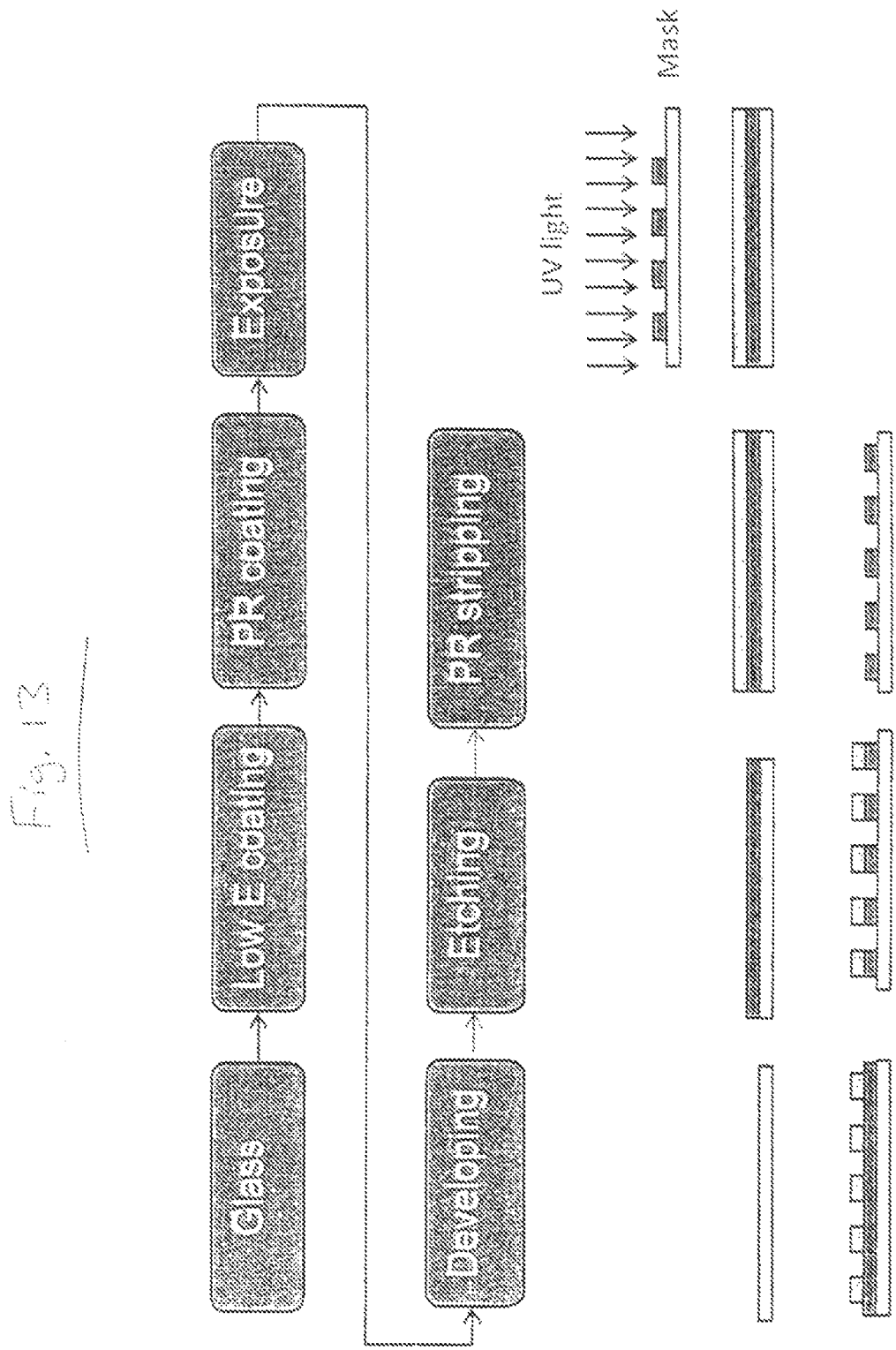
FIG. 13 is a flow chart of a process for making the transparent conductive coating pattern according to any of FIG. 2, 3, 4, 7, 8, 9, or 10 according to another example embodiment of this invention.

Referring to the laminated FIG. 10 embodiment (the coatings of any of FIGS. 2-8 may be used in the FIG. 10 embodiment, as well as in the FIG. 7 lamination embodiment), to further protect the patterned silver based coating 41 from corrosion in a standalone application, the touch panel substrate 40 (with or without an AR coating thereon between 40 and 41) is laminated to another glass substrate 45 with PVB, EVA, or other polymer inclusive lamination material 52. The PVB 52 based laminating layer for example will encapsulate the patterned coating 41, so that corrosion is further inhibited. Of course, as explained herein, the touch panel need not include the second substrates or the laminating layer in certain instances and may be made up of the glass substrate 40 and the electrodes/traces/circuitry discussed herein.

Figure 15:
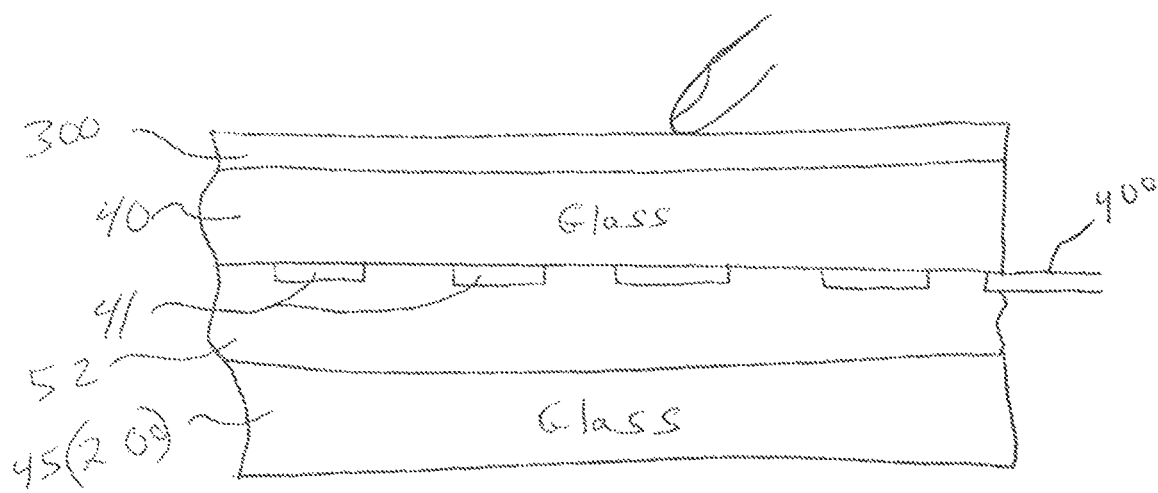
FIG. 15 is a cross sectional view of a capacitive touch panel according to an example embodiment of this invention, including the transparent conductive coating pattern according to any of FIG. 2, 3, 4, 7, 8, 9, or 10 on surface #2, and an additional functional film provided on the surface adapted to be touched by a user.
Figure 16:
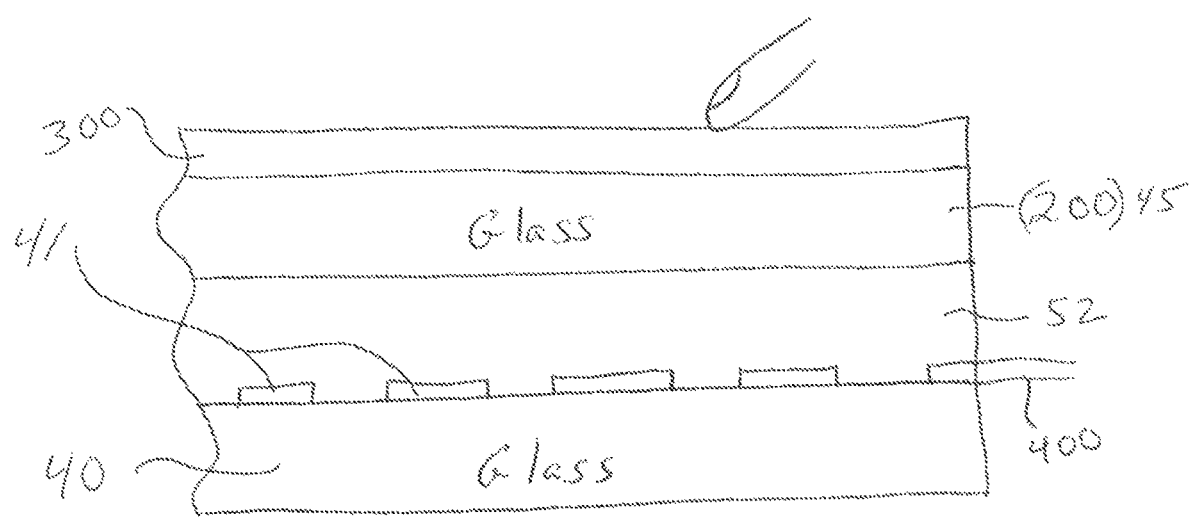
FIG. 16 is a cross sectional view of a capacitive touch panel according to another example embodiment of this invention, including the transparent conductive coating pattern according to any of FIG. 2, 3, 4, 7, 8, 9, or 10 on surface #3, and an additional functional film provided on the surface adapted to be touched by a user.
Figure 17:
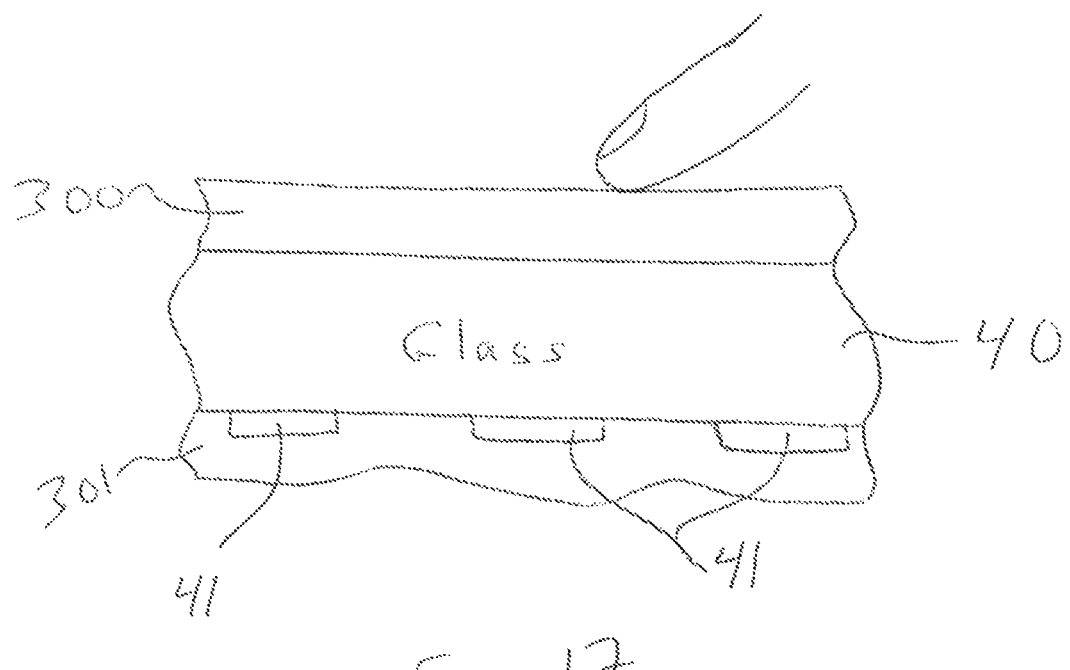
FIG. 17 is a cross sectional view of a monolithic capacitive touch panel according to another example embodiment of this invention, including the transparent conductive coating pattern according to any of FIG. 2, 3, 4, 7, 8, 9, or 10 on surface #2, and an additional functional film provided on the surface adapted to be touched by a user.

FIGS. 15-17 are cross sectional views of capacitive touch panels according to various embodiments of this invention that include additional functional film 300. FIG. 15 is a cross sectional view of a capacitive touch panel according to an example embodiment of this invention, including the transparent conductive coating pattern 41 according to any of FIGS. 2, 3, 4 (any of 4(*a*)-(*h*)), 7, 8, 9, or 10 on surface #2, and an additional functional film 300 provided on the surface adapted to be touched by a user. Note the user's finger shown in FIG. 15. Meanwhile, FIG. 16 is a cross sectional view of a capacitive touch panel according to another example embodiment of this invention, including the transparent conductive coating pattern 41 according to any of FIG. 2, 3, 4, 7, 8, 9, or 10 on surface #3, and an additional functional film 300 provided on the surface adapted to be touched by a user. In the laminated embodiments of FIGS. 15-16, to further protect the patterned silver based coating 41 from corrosion, the touch panel substrate 40 (glass or plastic, with or without an AR coating thereon between 40 and 41) is laminated to another glass substrate 45 (or 200) with PVB or other polymer inclusive lamination material 52. The laminating material (e.g., EVA or PVB) 52 will encapsulate the patterned coating 41, so that corrosion is further inhibited. And FIG. 17 is a cross sectional view of a monolithic capacitive touch panel according to another example embodiment of this invention, including the transparent conductive coating pattern 41 according to any of FIG. 2, 3, 4, 7, 8, 9, or 10 on surface #2, and additional functional films 300 and 301. The FIG. 17 monolithic embodiment may be designed for the user to touch either major surface of the touch panel. An interconnect 400, such as a flexible circuit, is provided for allowing the electrodes 41 of the touch panel to communicate with processing circuitry such as the processor discussed above.

Functional film 300 and/or 301 in FIGS. 15-17 may be made up of one or more layers, and may be one or more of: an index-matching film, an antiglare film, an anti-fingerprint film, and anti-microbial film, a scratch resistant film, and/or an antireflective (AR) film. Unlike the electrode/trace coating 41, functional films 300 and 301 need not be patterned and may be applied across substantially the entirety of the substrate 40 (or 45).

When functional film 300 and/or 301 is an index matching (see also index matching film 85 in FIG. 7), this is provided to reduce the refractive index different between the areas/surfaces adjacent the two sides of the index matching film, in order to reduce visible reflections and render the touch panel more aesthetically pleasing. Laminating layers 52 in FIGS. 15-16 may also be index matching films. Index matching films may or may not be adhesive types in different embodiments of this invention. Thus, the index matching film has a refractive index value that is valued between the respective refractive index values of the areas/surfaces on both sides of the index matching film. For example, in FIG. 7 the index matching film 85 has a refractive index value between the refractive index values of coating 41 and substrate 200. In a similar manner, in FIG. 15 the index matching film 300 would have a refractive index value between the refractive index values of substrate 40 and air. In a similar manner, in FIG. 17 the index matching film 301 would have a refractive index value between the refractive index values of coating 41 and air. Example index matching films include optically clear adhesives and index matching laminating material.

When functional film 300 in FIGS. 15-17 is an antiglare film, this is provided to reduce glare off the front of the touch panel in order to render the touch panel more aesthetically pleasing. Example anti-glare films that may be used are described in U.S. Pat. Nos. 8,114,472 and 8,974,066, which are incorporated herein by reference. Moreover, an antiglare surface at surface #1 of the touch panel may be obtained by a short or weak acid etch of surface #1 (the surface shown being touched in FIGS. 15-17).

When functional film 300 in FIGS. 15-17 is an anti-fingerprint film, this is provided to reduce visibility of fingerprints on the touch panel to render the touch panel more aesthetically pleasing. Example anti-fingerprint films that may be used are described in U.S. Pat. No. 8,968,831, which is incorporated herein by reference. Anti-fingerprint or anti-smudge films may be obtained for example with an oleo-phobic coating and/or roughened surface. Spray-on anti-fingerprint coatings, such as fluorocarbon compounds, with limited durability, may also be used. Such film may increase the initial contact angle of surface #1 (for sessile drop of water) of the touch panel to a value of at least 90 degrees, more preferably at least 100 degrees, and most preferably at least 110 degrees.

When functional film 300 in FIGS. 15-17 is an anti-microbial film, this is provided to kill germs at the front of the touch panel in order to render the touch panel more health appealing. Example anti-microbial films that may be used include silver colloids, rough titanium oxide, porous titanium oxide, doped titanium oxide, and may be described in U.S. Pat. Nos. 8,647,652, 8,545,899, 7,846,866, 8,802,589, 2010/0062032, 7,892,662, 8,092,912, and 8,221,833, which are all incorporated herein by reference.

When functional film 300 in FIGS. 15-17 is a scratch resistant film, this is provided to reduce scratching and improve durability of the touch panel. Example scratch resistant films may be made of $ZrO_2$ or DLC. When functional film 300 is of or includes DLC, the DLC may for example be any of the DLC materials discussed in any of U.S. Pat. Nos. 6,261,693, 6,303,225, 6,447,891, 7,622,161, and/or 8,277,946, which are incorporated herein by reference.

When functional film 300 in FIGS. 15-17 is an antireflective (AR) film, this is provided to reduce visible reflections off the front of the touch panel to render the panel more aesthetically pleasing. Example AR films that may be used are described in U.S. Pat. Nos. 9,556,066, 9,109,121, 8,693,097, 7,767,253, 6,337,124, and 5,891,556, the disclosures of which are hereby incorporated herein by reference. In certain example embodiments, the AR film may be part of the multi-layer transparent conductive coating (e.g., see AR film 70 which is part of coating 41' in FIG. 4(c)).

It is noted that in various embodiments of this invention, electrode patterns other than a rectangular array of buttons can be envisioned including patterns allowing swiping, circular patterns for dials, and so forth. Potential applications include storefronts, commercial refrigerators, appliances, glass walls in office or other environments, transportation, dynamic glazing, vending machines, and so forth, where a see-through low resolution touch panel is beneficial as a user interface.

The sputter-deposited coating 41 discussed above in connection with FIGS. 2-10 may be formed and patterned in any of a variety of manners. For example, the sputter-deposited coating 41 may be formed by inkjet printing and lift-off (see FIG. 11), metal shadow mask patterning (see FIG. 12), photolithograph (see FIG. 13), or laser patterning (see FIG. 14(a)).

Figure 14C:
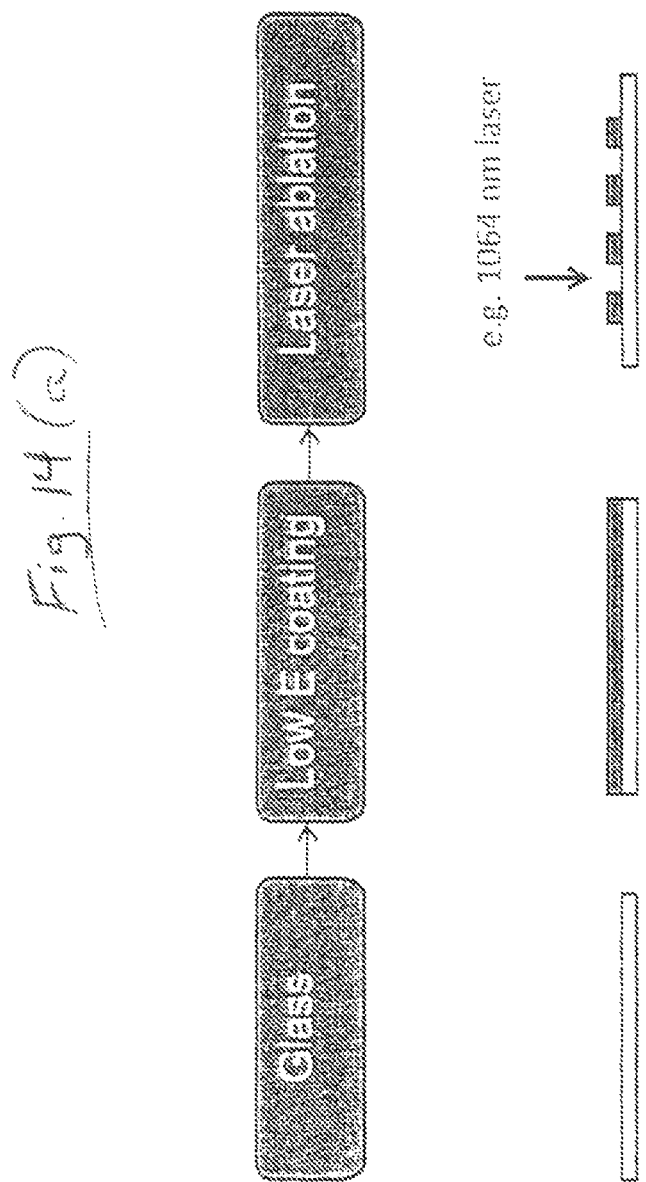
FIG. 14(a) is a flow chart of a process for making the transparent conductive coating pattern according to any of FIG. 2, 3, 4, 7, 8, 9, or 10 according to another example embodiment of this invention.
FIG. 14(b) is a wavelength (nm) vs. absorption (%) illustrating that different silver based layers in a multilayer coating have different absorption characteristic based on wavelength.
Figure 14B:
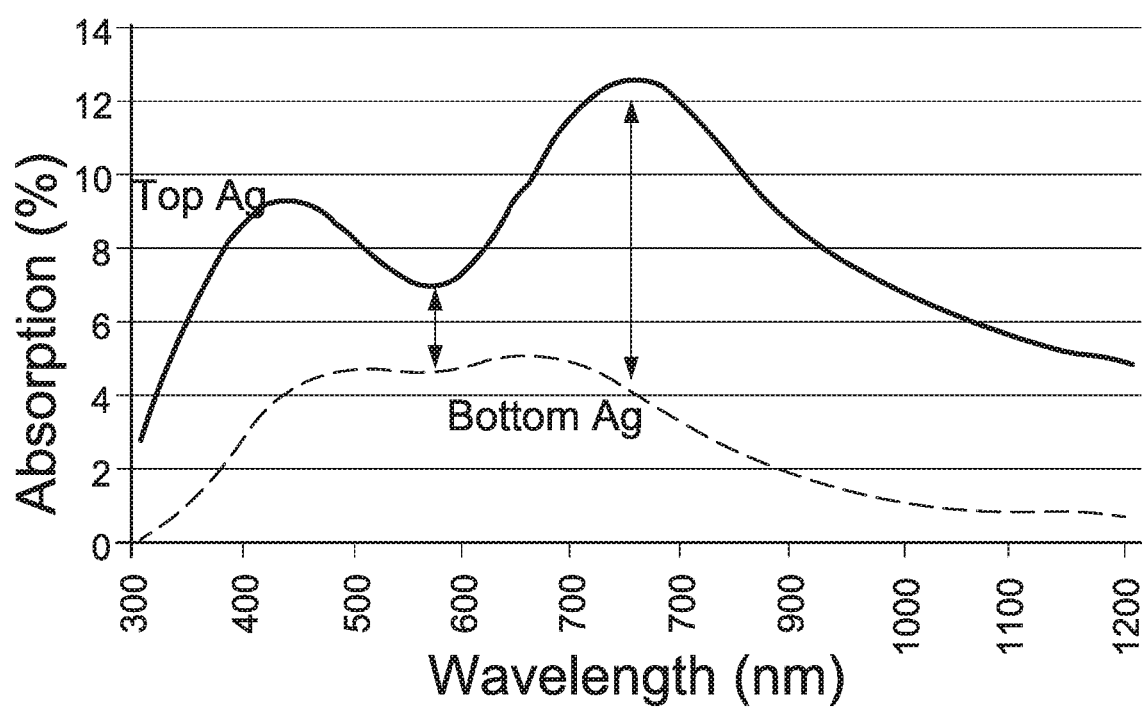

As explained above, it is sometimes desirable to pattern the silver inclusive coating into the electrodes using laser patterning techniques, as opposed to conventional photolithography (e.g., see FIG. 14(a)). In certain example embodiments, such as shown in FIGS. 3(f)-(g), it would be desirable to arrange respective sets of transmitting (T) and receiving (R) electrodes of a silver-based mutual capacitance touch sensor in an X-Y configuration using a patterning process on a completed layer stack (e.g., see the multi-layer coating of FIG. 4(h)), preferably by laser scribing. An issue is that to define the two sets of X-Y electrodes—transmitting and receiving—provided in two parallel planes as an orthogonal matrix faces a challenge of scribing the electrodes in the X direction without damaging the underlying electrodes oriented along the Y direction, or vice versa. Thus, in an example embodiment, various wavelengths are used to pattern the two sets of electrodes (T and R) independently. In another example embodiment, the two sets of electrodes are patterned from different sides of the supporting glass substrate 40 either using the same wavelength or using at least two different wavelengths.

In certain example embodiments, different electrodes of the touch panel may be formed by different silver based layers 46 of the same or different multi-layer coatings. In patterning the electrodes (T) and (R), different laser scribing wavelengths may be used to pattern different respective silver based layers 46, of the same or different multi-layer coating(s) 41, in certain example embodiments. For example, when first (e.g., transmit) and second (e.g., receive) electrodes of the touch panel overlap each other (e.g., see FIGS. 3(*f*)-(*g*)), a first laser scribing wavelength may be used when patterning the first silver based layer 46 into the first electrode(s), and a second laser scribing wavelength may be used when patterning the second silver based layer 46 into the second electrode(s). For example, transmit electrodes (T) in FIGS. 3(*f*)-(*g*) may be laser patterned using a first wavelength(s), and receive electrodes (R) in FIGS. 3(*f*)-(*g*) may be laser patterned using a different second wavelength(s). Advantageously, the use of the different wavelengths reduces damage to electrode(s) not intended to be patterned in a given procedure.

In certain example embodiments, when different electrodes of the touch panel may be formed by different silver based layers 46 of the same or different multi-layer coatings 41, a first set of electrodes (e.g., T) may be patterned by laser scribing from a first side of the supporting glass substrate 40, whereas a second set of electrodes (e.g., R) may be patterned by laser scribing from an opposite second side of the supporting glass substrate 40. Thus, since the transmit and receive electrodes are on the same side of the glass substrate 40, one of the two laser patterning procedures is performed through the supporting glass substrate 40. For example, referring to FIGS. 3(*f*)-(*g*) and 4(*h*), transmit electrodes (T) may be laser patterned from a first side of the supporting glass substrate 40, whereas receive electrodes (R) may be laser patterned form the opposite second side of the supporting glass substrate 40 so that the laser beam for patterning the receive electrodes (R) passes through the glass substrate 40. Advantageously, this technique reduces damage to electrodes not intended to be patterned in a given laser patterning procedure. The embodiment involving laser patterning of different electrodes from opposite sides of the supporting glass substrate may, or may not, be used in combination with the embodiment using different wavelengths to pattern different electrodes.

Referring to FIGS. 14(*a*)-14(*b*), it has been found that the upper silver based layer 46 (solid line in FIG. 14(*b*)) in a double silver coating such as shown in FIG. 4(*h*) is more optically absorbent in the wavelength range of 800-900 nm, while the maximum absorption of the bottom silver layer 46 (dotted line in FIG. 14(*b*)) is shifted to shorter wavelengths. This differentiation allows a selective laser scribing of the two conductive silver based layers 46 either from one side (top of the stack, for instance) or from both sides—e.g., the stack side for the top silver and the glass side for the bottom silver layer. In certain example embodiments, two sets of electrodes may be formed by scribing using a laser or lasers with at least two different wavelengths selected to be absorbed preferentially by each of the silver layers. For example, the bottom silver based layer 46 in the FIG. 4(*h*) coating may be laser scribed/patterned using a laser wavelength of from about 400-620 nm (more preferably from about 500-600 nm) in order to pattern that layer 46 into the transmit electrodes (T) shown in FIGS. 3(*f*)-(*g*), or any other embodiment herein. The laser patterning of the bottom silver based layer 46 in the FIG. 4(*h*) to form the transmit electrodes (T) shown in FIGS. 3(*f*)-(*g*) may be done by directing the laser beam through the glass substrate 40. Meanwhile, the upper silver based layer 46 in the FIG. 4(*h*) coating may be laser scribed/patterned using a laser wavelength of from about 630-1200 nm (more preferably from about 650-1100 nm, and most preferably from about 700-1000 nm) in order to pattern that layer 46 into the receive electrodes (R) shown in FIGS. 3(*f*)-(*g*), or any other embodiment herein. The laser patterning of the upper silver based layer 46 in the FIG. 4(*h*) to form the overlying receive electrodes (R) shown in FIGS. 3(*f*)-(*g*) may be done by directing the laser beam from above the coating 41 so that the laser beam reaches the silver layer 46 before reaching the glass substrate 40. The use of the different wavelengths to pattern the different silver based layers can be advantageous in reducing damage to the silver layer not intended to be patterned in a given patterning procedure, as can the use of lasers from opposite sides of the glass substrate.

In an example embodiment of this invention, there is provided a method of making a capacitive touch panel comprising a glass substrate; a patterned multi-layer transparent conductive coating supported by the substrate, the multi-layer transparent conductive coating including a first conductive layer comprising silver, a dielectric layer located between at least the substrate and the first conductive layer comprising silver, and a dielectric layer comprising one or more of: zirconium oxide, silicon nitride, and tin oxide, located over at least the first conductive layer comprising silver; a first set of electrodes; a second set of electrodes; wherein the first and second sets of electrodes are configured for allowing touch position to be determined, wherein at least some of the electrodes comprise the multi-layer transparent conductive coating; the method comprising: laser patterning the first conductive layer comprising silver with a first wavelength in forming the first set of electrodes; and forming the second set of electrodes by laser patterning (i) with a second wavelength different from the first wavelength, and/or (ii) with a laser beam from an opposite side of the substrate than a laser beam used in laser patterning the first conductive layer.

In the method of the immediately preceding paragraph, the patterned multi-layer transparent conductive coating may further comprise a second conductive layer comprising silver, and another dielectric layer (e.g., silicon nitride or tin oxide) located between at least the first and second conductive layers comprising silver, wherein the first set of electrodes and the second set of electrodes may each comprise the multi-layer transparent conductive coating, and wherein said forming the second set of electrodes by laser patterning with the second wavelength different from the first wavelength may comprise laser patterning the second conductive layer comprising silver with the second wavelength. The first conductive layer comprising silver of the patterned multi-layer transparent conductive coating may be a conductor of the first set of electrodes, and the second conductive layer comprising silver of the patterned multi-layer transparent conductive coating may be a conductor of the second set of electrodes.

In the method of any of the preceding two paragraphs, the electrodes in the first set of electrodes may be oriented substantially perpendicular (perpendicular plus/minus ten degrees) to the electrodes in the second set of electrodes, as viewed from above.

In the method of any of the preceding three paragraphs, the electrodes in the first set may be receive electrodes, and the electrodes in the second set may be transmit electrodes.

In the method of any of the preceding four paragraphs, the transmit electrodes may have a higher sheet resistance ($R_s$) than the receive electrodes, wherein the transmit electrodes may have a sheet resistance ($R_s$) at least 1 ohm/square higher than a sheet resistance of the receive electrodes. The transmit electrodes may have a sheet resistance ($R_s$) at least 5 ohms/square higher than a sheet resistance of the receive electrodes.

In the method of any of the preceding five paragraphs, the method may further comprise doping the conductive layer(s) comprising silver. The doping may comprise doping the conductive layer(s) comprising silver with from about 0.05 to 3.0% (wt. %) of one or more of Zn, Pt, Pd, Ti, and Al.

In the method of any of the preceding six paragraphs, the coating may further comprise a layer comprising Ni and/or Cr located over and contacting the conductive layer comprising silver.

In the method of any of the preceding seven paragraphs, the dielectric layer comprising one or more of zirconium oxide, silicon nitride, and tin oxide, may comprise silicon nitride which may optionally be doped with oxygen and/or aluminum.

In the method of any of the preceding eight paragraphs, the dielectric layer located between at least the glass substrate and the conductive layer comprising silver may comprise an oxide of titanium, or silicon nitride which may optionally be doped with aluminum and/or oxygen.

In the method of any of the preceding nine paragraphs, the glass substrate may further support a functional film, wherein the functional film may be one or more of an antiglare film, an anti-microbial film, and an anti-fingerprint film, and may be located on an opposite side of the glass substrate than the transparent conductive coating.

In the method of any of the preceding ten paragraphs, the touch panel, including the electrodes, may have a visible transmission of at least 70%.

In the method of any of the preceding eleven paragraphs, the first wavelength may be from 400-620 nm (more preferably from 500-600 nm), and the second wavelength may be from 630-1200 nm (more preferably from 650-1100 nm).

The forgoing exemplary embodiments are intended to provide an understanding of the disclosure to one of ordinary skill in the art. The forgoing description is not intended to limit the inventive concept described in this application, the scope of which is defined in the following claims.

What is claimed is:

1. A capacitive touch panel, comprising:
   a substrate;
   a multi-layer transparent conductive coating supported by the substrate, the multi-layer transparent conductive coating including a first conductive layer, a first dielectric layer comprising silicon nitride located between at least the substrate and the first conductive layer, and a second dielectric layer comprising one or more of: zirconium oxide, silicon nitride, and tin oxide, located over at least the first conductive layer;
   each of said layers of the multi-layer transparent conductive coating being patterned in substantially the same shape as viewed from above;
   at least one electrode configured for allowing touch position to be determined, and comprising the multi-layer transparent conductive coating; and
   a processor configured for determining touch position on the touch panel.

2. The capacitive touch panel of claim 1, wherein the at least one electrode comprises: a first set of electrodes oriented substantially perpendicular to electrodes of a second set of electrodes, as viewed from above.

3. The capacitive touch panel of claim 2, wherein the electrodes in the first set are receive electrodes, and the electrodes in the second set are transmit electrodes.

4. The capacitive touch panel of claim 3, wherein the transmit electrodes have a higher sheet resistance (RS) than do the receive electrodes, and wherein the transmit electrodes have a sheet resistance (Rs) at least 1 ohm/square higher than a sheet resistance of the receive electrodes.

5. The capacitive touch panel of claim 4, wherein the transmit electrodes have a sheet resistance (Rs) at least 5 ohms/square higher than a sheet resistance of the receive electrodes.

6. The capacitive touch panel of claim 1, wherein the conductive layer comprises silver and is doped.

7. The capacitive touch panel of claim 6, wherein the conductive layer comprising silver is doped with from about 0.05 to 3.0% (wt. %) of one or more of Zn, Pt, Pd, Ti, and Al.

8. The capacitive touch panel of claim 6, wherein the conductive layer comprising silver is doped with from about 0.1 to 2.0% (wt. %) of one or more of Zn, Pt, Pd, Ti, and Al.

9. The capacitive touch panel of claim 1, wherein the conductive layer comprises Ni and/or Cr.

10. The capacitive touch panel of claim 1, wherein the transparent conductive coating has a sheet resistance of less than or equal to about 40 ohms/square.

11. The capacitive touch panel of claim 1, wherein the second dielectric layer comprises silicon nitride.

* * * * *